(12) United States Patent
Oshiyama et al.

(10) Patent No.: US 7,968,783 B2
(45) Date of Patent: *Jun. 28, 2011

(54) SYSTEM FOR TRANSFERRING INFORMATION ON ATTRIBUTE OF, FOR EXAMPLE, CD

(75) Inventors: Yukio Oshiyama, Sagamihara (JP); Yoshihiro Fujita, Nerima-ku (JP); Hiroshi Terada, Yokohama (JP)

(73) Assignee: Kabushiki Kaisha Kenwood, Hachiouji-shi, Tokyo (JP)

( * ) Notice: Subject to any disclaimer, the term of this patent is extended or adjusted under 35 U.S.C. 154(b) by 876 days.

This patent is subject to a terminal disclaimer.

(21) Appl. No.: 11/976,377

(22) Filed: Oct. 24, 2007

(65) Prior Publication Data

US 2008/0060504 A1    Mar. 13, 2008

Related U.S. Application Data

(62) Division of application No. 10/415,831, filed on May 2, 2003, now Pat. No. 7,339,104.

(30) Foreign Application Priority Data

| Apr. 17, 2001 | (JP) | 2001-118829 |
| Apr. 3, 2002 | (JP) | 2002-101882 |
| Apr. 3, 2002 | (JP) | 2002-101883 |
| Apr. 3, 2002 | (JP) | 2002-101884 |
| Apr. 3, 2002 | (JP) | 2002-101885 |

(51) Int. Cl.
*G04B 13/00* (2006.01)
*A63H 5/00* (2006.01)

(52) U.S. Cl. .......... 84/609; 84/610; 84/622; 84/649; 84/650; 84/659

(58) Field of Classification Search .......... None
See application file for complete search history.

(56) References Cited

U.S. PATENT DOCUMENTS

| 6,600,098 | B2 | 7/2003 | Mizuno et al. | |
| 6,700,048 | B1 | 3/2004 | Terada | |
| 6,751,439 | B2 | 6/2004 | Tice et al. | |
| 7,087,829 | B2 * | 8/2006 | Hasegawa et al. | 84/609 |
| 7,191,023 | B2 * | 3/2007 | Williams | 700/94 |
| 7,339,104 | B2 * | 3/2008 | Oshiyama et al. | 84/602 |
| 2002/0033090 | A1 | 3/2002 | Iwamoto et al. | |
| 2002/0046899 | A1 | 4/2002 | Mizuno et al. | |
| 2002/0066358 | A1 * | 6/2002 | Hasegawa et al. | 84/609 |
| 2002/0091455 | A1 * | 7/2002 | Williams | 700/94 |

(Continued)

*Primary Examiner* — Marlon T Fletcher
(74) *Attorney, Agent, or Firm* — Eric J. Robinson; Robinson Intellectual Property Law Office, P.C.

(57) ABSTRACT

Title information on music composition data recorded on a reproduction CD is acquired from a title information providing site and recorded on a recording MD together with composition data. A recording/reproducing apparatus (100) transmits TOC information acquired from the reproduction CD to a title information providing server (500) through a communication device (200), a wireless public communication network (WNET), a communication exchange (400), and the Internet (INET). The title information providing server (500) creates an inquiry code corresponding to the received TOC information and transmits it to a title information database (600). The title information database (600) sends a response code corresponding to the inquiry code as a reply to the title information providing server (500). The title information providing server (500) creates title information corresponding to the response code and transmits the title information to the recording/reproducing apparatus (100) through the devices and networks in the reverse direction to the direction in which the TOC information is transmitted. In the communication paths, the communication methods are converted for the respective devices.

18 Claims, 29 Drawing Sheets

U.S. PATENT DOCUMENTS

2003/0205125 A1 11/2003 Futamase et al.
2004/0031377 A1* 2/2004 Oshiyama et al. .............. 84/602
2008/0060504 A1* 3/2008 Oshiyama et al. .............. 84/609
2009/0133568 A1* 5/2009 Miyajima et al. .............. 84/625

* cited by examiner

FIG. 6

Date: 26 Mar 2001 12:56:31 +0900
From: 090_1234_5678@handynet. ne. jp
To: supply@title_data. ne. jp
Subject: Inquire about Title of CD
--------

Number of Title : 005
Total Recording Time : 50min 40sec

Title 001
Recording Time : 12min 54sec

Title 002
Recording Time : 08min 22sec

Title 003
Recording Time : 10min 38sec

Title 004
Recording Time : 05min 40sec

Title 005
Recording Time : 13min 06sec

US 7,968,783 B2

SYSTEM FOR TRANSFERRING INFORMATION ON ATTRIBUTE OF, FOR EXAMPLE, CD

TECHNICAL FIELD

The present invention relates to a system for transferring attribute information, attribute information providing server, method for transferring attribute information, communication apparatus and program.

BACKGROUND ART

A recording/reproducing apparatus capable of recording music composition data (voice signal) acquired by reproducing a CD (Compact Disc), etc., on an MD (Mini Disc), etc., is known.

An MD is provided with a U-TOC (User's Table Of Contents) as an area for recording title information composed of track titles, etc., for each disc title and music composition data piece.

After recording music composition data on the MD, the recording/reproducing apparatus can register disc titles and track titles, etc. (title information) entered by the user in the U-TOC of the MD.

On the other hand, a service of providing information on commercially available music CDs for users who access over the Internet is becoming a common practice. A disc information database for providing such a service prestores detailed information (attribute information) on various kinds of commercially available music CDs in a database system and supplies the attribute information at the request from a requesting device.

The user can easily acquire information on music CD titles, music titles, artists, etc., (attribute information) using the disc information database through a music-related site. However, when the information acquired from the disc information database is registered in the U-TOC of an MD, the user needs to operate a predetermined operation section (operation keys and remote control, etc.) of the recording/reproducing apparatus to enter characters of information one by one. Such an operation is troublesome to the user.

Furthermore, after the user registers information such as an album title and music title in the U-TOC of the MD, the recording/reproducing apparatus can display the album title and music title, etc., on a display section during reproducing of the MD.

However, it is often the case that the user cannot easily grasp the image of the music or artist through the album title and music title, etc., displayed on the display section alone.

Thus, if an image related to the disc (e.g., picture on the jacket or artist image, etc.) can be displayed simultaneously with the reproduction of the disc such as MD, it is to be expected that this will allow the user to easily grasp the image of the music or artist and thereby enjoy the music in a more profound way.

When using the above-described disc information database, the requesting device sends TOC information for identifying a music CD to a music-related site, etc. In this case, generally, the requesting device only sends a minimum portion of the TOC information that can identify the music CD instead of sending the full TOC information acquired from the music CD.

This may cause a plurality of attribute information pieces to be searched from the disc information database. In such a case, the requesting device will be presented a message that a plurality of attribute information pieces has been searched or part of each attribute information piece (album title, etc.) sent from the music-related site, etc. on the display section and requested to select at least one attribute information piece. Then, the requesting device continues communicating with or remains connected to the Internet until the user selects the attribute information, which results in extra communication charges.

That is, until the requesting device finishes acquiring the attribute information, the user needs to stay and check the requesting device and if a plurality of attribute information pieces has been searched, the user needs to immediately instruct the requesting device to select some attribute information.

Especially when acquiring attribute information on a plurality of music CDs, the user needs to check the requesting device over a long time until the requesting device finishes acquiring the attribute information.

As stated above, to access the music-related site, the requesting device needs to get connected to the Internet using some communication apparatus. When this communication apparatus is a wireless communication apparatus (mobile wireless communication device) such as a portable phone, a strong electric field generated during a communication may cause some influence on the requesting device or the operation thereof.

For example, when the requesting device is a recording apparatus (recording/reproducing apparatus), it is affected by a strong electric field and the recording quality may deteriorate. That is, while the recording apparatus (recording/reproducing apparatus) is recording music composition data if the portable phone, etc., is used to communicate with the music-related site, etc., noise or a noise signal may be mixed in the data.

To avoid the influence of such a strong electric field, the recording apparatus (recording/reproducing apparatus) may be protected with an electromagnetic shield material, etc., but this is not quite realistic because it would involve a cost increase.

The present invention has been implemented taking into account the actual situations described above and it is an object of the present invention to make it possible to acquire attribute information of music composition recorded on a reproducing medium from an information providing site and easily record it in a recording medium, etc.

Furthermore, it is another object of the present invention to easily acquire attribute information of music composition and provide an available system and method.

Furthermore, it is a further object of the present invention to easily acquire attribute information of music composition and provide an available apparatus.

Furthermore, it is a still further object of the present invention to make it possible to appropriately provide attribute information on music composition recorded on a reproducing medium.

The present invention has been implemented taking into account the actual situations described above and it is a still further object of the present invention to provide a recording/reproducing apparatus capable of appropriately recording music composition data, etc., taking into account influences of communications by communication apparatuses.

DISCLOSURE OF THE INVENTION

In order to attain the above objects, a system for transferring information on attribute according to a first viewpoint of the present invention is comprising a recording/reproducing apparatus that reproduces music composition data from a reproducing medium and records the music composition data on a recording medium and an attribute information providing server which is connected to the recording/reproducing apparatus through a communication and provides attribute information indicating an attribute of the music composition data recorded on the reproducing medium, wherein the recording/reproducing apparatus comprising: identification information acquiring means for acquiring identification information on the reproducing medium from the reproducing medium; identification information transmitting means for transmitting the identification information acquired from the identification information acquiring means to the attribute information providing server; attribute information receiving means for receiving the attribute information sent from the attribute information providing server; and recording means for recording the attribute information received by the attribute information receiving means on a recording medium, and the attribute information providing server comprising: identification information receiving means for receiving the identification information sent from the identification information transmitting means; attribute information acquiring means for acquiring attribute information corresponding to the identification information received from the identification information receiving means by accessing an attribute information database in which attribute information is prestored; and attribute information transmitting means for transmitting the attribute information acquired from the attribute information acquiring means to the recording/reproducing apparatus through a communication.

The system for transferring information on attribute may further comprise a communication apparatus which is connected to the identification information transmitting means and the attribute information receiving means of the recording/reproducing apparatus, transmits the identification information transmitted from the identification information transmitting means to the attribute information providing server according to a predetermined communication system, receives the attribute information sent back from the attribute information providing server according to the predetermined communication system in response to the transmission of the identification information and provides the received attribute information to the attribute information receiving means.

The system for transferring information on attribute may further comprise a communication exchange apparatus which is connected to the communication apparatus via a public communication network, connected to the attribute information providing server via a network, receives the identification information from the recording/reproducing apparatus via the public communication network, converts a protocol and then sends the identification information to the attribute information providing server through the network, receives the attribute information sent back from the attribute information providing server in response to the transmission of the identification information through a network, converts the protocol and then sends the attribute information to the recording/reproducing apparatus via the public communication network.

The attribute information database may receive identification information sent from the attribute information providing server according to a predetermined communication system, acquire attribute information according to the received identification information and send the acquired attribute information to the attribute information providing server according to the predetermined communication system.

The recording/reproducing apparatus may further comprise signal transmitting means for transmitting a first signal corresponding to the start of recording of the music composition data for the recording medium and a second signal corresponding to the end of recording of the music composition data for the recording medium to the communication apparatus, and the communication apparatus may further comprise signal receiving means for receiving the first and second signals from the recording/reproducing apparatus; and communication suppressing means for suppressing a wireless communication in response to the reception of the first signal by the signal receiving means and canceling the suppression of the wireless communication in response to the reception of the second signal by the signal receiving means.

The recording/reproducing apparatus may further comprise: first signal transmitting means for transmitting a first signal corresponding to the completion of the reception of the attribute information by the attribute information receiving means to the communication apparatus; recording starting means for starting the recording of the music composition data on the recording medium after transmitting the first signal; and second signal transmitting means for transmitting a second signal corresponding to the completion of the recording of the music composition data on the recording medium to the communication apparatus, and the communication apparatus may further comprise: signal receiving means for receiving the first and second signals from the recording/reproducing apparatus; and communication suppressing means for suppressing a wireless communication in response to the reception of the first signal by the signal receiving means and canceling the suppression of the wireless communication in response to the reception of the second signal.

The recording/reproducing apparatus may further comprise signal transmitting means for transmitting a first signal to the communication apparatus in response to the transmission of the identification information from the identification information transmitting means to the attribute information providing server through the communication apparatus and transmitting a second signal to the communication apparatus in response to the end of the recording of the music composition data on the recording medium, and the communication apparatus may further comprise: signal receiving means for receiving the first and second signals sent from the signal transmitting means; communication suppressing means for suppressing a wireless communication in response to the reception of the first signal by the signal receiving means, canceling the suppression of the wireless communication in response to the reception of the second signal and enabling the reception of the attribute information provided from the attribute information providing server; and means for supplying the attribute information received through a wireless communication to the attribute information receiving means of the recording/reproducing apparatus.

The communication suppressing means suppresses a wireless communication while enabling execution of processing involving no wireless communication.

The communication apparatus may further comprise: incoming call notification information transmitting means for transmitting incoming call notification information for notifying the arrival of a wireless communication to the recording/reproducing apparatus; and communication end information transmitting means for transmitting communication end information for notifying the end of the wireless communication to the recording/reproducing apparatus, and the recording/reproducing apparatus may further comprise: incoming call notification information receiving means for receiving incoming call notification information sent from the incoming call notification information transmitting means; recording suppressing means for temporarily suppressing the recording of the music composition data on the recording medium in response to the reception of the incoming call notification information by the incoming call notification information receiving means; communication end information receiving means for receiving the communication end information sent by the communication end information transmitting means; and recording resuming means for resuming the recording of the music composition data temporarily suppressed by the recording suppressing means on the recording medium in response to the reception of the communication end information by the communication end information receiving means.

The attribute information providing server may comprise: image information table that prestores image information corresponding to the identification information from the recording/reproducing apparatus by the identification information transmitting means; image information acquiring means for acquiring the image information stored in association with the identification information received by the identification information receiving means from the image information table; and image information transmitting means for transmitting the image information acquired from the image information acquiring means to the communication apparatus, and the communication apparatus may comprise: image information receiving/storing means for receiving and storing the image information sent from the attribute information providing server by the image information transmitting means; and displaying means for displaying an image according to the image information stored in the image information receiving/storing means.

The attribute information providing server may comprise: an image information table that prestores image information corresponding to the identification information from the recording/reproducing apparatus by the identification information transmitting means; image information acquiring means for acquiring the image information stored in association with the identification information received by the identification information receiving means from the image information table; and image information transmitting means for transmitting the image information acquired by the image information acquiring means to the communication apparatus, the communication apparatus may comprise: image information transferring means for transferring the image information sent from the attribute information providing server by the image information transmitting means to the recording/reproducing apparatus; and displaying means for displaying an image according to the image information forwarded from the recording/reproducing apparatus, and the recording/reproducing apparatus comprising: image information storing means for storing the image information transferred by the image information transferring means; and image information forwarding means for forwarding the image information stored in the image information storing means to the communication apparatus.

The attribute information database may provide image information corresponding to identification information together with attribute information, the attribute information providing server may comprise image information transmitting means for transmitting the attribute information and image information provided by the attribute information database to the communication apparatus, and the communication apparatus may comprise image information receiving/storing means for receiving and storing image information sent from the attribute information providing server by the image information transmitting means and displaying means for displaying images according to the image information stored in the image information receiving/storing means.

The attribute information database may provide image information corresponding to identification information together with attribute information, the attribute information providing server may comprise image information transmitting means for transmitting the attribute information and image information provided by the attribute information database to the communication apparatus, the communication apparatus may comprise image information transferring means for transferring image information sent from the attribute information providing server to the recording/reproducing apparatus and displaying means for displaying images according to the image information forwarded from the recording/reproducing apparatus, and the recording/reproducing apparatus may comprise image information storing means for storing the image information transferred by the image information transferring means and image information forwarding means for forwarding the image information stored in the image information storing means to the communication apparatus.

The attribute information providing server may further include a calculation reference table that prestores information indicating a calculation reference of an accounting sum for the attribute information provided, accounting sum calculating means for calculating an accounting sum according to the calculation reference table about the attribute information to be sent to the recording/reproducing apparatus, and an accounting sum recording table that records the accounting sum calculated by the accounting sum calculating means for each of the communication apparatuses.

The identification information transmitting means may send the identification information to the attribute information providing server according to a predetermined communication system, and the attribute information receiving means may receive the attribute information sent back from the attribute information providing server according to the predetermined communication system in response to the transmission of the identification information.

The system for transferring information on attribute may further comprise a communication exchange apparatus which is connected to the recording/reproducing apparatus via a public communication network, connected to the attribute information providing server via a network, receives the identification information from the recording/reproducing apparatus via the public communication network, converts a protocol and then sends the identification information to the attribute information providing server via the network, receives the attribute information sent back from the attribute information providing server in response to the transmission of the identification information via a network, converts the protocol and then sends the attribute information to the recording/reproducing apparatus via the public communication network.

The attribute information database may receive identification information sent from the attribute information providing server according to a predetermined communication system, acquire attribute information according to the identification information received and send the attribute information acquired to the attribute information providing server according to the predetermined communication system.

The recording/reproducing apparatus may further comprise communication suppressing means for suppressing a wireless communication in response to the start of recording of the music composition data on the recording medium and canceling the suppression of the wireless communication in response to the end of recording of the music composition data on the recording medium.

The recording/reproducing apparatus may further comprise: recording suppressing means for temporarily suppressing the recording of the music composition data on the recording medium in response to the arrival of a wireless communication; and recording resuming means for resuming the recording of the music composition data on the recording medium in response to the end of the wireless communication.

The recording resuming means may resume the recording on the recording medium from the start of the music composition data whose recording is suppressed by the recording suppressing means.

The recording resuming means may substantially erase an intermediate portion of music composition data to be recorded at a time point of suppressing the recording by the recording suppressing means and resume the recording of the music composition data from the start of the intermediate portion on the recording medium.

The attribute information providing server may further comprise a calculation reference table that prestores information indicating a calculation reference of an accounting sum for the attribute information provided, accounting sum calculating means for calculating an accounting sum according to the calculation reference table about the attribute information to be sent to the recording/reproducing apparatus and an accounting sum recording table that records the accounting sum calculated by the accounting sum calculating means for each of the recording/reproducing apparatuses or communication apparatuses.

The identification information transmitting means may transmit the identification information including sender information for identifying the recording/reproducing apparatus to the attribute information providing server, and the attribute information providing server may send the attribute information acquired by accessing the attribute information database to the recording/reproducing apparatus corresponding to the sender information sent by the identification information transmitting means.

The identification information may include TOC information on the number of music pieces recorded and recording time of the music composition data recorded on the reproducing medium, and the attribute information may include at least one of information pieces of a disc title, music title, composer, music score, and lyrics.

In order to attain the above objects, an attribute information providing server according to a second viewpoint of the present invention is that reproduces music composition data from a reproducing medium and is connected to a recording/reproducing apparatus for recording the music composition data on a recording medium through a communication, comprising: identification information receiving means for receiving identification information sent from the recording/reproducing apparatus; attribute information acquiring means for acquiring attribute information corresponding to the identification information received by the identification information receiving means by accessing an attribute information database that prestores attribute information; and attribute information transmitting means for transmitting the attribute information acquired by the attribute information acquiring means to the recording/reproducing apparatus through a communication.

The attribute information providing server may further comprise: an image information table that prestores image information specific to each of the identification information pieces; image information acquiring means for acquiring image information stored in association with the identification information received from the recording/reproducing apparatus from the image information table; and image information transmitting means for transmitting the image information acquired by the image information acquiring means to the recording/reproducing apparatus.

The attribute information providing server may further include a calculation reference table that prestores information indicating a calculation reference of an accounting sum for the attribute information provided, accounting sum calculating means for calculating an accounting sum according to the calculation reference table about the attribute information to be sent to the recording/reproducing apparatus and an accounting sum recording table that records the accounting sum calculated by the accounting sum calculating means for each of the communication apparatuses.

The identification information may include TOC information on the number of music pieces and recording time of the music composition data recorded on the reproducing medium, and the attribute information may include at least one of information pieces of a disc title, music composition title, composer, musical scores and lyrics.

In order to attain the above objects, a method for transferring information on attribute according to a third viewpoint of the present invention is comprising a recording/reproducing apparatus that reproduces music composition data from a reproducing medium and records the music composition data on a recording medium and an attribute information providing server that is connected to the recording/reproducing apparatus through a communication and provides attribute information indicating an attribute of the music composition data recorded on the reproducing medium, comprising: an identification information acquiring step of acquiring identification information on the reproducing medium; an identification information transmitting step of transmitting the identification information acquired in the identification information acquiring step to the attribute information providing server through the communication; an identification information receiving step of receiving the identification information sent in the identification information transmitting step by the attribute information providing server; an attribute information acquiring step of acquiring attribute information corresponding to the identification information received in the identification information receiving step by accessing an attribute information database that prestores attribute information; attribute information transmitting step of transmitting the attribute information acquired in the attribute information acquiring step to the recording/reproducing apparatus through the communication; an attribute information receiving step of receiving the attribute information sent from the attribute information providing server by the recording/reproducing apparatus; and a recording step of recording the attribute information received in the attribute information receiving step on a recording medium.

In order to attain the above objects, a communication apparatus according to a fourth viewpoint of the present invention is which is connected to a reproducing apparatus for reproducing music composition data from a reproducing medium and communicates with an information providing server for providing image information on the reproducing medium on demand, comprising: identification information receiving means for receiving identification information of the reproducing medium sent from the reproducing apparatus; image information receiving means for transmitting the identification information received by the identification information receiving means to the information providing server and receiving the image information sent back from the information providing server in response to the transmission of the identification information; and image information storing means for storing the image information received by the image information receiving means in association with the identification information received by the identification information receiving means.

The communication apparatus may further comprise: deciding means for deciding whether or not to store the image information received by the image information receiving means in the image information storing means; and image information transmitting means for transmitting the image information received by the image information receiving means to the reproducing apparatus when the deciding means decides that the image information is not stored in the image information storing means.

In order to attain the above objects, a communication apparatus according to a fifth viewpoint of the present invention is which is connected to a reproducing apparatus for reproducing music composition data from a reproducing medium and communicates with an information providing server for providing image information on the reproducing medium on demand, comprising: image information storing means for storing image information related to the reproducing medium in association with identification information for identifying the reproducing medium; identification information receiving means for receiving identification information of the reproducing medium sent from the reproducing apparatus; acquiring means for acquiring the target image information from the image information storing means according to the identification information received by the identification information receiving means; and displaying means for displaying an image according to the image information acquired by the acquiring means.

In order to attain the above objects, a communication apparatus according to a sixth viewpoint of the present invention is which is connected to a reproducing apparatus for reproducing music composition data from a reproducing medium and communicates with an information providing server for providing image information on the reproducing medium on demand, comprising: instruction information receiving means for receiving image information on the reproducing medium sent from the reproducing apparatus and instruction information for instructing the display of the image; and displaying means for displaying the image according to the image information received by the instruction information receiving means in response to the instruction information received by the instruction information receiving means.

In order to attain the above objects, a communication apparatus according to a seventh viewpoint of the present invention is which is connected to a reproducing apparatus for reproducing music composition data from a reproducing medium and communicates with an information providing server for providing image information on the reproducing medium on demand, comprising: image information storing means for storing image information on the reproducing medium in association with identification information for identifying the reproducing medium; identification information receiving means for receiving identification information of the reproducing medium sent from the reproducing apparatus; deciding means for deciding whether the image information corresponding to the identification information received by the identification information receiving means is stored in the image information storing means or not; image information acquiring means for acquiring, when the deciding means decides that the image information is stored in the image information storing means, the corresponding image information from the image information storing means and sending, when the deciding means decides that the image information is not stored in the image information storing means, the identification information received by the identification information receiving means to the information providing server and acquires image information sent back from the information providing server in response to the transmission of the identification information; and displaying means for displaying an image corresponding to the image information acquired by the image information acquiring means.

In order to attain the above objects, a program according to an eighth viewpoint of the present invention is characterized by allowing a computer to function as reproducing means for reproducing music composition based on music composition data included in a reproducing medium, recording means for recording the music composition reproduced by the reproducing means on a recording medium, identification information acquiring means for acquiring identification information on the reproducing medium from the reproducing medium, identification information transmitting means for transmitting the identification information acquired by the identification information acquiring means to an attribute information providing server that provides attribute information indicating attributes of music composition data recorded on the reproducing medium through a communication, attribute information receiving means for receiving attribute information sent from the attribute information providing server according to the identification information sent by the identification information transmitting means, and recording means for recording the attribute information received by the attribute information receiving means on the recording medium.

In order to attain the above objects, a program according to a ninth viewpoint of the present invention is characterized by allowing a computer to function as identification information receiving means for receiving identification information on a reproducing medium sent through a communication, attribute information acquiring means for acquiring attribute information corresponding to the identification information received by the identification information receiving means by accessing an attribute information database that prestores attribute information, and attribute information transmitting means for transmitting the attribute information acquired by the attribute information acquiring means to the sender of the identification information corresponding to the attribute information through a communication.

In order to attain the above objects, a program according to a tenth viewpoint of the present invention is characterized by allowing a computer to function as accounting sum calculating/recording means for calculating an accounting sum about the attribute information sent according to the identification information of the reproducing medium sent through a communication according to a calculation reference table that prestores information indicating a calculation reference of the accounting sum for the attribute information provided and recording the calculated accounting sum for each receiver of the attribute information.

In order to attain the above objects, a program according to an eleventh viewpoint of the present invention is characterized by allowing a computer to function as identification information transmitting means for transmitting identification information sent from a recording/reproducing apparatus that records music composition data reproduced from a reproducing medium on a recording medium to an attribute information providing server that provides attribute information indicating attributes of the music composition data recorded on the reproducing medium according to a predetermined communication method, and attribute information receiving means for receiving the attribute information sent back from the attribute information providing server in response to the transmission of identification information by the identification information transmitting means and providing the received attribute information for the recording/reproducing apparatus.

In order to attain the above objects, a recording/reproducing apparatus according to a twelfth viewpoint of the present invention is which is connected to a communication apparatus that communicates with an attribute information providing server that provides attribute information including text information and image information on a reproducing medium on demand and records music composition data reproduced from the reproducing medium on a recording medium, comprising: identification information acquiring means for acquiring identification information for identifying the reproducing medium from the reproducing medium as the reproduction target; and identification information transmitting means for transmitting the identification information acquired by the identification information acquiring means to the communication apparatus in order for the communication apparatus to receive a supply of attribute information from the attribute information providing server in connection with a reproducing/recording operation of recording the music composition data reproduced from the reproducing medium on the recording medium.

The recording/reproducing apparatus may further comprise: attribute information receiving means for receiving attribute information sent back from the communication apparatus which receives a supply of attribute information from the attribute information providing server in response to the transmission of the identification information by the identification information transmitting means; attribute information storing means for storing the attribute information received by the attribute information receiving means in association with the identification information received by the identification information acquiring means; and attribute information displaying means for displaying the target attribute information stored in the information storing means when the target reproducing medium is loaded or reproduced.

The recording/reproducing apparatus may further comprise: attribute information receiving means for receiving attribute information sent back from the communication apparatus that has received a supply of attribute information from the attribute information providing server in response to the transmission of the identification information by the identification information transmitting means; and recording means for recording the attribute information received by the attribute information receiving means together with music composition data to be recorded on a recording medium.

The recording/reproducing apparatus may further comprise: deciding means for deciding whether attribute information is recorded on the reproducing medium or not; transmission controlling means for suppressing, when the deciding means decides that attribute information is recorded, the transmission of identification information by the identification information transmitting means; attribute information acquiring means for acquiring, when the transmission controlling means suppresses the transmission of the identification information by the identification information transmitting means, the attribute information recorded on the reproducing medium; and recording means for recording the attribute information acquired by the attribute information acquiring means together with music composition data to be recorded on a recording medium.

The identification information transmitting means may transmit identification information to the communication apparatus that has received a supply of attribute information including image information from the attribute information providing server in connection with a reproducing operation of reproducing music composition data.

The recording/reproducing apparatus may further comprise: image information acquiring means for acquiring image information on the reproducing medium as the reproduction target from the attribute information recording means; and instruction information transmitting means for transmitting the image information acquired by the image information acquiring means and instruction information for instructing a display of the image information to the communication apparatus.

In order to attain the above objects, an information providing server according to thirteenth viewpoint of the present invention is which provides attribute information indicating an attribute of music composition data recorded on a reproducing medium at the request of a requesting device connected via a network, comprising: identification information receiving means for receiving identification information for identifying a reproducing medium sent from the requesting device; attribute information acquiring means for acquiring target attribute information according to the identification information received by the identification information receiving means by accessing a database that prestores a plurality of attribute information pieces; and access controlling means for allowing the attribute information acquiring means to access an arbitrary database and change the access target of the attribute information acquiring means to another database, when the attribute information acquiring means cannot acquire the target attribute information and allowing the attribute information acquiring means to acquire the target attribute information.

In order to attain the above objects, an information providing server according to a fourteenth viewpoint of the present invention is which provides attribute information indicating an attribute of music composition data recorded on a reproducing medium at the request of a requesting device connected via a network, comprising: identification information receiving means for receiving identification information for identifying a reproducing medium sent from the requesting device; attribute information acquiring means for acquiring target attribute information according to the identification information received by the identification information receiving means by sequentially accessing a plurality of databases that prestore a plurality of attribute information pieces; selecting means for selecting one out of a plurality of attribute information pieces acquired by the attribute information acquiring means according to a priority level based on a predetermined data format of attribute information; and attribute information replying means for replying the attribute information selected by the selecting means to the requesting device.

The information providing server may further comprise attribute information replying means for replying the attribute information acquired by the attribute information acquiring means to the requesting device, wherein the access controlling means may stop a change of the access destination to other databases when the attribute information acquiring means accesses an arbitrary database and acquires target attribute information successfully.

The information providing server may further include specific information acquiring means for acquiring specific information for specifying the requesting device, and identification information storing means for storing identification information received by the identification information receiving means in association with the specific information acquired by the specific information acquiring means.

The identification information storing means may store fixed information indicating the access source used by the attribute information acquiring means to access the database in association with the specific information acquired by the specific information acquiring means.

The information providing server may further comprise, further comprising converting means for converting the attribute information acquired by the attribute information acquiring means to a predetermined data format that can be received by the requesting device.

In order to attain the above objects, a recording/reproducing apparatus according to a fifteenth viewpoint of the present invention is which is connected to a communication apparatus that communicates with an attribute information providing server that provides attribute information on a reproducing medium on demand and carries out a reproducing/recording operation of recording the music composition data reproduced from the reproducing medium on a recording medium, comprising: identification information acquiring means for acquiring identification information for identifying the reproducing medium from the reproducing medium as the reproduction target; identification information transmitting means for transmitting the identification information acquired by the identification information acquiring means to the communication apparatus in order to request a supply of attribute information in a predetermined data format for the attribute information providing server; attribute information receiving means for receiving attribute information sent back by the communication apparatus in response to the transmission of identification information by the identification information transmitting means; and recording means for recording the attribute information received by the attribute information receiving means together with the music composition data recorded on a recording medium.

The recording/reproducing apparatus may further comprise control instructing means for sending communication suppression information for instructing the suppression of an information communication to the communication apparatus in synchronization with the start of a reproducing/recording operation and sending suppression cancellation information for instructing the cancellation of the suppressed information communication to the communication apparatus in synchronization with the end of the reproducing/recording operation.

The identification information transmitting means may send identification information to the communication apparatus in connection with the end of the reproducing/recording operation.

The recording/reproducing apparatus may further comprise operation controlling means for starting a reproducing/recording operation in connection with the reception of attribute information by the attribute information receiving means.

The recording/reproducing apparatus may further comprise: communication suppression instructing means for sending communication suppression information for instructing the suppression of an information communication to the communication apparatus after the identification information transmitting means sends identification information; operation controlling means for starting a reproducing/recording operation in connection with the transmission of the communication suppression information by the communication suppression instructing means; and suppression cancellation instructing means for sending suppression cancellation information for instructing the cancellation of the suppressed information communication to the communication apparatus in connection with the end of the reproducing/recording operation started by the operation controlling means.

The recording/reproducing apparatus may further comprise: communication state detecting means for detecting the start and end of an information communication in the communication apparatus; and operation controlling means for stopping the reproducing/recording operation when the communication state detecting means detects the start of an information communication halfway through the reproducing/recording operation and resuming the reproducing/recording operation when the communication state detecting means detects the end of the information communication.

The operation controlling means may control the reproducing/recording operation carried out while storing music composition data in a memory of a predetermined capacity, discard the music composition data stored in the memory when the communication state detecting means detects the start of an information communication and the reproducing/recording operation is stopped and store the music composition data corresponding to the discarded music composition data in the memory from the beginning when the communication state detecting means detects the end of the information communication and the reproducing/recording operation is resumed.

The operation controlling means may delete the music composition data being recorded on the recording medium from the recording medium when the communication state detecting means detects the start of the information communication and stops the reproducing/recording operation and record the music composition data corresponding to the deleted music composition data on the recording medium when the communication state detecting means detects the end of the information communication and the reproducing/recording operation is resumed.

BRIEF DESCRIPTION OF THE DRAWINGS

FIG. 6 illustrates an example of contents of e-mail sent from the recording/reproducing apparatus to the title information providing server in FIG. 1;

BEST MODE FOR CARRYING OUT THE INVENTION

With reference now to the attached drawings, a system for transferring title information according to embodiments of the present invention will be explained below.

First Embodiment

Figure 1:
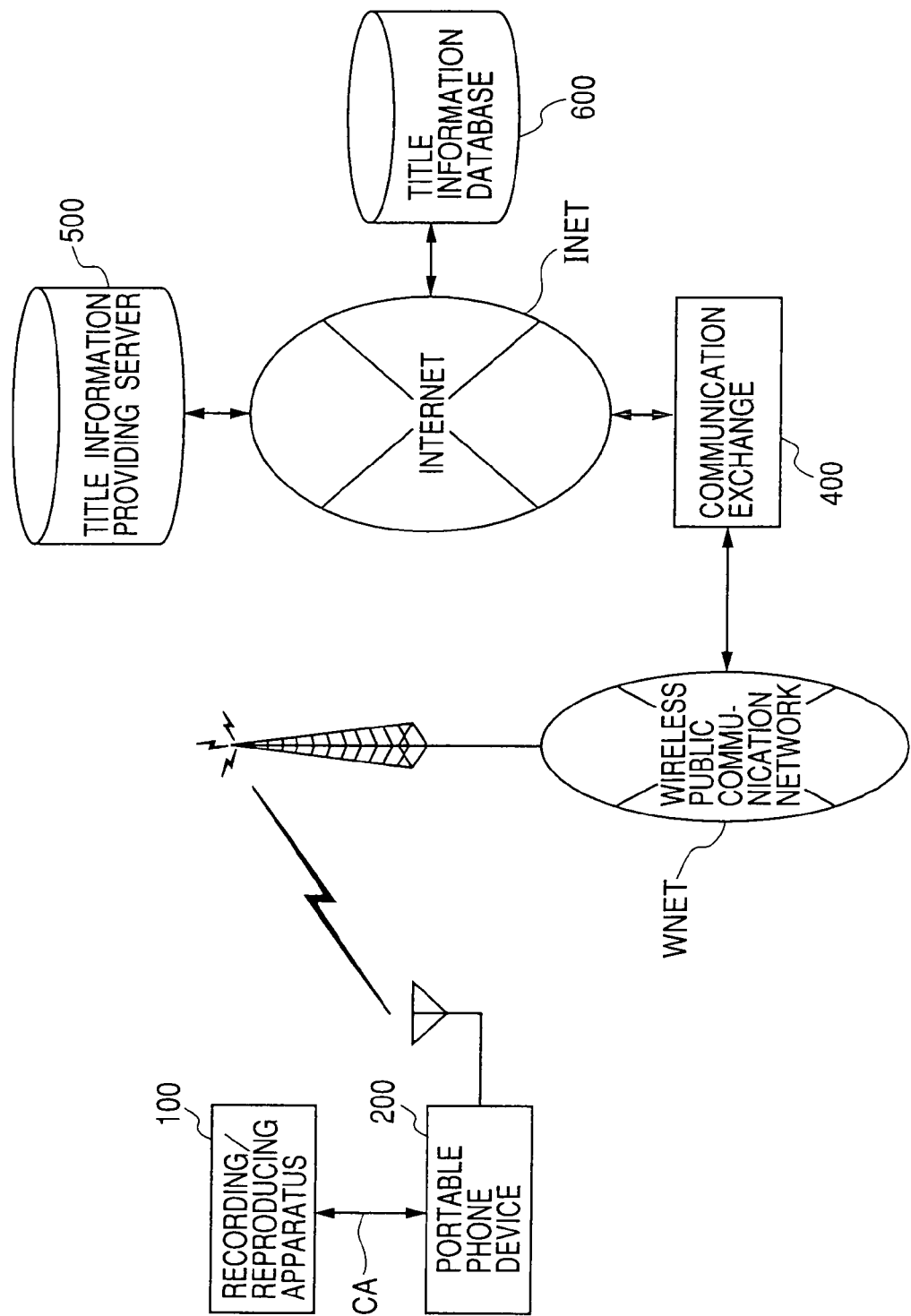
FIG. 1 is a block diagram showing a configuration example of a system for transferring title information according to a first embodiment of the present invention.

FIG. 1 is a block diagram showing an overall configuration of this system for transferring title information. As shown in FIG. 1, the system for transferring title information is provided with a recording/reproducing apparatus 100, a portable phone device 200, a communication exchange 400, a title information providing server 500 and a title information database 600 (DB). Then, the portable phone device 200 and the communication exchange 400 are connected via a wireless public communication network WNET. Furthermore, the communication exchange 400, the title information providing server 500 and the title information database DB 600 are connected via the Internet INET. Furthermore, the recording/reproducing apparatus 100 and the portable phone device 200 are connected via a signal cable CA.

Figure 2:
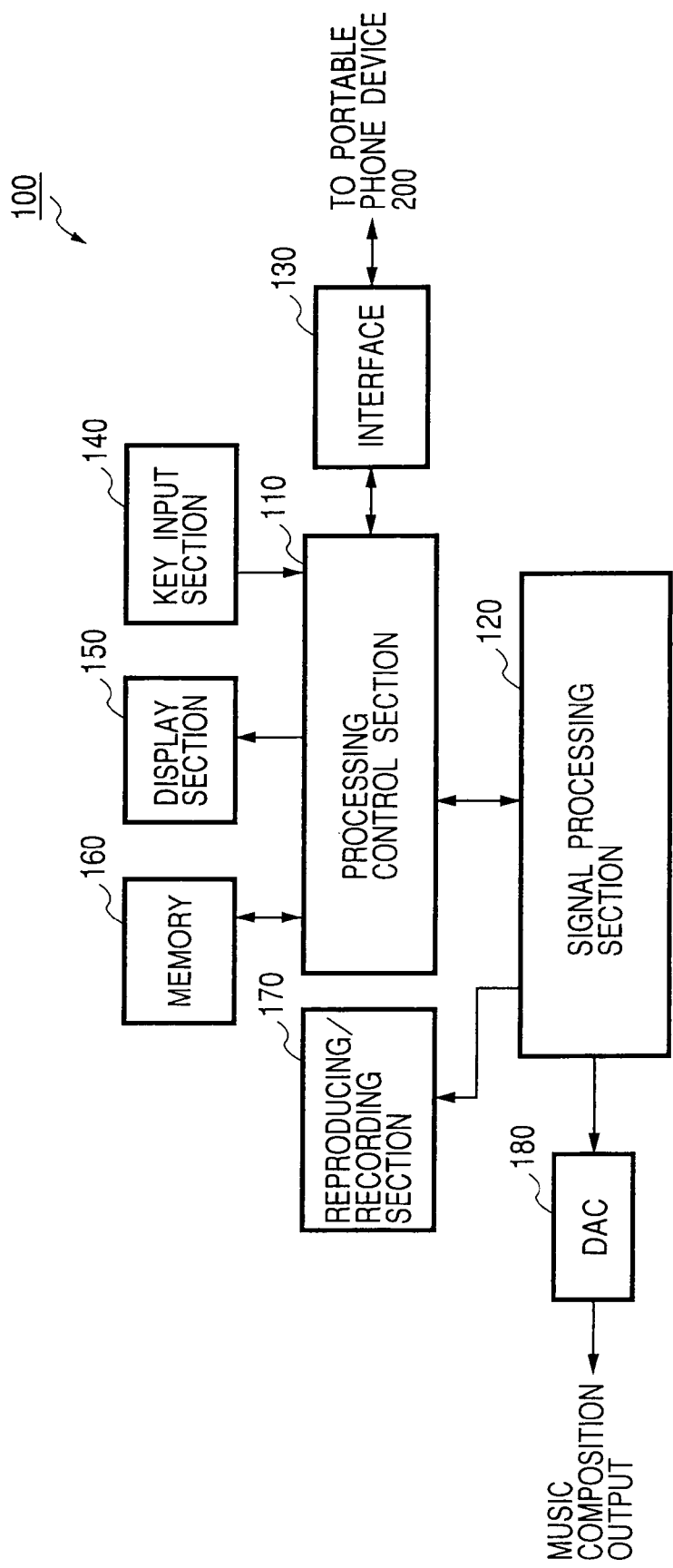
FIG. 2 is a block diagram showing a configuration example of a recording/reproducing apparatus in FIG. 1.

The recording/reproducing apparatus 100 is a device to reproduce a CD (compact disc) and record music composition data acquired on an MD (mini disc). As shown in FIG. 2, the recording/reproducing apparatus 100 is constructed of a processing control section 110, a signal processing section 120, an interface 130, a key input section 140, a display section 150, a memory 160, a recording/reproducing section 170 and a DAC (digital/analog converter) 180.

The processing control section 110 is constructed of a one-chip microcomputer, etc., including a CPU (Central Processing Unit) and peripheral LSI (Large Scale Integration) and controls the whole recording/reproducing apparatus 100.

More specifically, the processing control section 110 controls the signal processing section 120 to reproduce a reproducing medium, for example, a reproducing CD which is a reproducing target and record music composition data obtained on a recording medium, for example, recording MD which is a recording target through the recording/reproducing section 170, etc.

Furthermore, the processing control section 110 controls the signal processing section 120 to read TOC information from a TOC (Table Of Contents) in the reproducing target CD and send this TOC information to the portable phone device 200 through the interface 130, etc.

This TOC information is information made up of the total number of tracks, total playing time (minutes, seconds: frames), etc., and used by the title information DB 600 as identification information to identify the reproducing CD and obtain title information which is attribute information on the disk title of this reproducing CD and the title of the music composition, artist, composer, music score, lyrics, etc., recorded in each track of the reproducing CD.

Furthermore, the processing control section 110 receives the title information sent from the portable phone device 200 through the interface 130 and records the title information received through the signal processing section 120 and recording/reproducing section 170 on a recording MD.

The signal processing section 120 reproduces the reproducing CD and reads music composition data under the control of the processing control section 110 and records the music composition data on the recording MD.

The interface 130 is provided with a connector whereby a signal cable CA is connected in a detachable manner and sends/receives data to/from the portable phone device 200 through the communication cable CA.

The key input section 140 consists of button switches and a rotary switch, etc., is used to enter instruction information, etc., according to an operation by the user and supplies the information entered to the processing control section 110. For example, when the user depresses a specific key, the key input section 140 supplies information for instructing the recording (reproducing/recording) of music composition data from a CD on an MD to the processing control section 110.

The display section 150 consists of an LCD (Liquid Crystal Display) panel, etc., is controlled by the processing control section 110 and displays character strings, etc. For example, the display section 150 displays a track number of the music composition data being recorded and the remaining time until the recording is completed.

The memory 160 consists of a RAM (Random Access Memory), etc., is used as a work area, etc., for the processing control section 110 and stores various kinds of information.

The recording/reproducing section 170 is provided with an optical head or magnetic head, etc., reads data recorded on a CD loaded in this recording/reproducing apparatus 100, writes arbitrary data into an MD and reads data recorded on the MD.

The DAC (digital/analog converter) 180 converts digital music composition data supplied to the signal processing section 120 to an analog music composition signal and outputs the converted music composition signal as voice (music composition tone) through an amplifier or speaker, etc.

Figure 3:
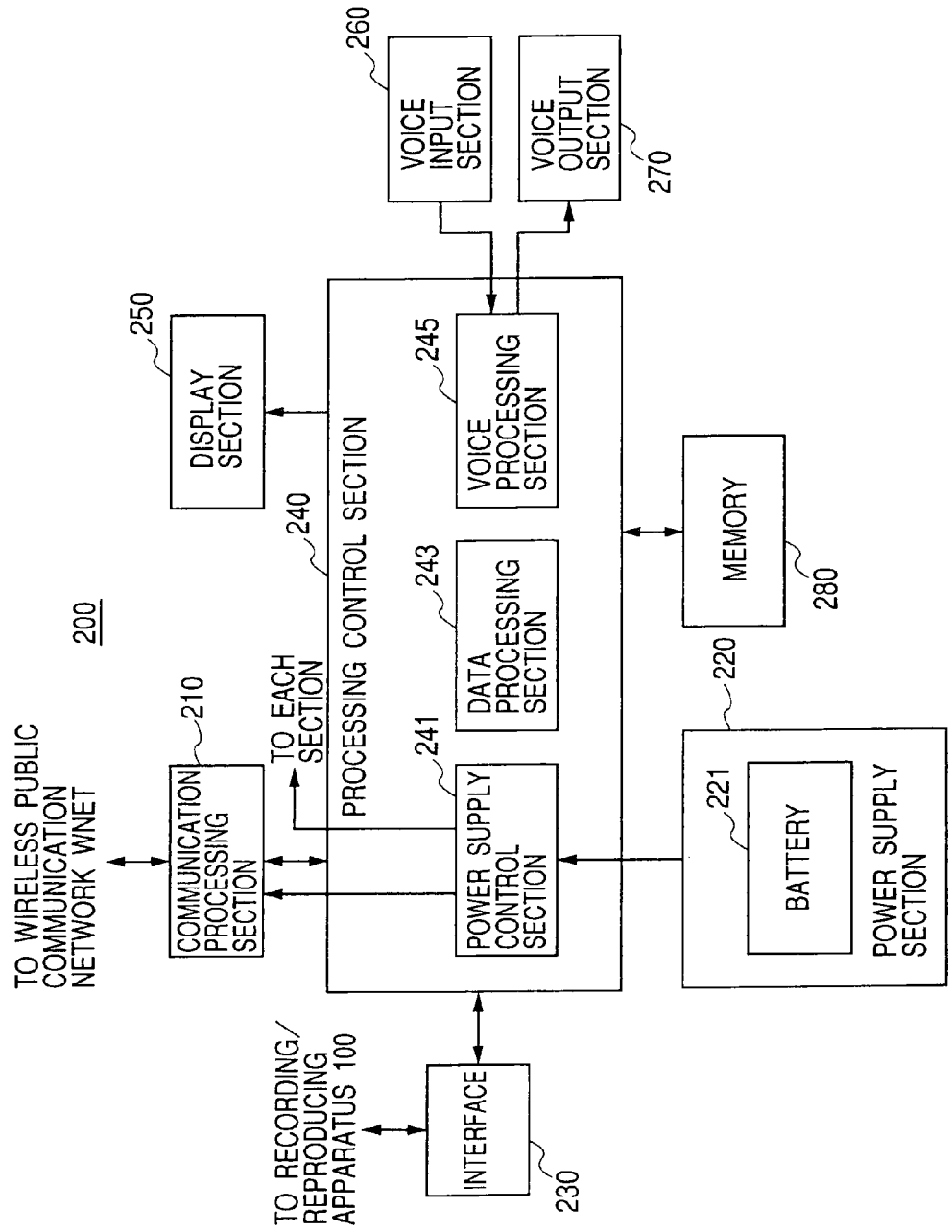
FIG. 3 is a block diagram showing a configuration example of a portable phone device in FIG. 1.

The portable phone device 200 shown in FIG. 1 is constructed of a so-called cellular phone, PHS (Personal Handyphone System), etc., and as shown in FIG. 3, is provided with a communication processing section 210, a power supply section 220, an interface 230, a processing control section 240, a display section 250, a voice input section 260, a voice output section 270 and a memory 280.

The communication processing section 210 is constructed of an RF (Radio Frequency) signal processing circuit (high frequency circuit), etc., transmits/receives a wireless communication signal to/from, for example, a base station making up a mobile communication network, and can thereby transmit/receive a call or e-mail.

The communication processing section 210 operates on power supplied from the power supply section 220.

The power supply section 220 includes a battery 221 made up of, for example, a lithium secondary cell and generates power to be supplied to various sections of this portable phone device 200.

The interface 230 is provided with a connector to which a signal cable CA is connected in a detachable manner and transmits/receives data to/from the recording/reproducing apparatus 100 connected through the signal cable CA.

The processing control section 240 is constructed of, for example, an MPU (Micro Processing Unit) or DSP (Digital Signal Processor), etc., is used to control an overall operation of this portable phone device 200 and provided with a power supply control section 241, a data processing section 243 and a voice processing section 245.

The power supply control section 241 is intended to control a supply state of the power supplied from the power supply section 220 and the power supply control section 241 changes the supply state of the power to various sections according to power supply flag information stored in the memory 280. For example, if the power supply flag information has a content indicating "suppress transmission/reception," the power supply control section 241 supplies the power from the power supply section 220 to various sections of this portable phone device 200 except the communication processing section 210. On the other hand, when the power supply flag information has a content indicating "transmission/reception OK," the power supply control section 241 supplies the power to various sections of this portable phone device 200 including the communication processing section 210.

The data processing section 243 executes data processing such as creation and transmission/reception of e-mail and editing of telephone directory data, etc.

The voice processing section 245 is a voice signal processing section provided with a CODEC (COder/DECoder), etc., and codes a voice signal sent from the voice input section 260 and sends the coded signal to the communication processing section 210. Furthermore, the voice processing section 245 reconstructs a voice signal from the signal sent from the communication processing section 210 and supplies it to the voice output section 270.

The display section 250 is constructed of an LCD (Liquid Crystal Display), etc., on which the processing control section 240 displays an image according to various processing contents and processing results. Furthermore, as will be described later, the display section 250 displays image information stored in the memory 280.

The voice input section 260 consists of a microphone, etc., picks up voice from the outside to compose a voice signal and sends the voice signal generated to the voice processing section 245.

The voice output section 270 consists of a speaker, etc., and outputs voice according to the voice signal received from the voice processing section 245.

The memory 280 stores the above-described power supply flag information and a jacket picture, etc., which will be described later under the control of the processing control section 240.

The communication exchange 400 shown in FIG. 1 is a gateway that carries out a communication and exchange between the wireless public communication network WNET and the Internet INET.

More specifically, when a message, etc., including information of the destination is sent from the portable phone device 200, the communication exchange 400 converts this message, etc., to an e-mail format and sends it to the specified destination over the Internet INET. Furthermore, when e-mail for the portable phone device 200 is received through the Internet INET, the communication exchange 400 converts the content of this e-mail to a format according to a communication system applicable to the portable phone device 200 and sends it to the portable phone device 200 over the wireless public communication network WNET.

The title information providing server 500 is a server connected to the Internet INET.

The title information providing server 500 sends the TOC information sent from the communication exchange 400 by e-mail to the title information DB 600 using HTTP (HyperText Transfer Protocol).

Furthermore, the title information providing server 500 sends the title information sent back from the title information DB 600 using HTTP to the user who requests this title information by e-mail.

Figure 4:
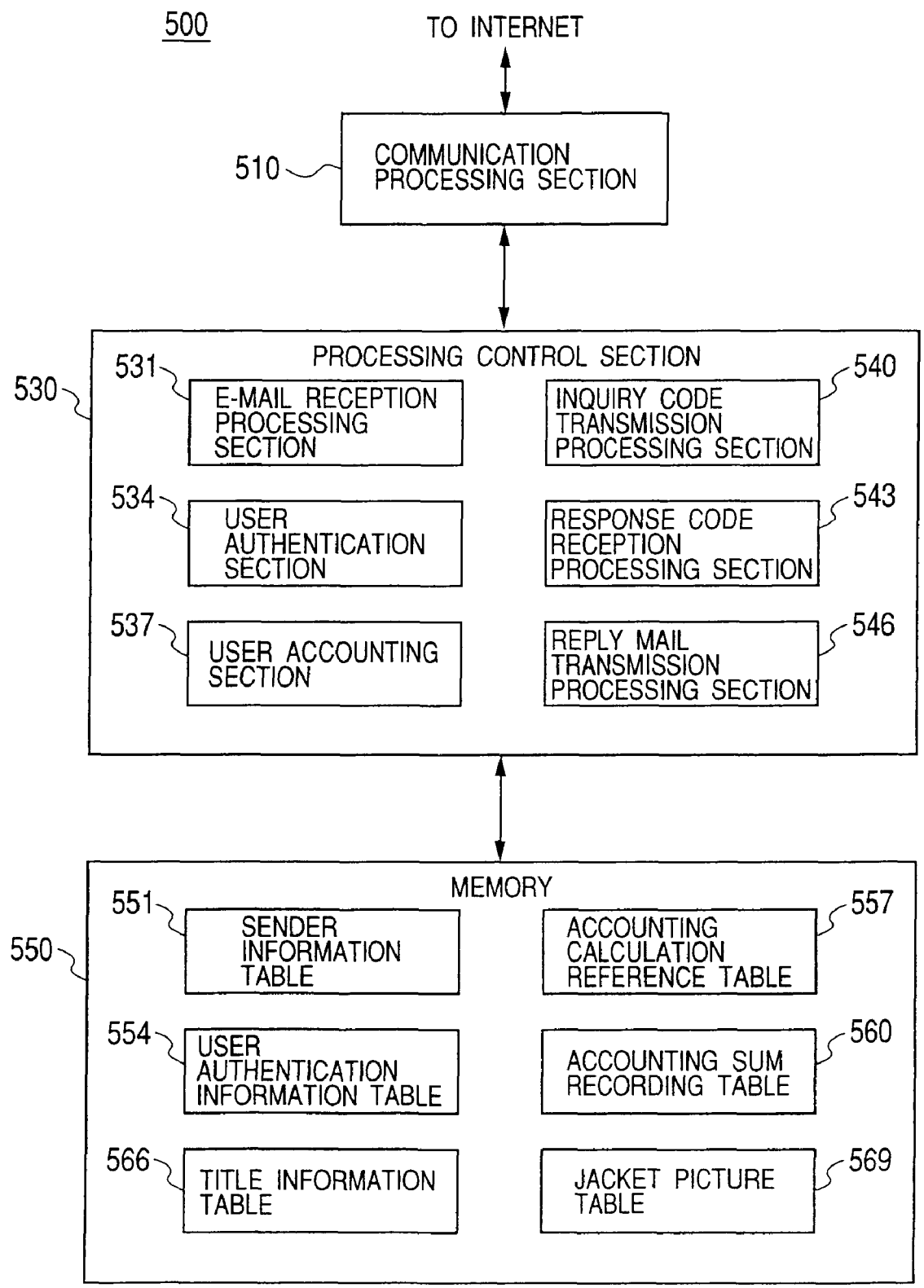
FIG. 4 is a block diagram showing a configuration example of a title information providing server according to the embodiment of the present invention.
Figure 5:
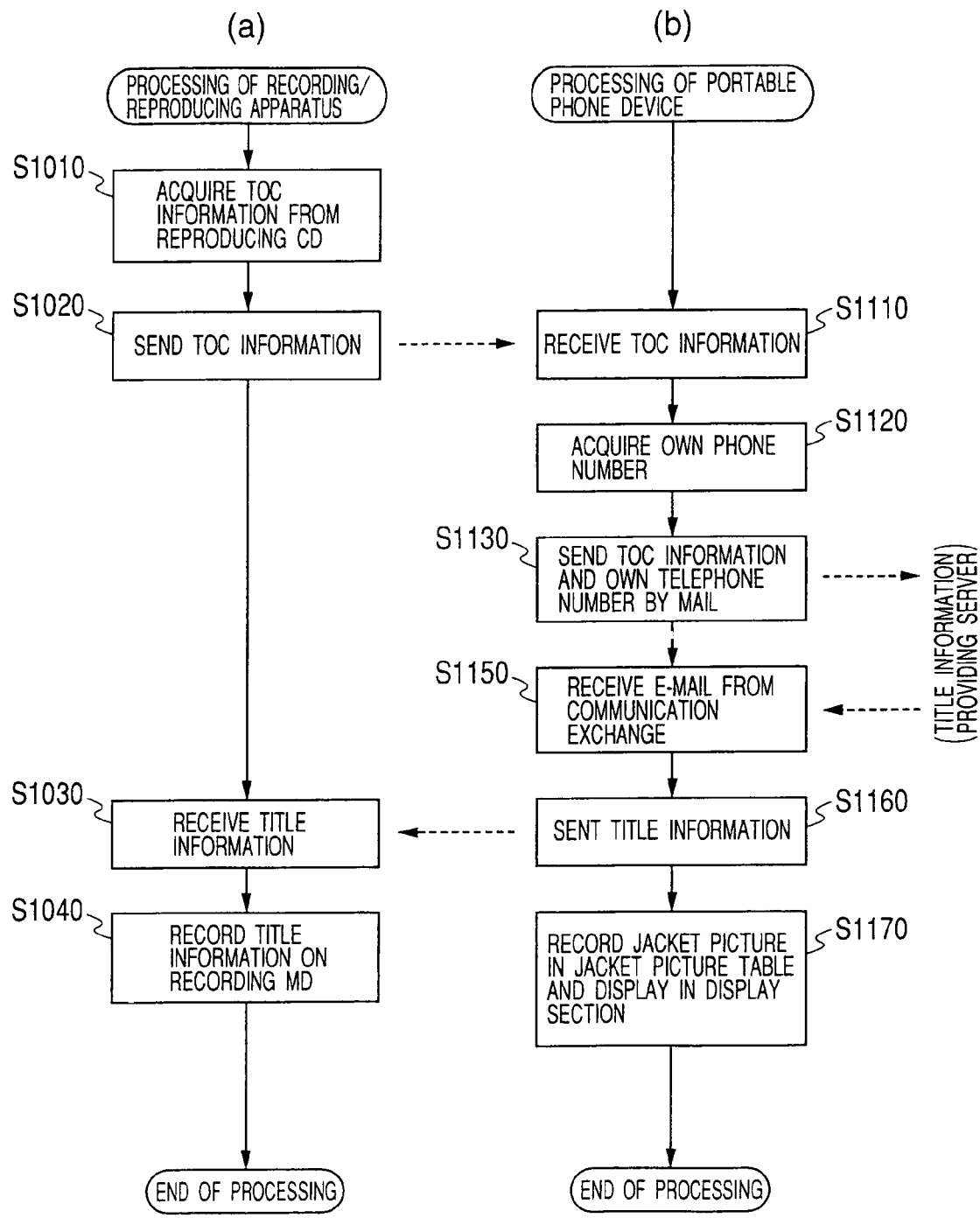
FIG. 5 is a flow chart to illustrate processing by the recording/reproducing apparatus and portable phone device according to the first embodiment of the present invention.
Figure 7:
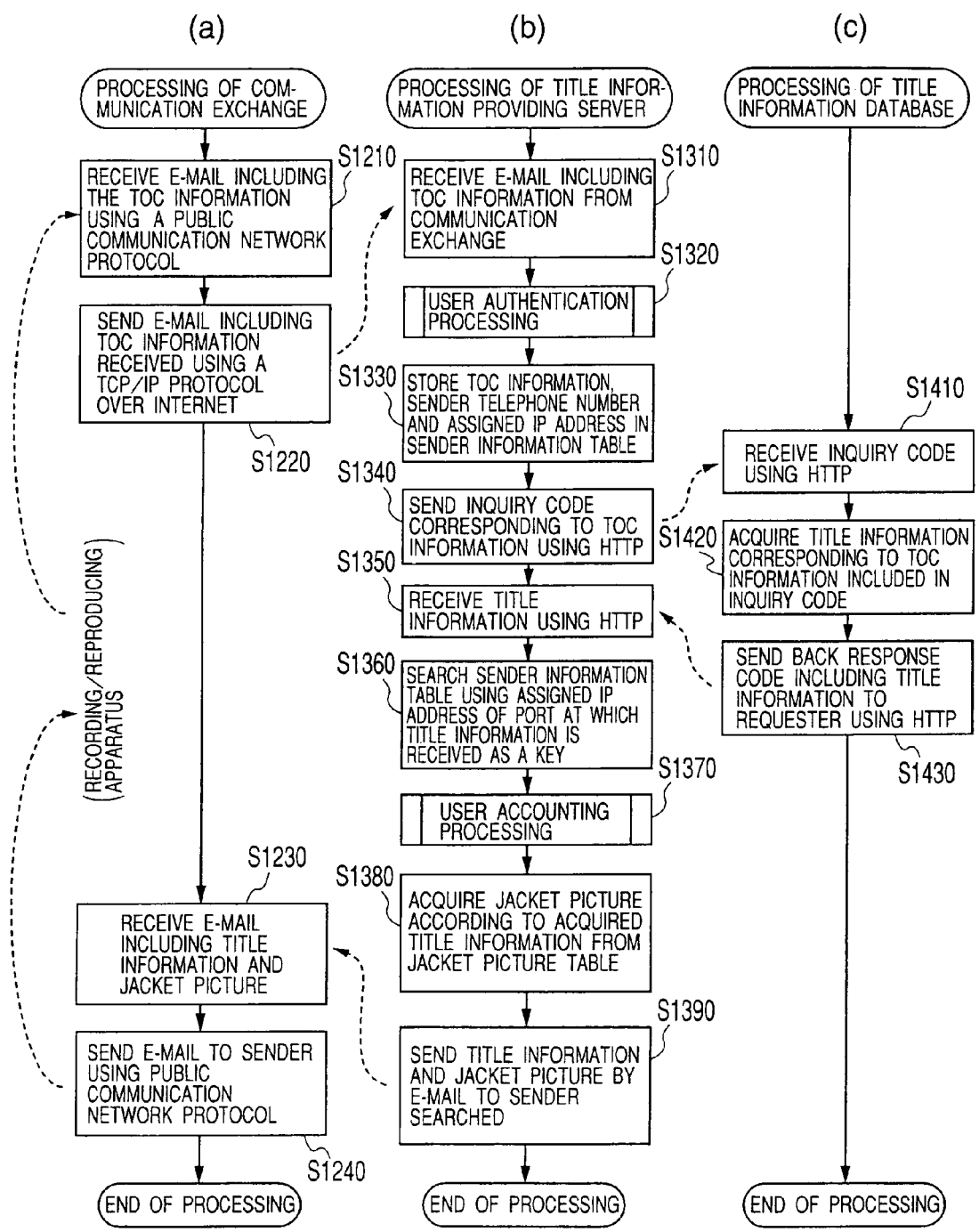
FIG. 7 is a flow chart to illustrate processing by the communication exchange, title information providing server and title information database according to the embodiment of the present invention.

As shown in FIG. 4, the title information providing server 500 is provided with a communication processing section 510, a processing control section 530 and a memory 550.

The communication processing section 510 is made up of a router, etc., controlled by the processing control section 530, communicates and connects with the communication exchange 400 and the title information DB 600 through the Internet INET and transmits/receives data to/from the connection destination.

The processing control section 530 is intended to perform overall control to receive the TOC information sent from the recording/reproducing apparatus 100, send this TOC information to the title information DB 600, receive the title information sent according to this title information and send this to the recording/reproducing apparatus 100. The processing control section 530 is provided with an e-mail reception processing section 531, a user authentication section 534, a user accounting section 537, an inquiry code transmission processing section 540, a response code reception processing section 543 and a reply mail transmission processing section 546.

The e-mail reception processing section 531 receives e-mail sent through the communication exchange 400 and if the e-mail inquires after title information, the mail reception processing section 531 acquires TOC information and sender information included in the e-mail. Then, the e-mail reception processing section 531 passes the TOC information acquired to the inquiry code transmission processing section 540. Furthermore, the e-mail reception processing section 531 passes the sender information acquired together with the TOC information to the user authentication section 534.

The user authentication section 534 authenticates the user who sent the e-mail based on the new sender information delivered from the e-mail reception processing section 531. Then, when the sender is authenticated to be a legal user, the user authentication section 534 stores the sender information delivered together with the TOC information in a sender information table 551 which will be described later.

The user accounting section 537 calculates an accounting sum incident to an inquiry about the title information for the legal user authenticated by the user authentication section 534.

The inquiry code transmission processing section 540 generates an inquiry code based on the TOC information delivered from the e-mail reception processing section 531. Then, the inquiry code transmission processing section 540 sends the inquiry code generated to the title information DB 600 using HTTP.

The response code reception processing section 543 receives the response code sent from the title information DB 600 using HTTP according to the inquiry code sent from the above-described inquiry code transmission processing section 540. Then, the response code reception processing section 543 records the received response code in a title information table 566 which will be described later.

The reply mail transmission processing section 546 creates reply e-mail based on the response code recorded on the title information table 566 and the sender information table 551. Then, the reply mail transmission processing section 546 sends the reply e-mail created to the user who is the sender.

The memory 550 stores a sender information table 551, a user authentication information table 554, a title information table 566, an accounting calculation reference table 557, an accounting sum recording table 560 and a jacket picture table 569 as tables to be referenced or updated by the processing control section 530.

The sender information table 551 is a table to store the sender information acquired by the above-described e-mail reception processing section 531 on the sender who is authenticated by the user authentication section 534 as a legal user and the TOC information of a reproducing CD which is the inquiry target until a reply to the inquiry is completed.

The user authentication information table 554 is a table to prestore information necessary for user authentication and is referenced by the user authentication section 534.

The title information table 566 is a kind of cache that stores the TOC information sent from the recording/reproducing apparatus 100 in association with the title information sent back from the title information DB 600 according to this TOC information. The title information table 566 stores the TOC information and title information until the reply of the title information to the recording/reproducing apparatus 100 which is the sender of the TOC information is completed. This title information table 566 is referenced by the reply mail transmission processing section 546.

The accounting calculation reference table 557 is a table to store information necessary to calculate an accounting sum for the user. More specifically, the accounting calculation reference table 557 prestores the title information from the title information DB 600 in association with the accounting sum about the acquisition of this title information. Furthermore, the accounting calculation reference table 557 also prestores a standard accounting sum when title information which is not prestored is sent. This accounting calculation reference table 557 is referenced by the user accounting section 537.

The accounting sum recording table 560 is a table to store an accounting sum corresponding to the user calculated by the accounting calculation reference table 557 accumulated every certain period of time.

The jacket picture table 569 is a table to prestore TOC information of a typical reproducing CD for which e-mail inquiring about the title information is expected to be sent in association with a jacket picture which is an image representing the appearance of the reproducing CD on sale at stores. This jacket picture table 569 is referenced by the reply mail transmission processing section 546.

The title information DB 600 shown in FIG. 1 searches for a source information database that stores title information using the TOC information received using HTTP as a search key and acquires the title information corresponding to the search key. Then, it sends the acquired title information to the IP address (Internet Protocol Address) assigned to the computer which sent the TOC information.

Then, an operation of the system for transferring title information in the above-described configuration will be explained using FIG. 5 to FIG. 9.

The user copies music composition data recorded on the reproducing CD to a recording MD and when the user wants to get title information, etc., registered in the U-TOC area of the recording MD, the user sets the reproducing CD and recording MD in this recording/reproducing apparatus 100 and operates a predetermined instruction button on the key input section 140.

In response to this operation, the processing control section 110 of the recording/reproducing apparatus 100 starts processes shown in the flow chart of FIG. 5A, accesses the reproducing CD loaded by controlling the signal processing section 120 first and acquires TOC information which becomes identification information to acquire title information from this reproducing CD (step S1010). Then, the processing control section 110 sends the TOC information acquired to the portable phone device 200 through the interface 130 (step S1020).

The portable phone device 200 executes processes shown in the flow chart of FIG. 5B and the processing control section 240 receives the TOC information sent from the recording/reproducing apparatus 100 via the interface 230 (step S1110). Furthermore, the processing control section 240 accesses the memory 280 to acquire the own telephone number (step S1120). The processing control section 240 creates e-mail as shown in FIG. 6 based on the TOC information acquired in steps S1110 and S1120 above and the own telephone number and sends it to the title information providing server 500 through the communication processing section 210 (step S1130).

The communication exchange 400 receives the e-mail including the TOC information sent in step S1130 above through the processes shown in FIG. 7A through the wireless public communication network WNET (step S1210). The communication exchange 400 switches between a public communication network based protocol and a TCP/IP protocol and sends the e-mail received to the title information providing server 500 through the Internet INET (step S1220).

The title information providing server 500 executes processes shown in the flow chart in FIG. 7B and the e-mail reception processing section 531 in the processing control section 530 receives e-mail sent via the Internet INET through the communication processing section 510 (step S1310). Then, the e-mail reception processing section 531 analyzes the content of the e-mail received. When the received e-mail has a content other than an inquiry about the title information, the e-mail reception processing section 531 carries out processing according to the content. On the other hand, when the received e-mail includes the above-described TOC information and has a content requesting a supply of title information, the e-mail reception processing section 531 gives control to the user authentication section 534 (step S1320).

Figure 8:
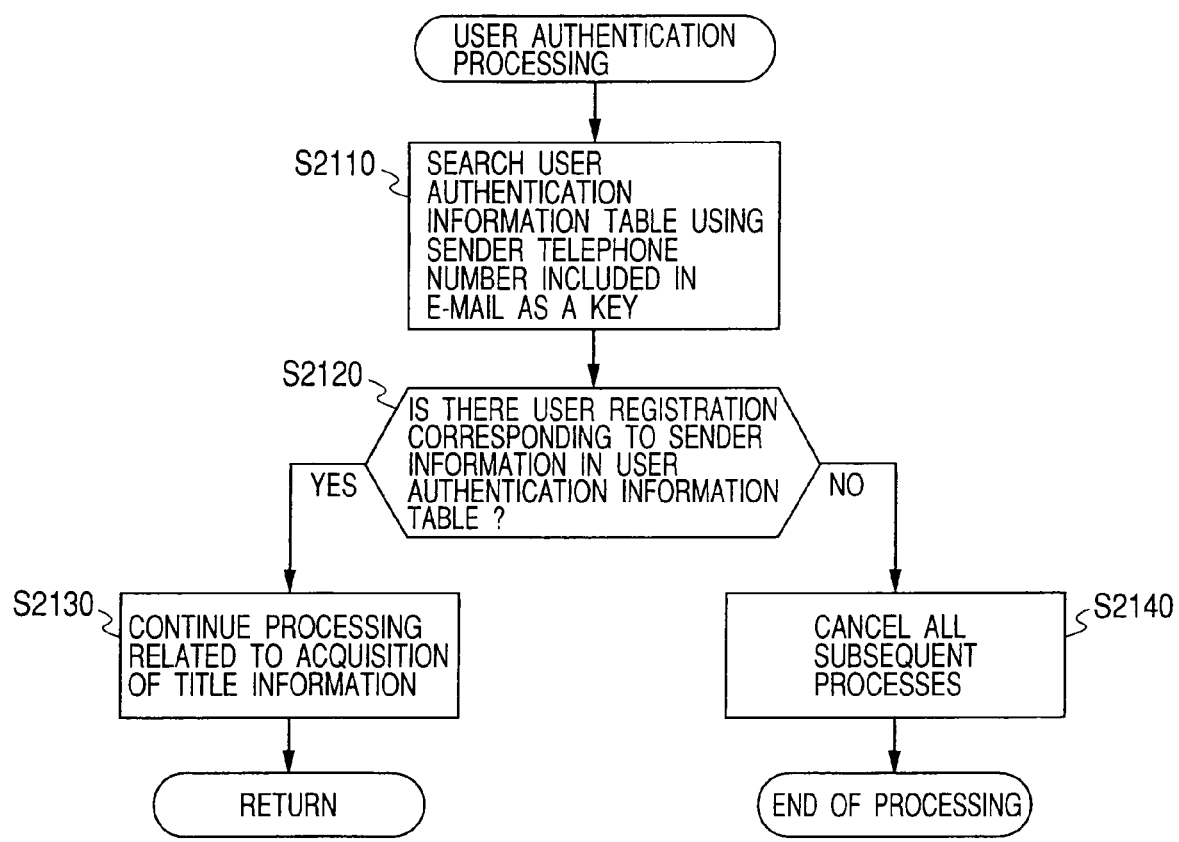
FIG. 8 is a flow chart to illustrate user authentication processing in FIG. 7.

As shown in the flow chart in FIG. 8, the user authentication section 534 searches the user authentication information table 554 in the memory 550 using the telephone number of the sender included in the e-mail for which control is given from the e-mail reception processing section 531 as a key (step S2110). Then, the user authentication section 534 decides whether the user corresponding to the telephone number of the sender is registered in the user authentication information table 554 or not (step S2120). If this decision result shows that the user registration corresponding to the sender telephone number is found, the subsequent processes related to the acquisition of the title information are continued (step S2130). On the other hand, if this decision result shows that the user registration corresponding to the sender telephone number is not found, the subsequent processes related to this sender telephone number are canceled (step S2140).

When the subsequent processes related to the acquisition of the title information are decided to continue as a result of the process by the user authentication section 534, the e-mail reception processing section 531 selects one of IP addresses currently not in use of this title information providing server 500 and stores it together with the TOC information included in the e-mail received and the telephone number of the sender in the sender information table 551 in the memory 550 (FIG. 7B: step S1330). The inquiry code transmission processing section 540 reads TOC information stored in the sender information table 551, creates an inquiry code corresponding to this TOC information and sends this inquiry code from the port to which the selected IP address is assigned to the title information DB 600 using HTTP over the Internet INET (step S1340).

The title information DB 600 receives the inquiry code sent over the Internet INET as shown in the flow chart in FIG. 7C (step S1410). The title information DB 600 searches the database that stores title information using the TOC information included in the inquiry code received as a key and acquires the title information corresponding to the TOC information (step S1420). Then, the title information DB 600 sends the response code including the title information acquired to the IP address of the requester using HTTP over the Internet INET (step S1430).

As shown in FIG. 7B, in the title information providing server 500, the response code reception processing section 543 receives title information in a response code format sent from the title information DB 600 through the communication processing section 510 and temporarily stores the received title information in the title information table 566 in the memory 550 (step S1350). Then, the response code reception processing section 543 searches the telephone number of the sender from the sender information table 551 in the memory 550 using the IP address assigned to the port that receives the title information as a key (step S1360). The response code reception processing section 543 notifies the user accounting section 537 of the searched telephone number of the sender (step S1370).

Figure 9:
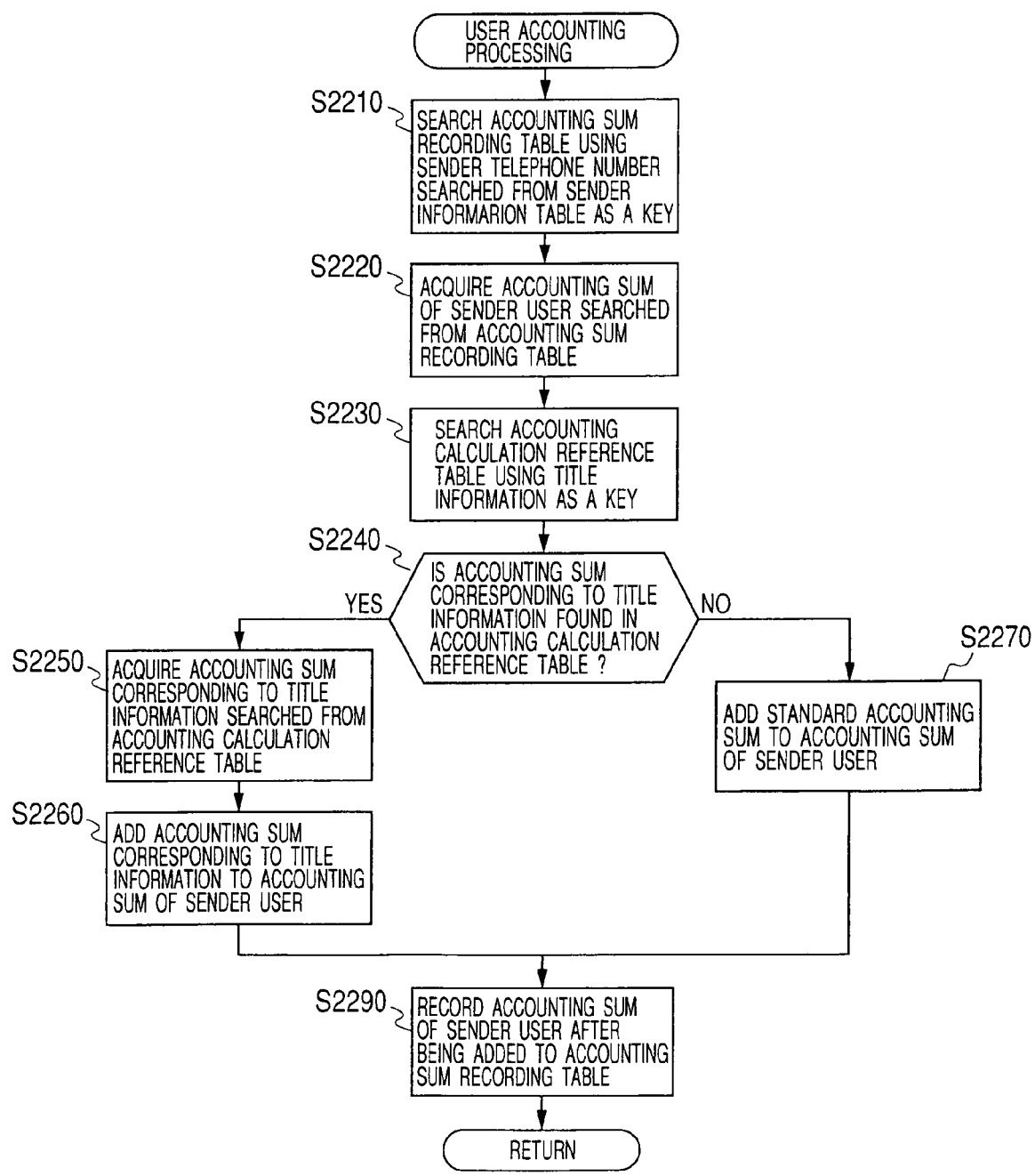
FIG. 9 is a flow chart to illustrate user accounting processing in FIG. 7.

As shown in the flow chart in FIG. 9, the user accounting section 537 searches the accounting sum recording table 560 in the memory 550 using the telephone number of the sender as a key (step S2210) and acquires the accounting sum of the user (user who requests the title information) identified by the telephone number of the sender, that is, the portable phone device 200 from the accounting sum recording table 560 (step S2220).

Then, the user accounting section 537 searches the accounting calculation reference table 557 in the memory 550 using the title information as a key (step S2230) and divides the processing depending on whether the accounting sum corresponding to the title information is found in the accounting calculation reference table 557 or not (step S2240).

When the accounting sum corresponding to the title information is found in the accounting calculation reference table 557, the user accounting section 537 acquires the accounting sum corresponding to the searched title information (step S2250) and adds this accounting sum to the accounting sum of the sender user already acquired in step S2220 (step S2260). On the other hand, when the accounting sum corresponding to the title information is not found in the accounting calculation reference table 557, the user accounting section 537 acquires a predetermined standard accounting sum from the accounting calculation reference table 557 and adds it to the accounting sum of the sender user (step S2270).

In both cases, the user accounting section 537 records the accounting sum of the sender user after the addition in the accounting sum recording table 560 (step S2290).

After the completion of or in synchronization with the process by the user accounting section 537, the reply mail transmission processing section 546 reads the title information temporarily stored in the title information table 566, references the jacket picture table 569 in the memory 550 and acquires the jacket picture corresponding to the title information read (step S1380). Then, the reply mail transmission processing section 546 creates e-mail containing the title information and jacket picture directed to the user who is specified through the search of the sender information table 551 and sends this e-mail (step S1390).

The communication exchange 400 receives the e-mail sent from the title information providing server 500 via the Internet INET (step S1230), switches between the TCP/IP protocol and the public communication based protocol and sends the received e-mail to the portable phone device 200 of the sender through the wireless public communication network WNET (step S1240).

As shown in the flow chart in FIG. 5B, in the portable phone device 200, the processing control section 240 receives the e-mail sent from the communication exchange 400 via the communication processing section 210 (step S1150). Then, the processing control section 240 sends the title information included in the e-mail received to the recording/reproducing apparatus 100 via the interface 230 and cable CA (step S1160). On the other hand, the processing control section 240 records the jacket picture included in the e-mail received in the jacket picture table in the memory 280 and controls the display section 250 to display the image according to the jacket picture (step S1170).

As shown in the flow chart in FIG. 5A, in the recording/reproducing apparatus 100, the processing control section 110 receives the title information sent from the portable phone device 200 via the interface 130 (step S1030). Then, the processing control section 110 controls the reproducing/recording section 170 and DAC 180 to register the title information received in the U-TOC area of the recording MD loaded (step S1040).

With the above-described configuration and operation, it is possible to simply acquire the title information from the title information DB 600 by combining the recording/reproducing apparatus 100 and portable phone device 200 without using a personal computer, etc. Moreover, the title information acquired can be recorded automatically together with the music composition data on the recording MD loaded.

When the title information is acquired, the existing portable phone device 200 can be used and it is a wireless communication device, and therefore it is possible to increase the degree of freedom about the place where the recording/reproducing apparatus 100 is installed. Furthermore, even if the recording/reproducing apparatus 100 and the title information DB 600 have different communication systems, communication systems are converted by the portable phone device 200, communication exchange 400 and title information providing server 500, and therefore it is possible to acquire the title information from the title information DB 600.

Moreover, it is possible to acquire the title information as well as a specific jacket picture corresponding to this title information and display this jacket picture on the display section 250 of the portable phone device 200. Furthermore, it is possible to calculate and record the value corresponding to the supply of the title information according to the music composition data in the reproducing CD.

Second Embodiment

In the system for transferring title information according to the first embodiment, the recording/reproducing apparatus 100 that records data on a recording MD and the portable phone device 200 that performs high frequency wireless communications are used, connected quite close to each other. However, if strong high frequency wireless waves caused by magnetism are transmitted at close range during recording, it is conceivable that noise or a noise signal could be mixed into the data being recorded due to the magnetism. Hereunder, an example of a system for transferring title information taking this into consideration will be explained.

First, a system for transferring title information which gives priority to recording data on a recording medium loaded in a recording/reproducing apparatus 100 will be explained.

The system for transferring title information according to this embodiment is provided with a recording/reproducing apparatus 100, a portable phone device 200, a communication exchange 400, a title information providing server 500 and a title information DB 600, and the rest of the configuration is also the same as that of the above-described first embodiment.

Operations of the communication exchange 400, title information providing server 500 and title information DB 600 out of the components of the system for transferring title information are the same as those of the first embodiment.

Figure 10:
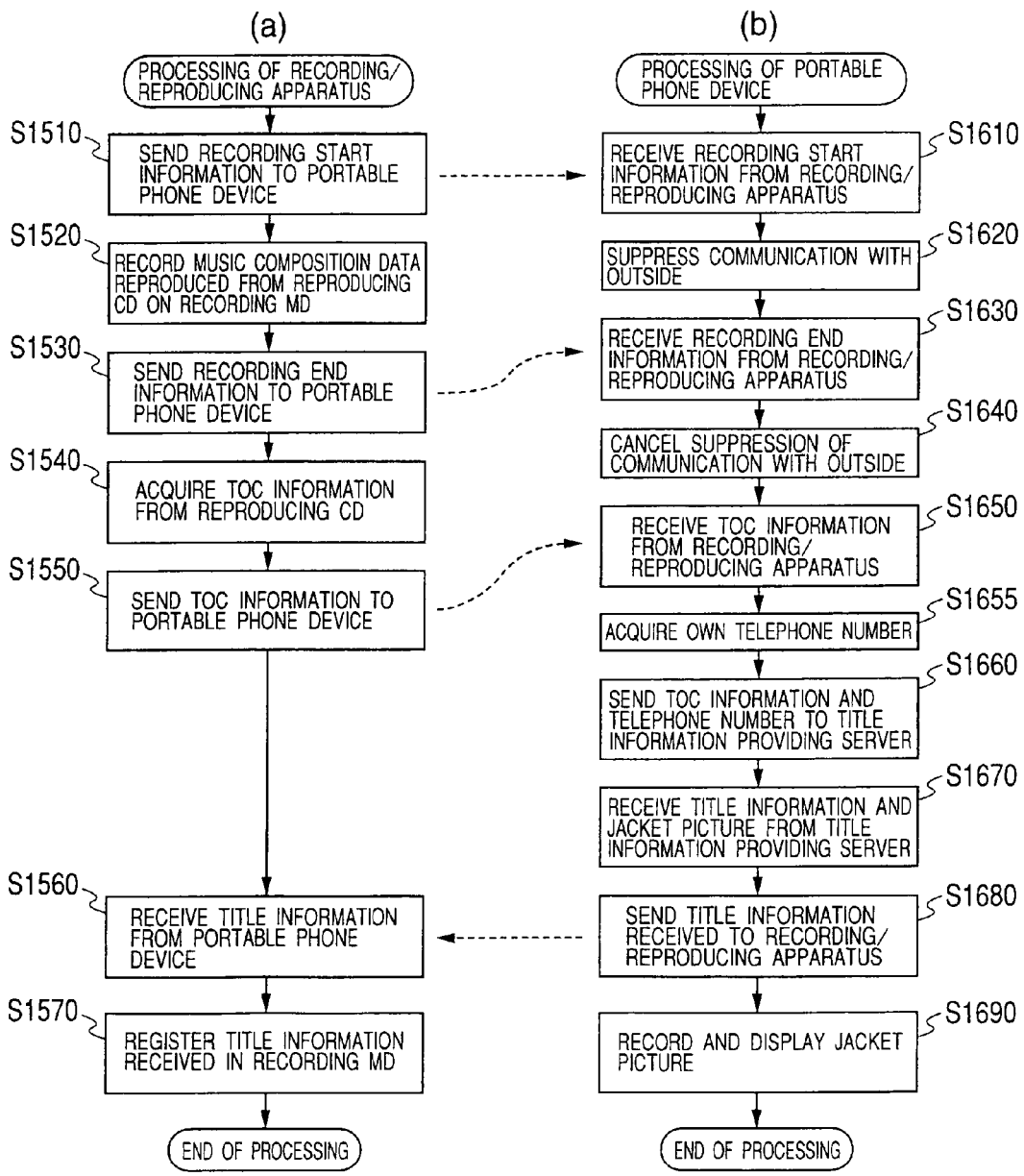
FIG. 10 is a flow chart to illustrate processing by a recording/reproducing apparatus and portable phone device according to a second embodiment of the present invention.

Thus, the operations of the recording/reproducing apparatus 100 and portable phone device 200 will be explained mainly using FIG. 10.

Prior to the recording to a recording MD, a processing control section 110 of the recording/reproducing apparatus 100 sends recording start information to the portable phone device 200 through the interface 130 (step S1510). A processing control section 240 of the portable phone device 200 receives the recording start information from the recording/reproducing apparatus 100 through the interface 230 (step S1610) and suppresses communications with the outside immediately after the reception (step S1620).

More specifically, upon reception of the recording start information, a power supply control section 241 of the portable phone device 200 completely shuts off a power supply from a power supply section 220 and thereby totally suppresses the own functions. Or upon reception of the recording start information, the power supply control section 241 of the portable phone device 200 sets power supply flag information in a memory 280 to "suppress transmission/reception" to shut off a power supply to a communication processing section 210 and thereby suppresses communications while processing not involving communications remains executable.

After sending the above-described recording start information, the processing control section 110 of the recording/reproducing apparatus 100 reproduces music composition data from a reproducing CD such as a CD sequentially and records the reproduced music composition data on a recording MD (step S1520). Since the portable phone device 200 suppresses a communication with the outside during this recording, there is no possibility that noise from high frequency radio waves of the portable phone device 200 will mix into the music composition data recorded on the recording MD.

After a while when the recording of the reproduced music composition data on the recording MD is completed, the processing control section 110 of the recording/reproducing apparatus 100 sends recording end information to the portable phone device 200 through an interface 130 (step S1530). The processing control section 240 of the portable phone device 200 receives the recording end information from the recording/reproducing apparatus 100 through the interface 230 (step S1630) and cancels the suppression of communications with the outside immediately after the reception (step S1640).

More specifically, upon reception of the recording end information, the power supply control section 241 of the portable phone device 200 resumes the supply of the power from the power supply section 220 to all components and thereby totally recovers the own functions.

After step S1640, the recording/reproducing apparatus 100 and the portable phone device 200 proceed with the same processing as that shown above in FIG. 5. That is, the recording/reproducing apparatus 100 accesses the reproducing CD loaded such as a CD and acquires identification information such as TOC information from this reproducing CD (step S1540). Then, the recording/reproducing apparatus 100 sends the TOC information acquired to the portable phone device 200 (step S1550).

The portable phone device 200 receives the TOC information sent from the recording/reproducing apparatus 100 (step S1650). Furthermore, the portable phone device 200 acquires the own telephone number (step S1655). Then, the portable phone device 200 sends the TOC information and telephone number to the title information providing server 500 via a wireless public communication network WNET (step S1660).

After a while, the portable phone device 200 receives title information and a jacket picture from the title information providing server 500 (step S1670). Then, the portable phone device 200 sends the title information of the two to the recording/reproducing apparatus 100 (step S1680). On the other hand, the portable phone device 200 records and displays the jacket picture (step S1690).

The recording/reproducing apparatus 100 receives the title information sent from the portable phone device 200 (step S1560). Then, the recording/reproducing apparatus 100 records the received title information on the recording MD loaded (step S1570).

With the above-described configuration and operation, it is possible to prevent noise from mixing into the recording caused by magnetism entailed in a wireless communication through the portable phone device 200 in addition to the effect of the aforementioned first embodiment.

Third Embodiment

Then, a system for transferring title information that gives priority to a wireless communication through the portable phone device 200 will be explained.

The system for transferring title information according to this embodiment is provided with a recording/reproducing apparatus 100, a portable phone device 200, a communication exchange 400, a title information providing server 500 and a title information DB 600, and the rest of the configuration is also the same as that of the first embodiment and the second embodiment.

Operations of the communication exchange 400, title information providing server 500 and title information DB 600 out of the components of the system for transferring title information are the same as those of the first embodiment.

Figure 11:
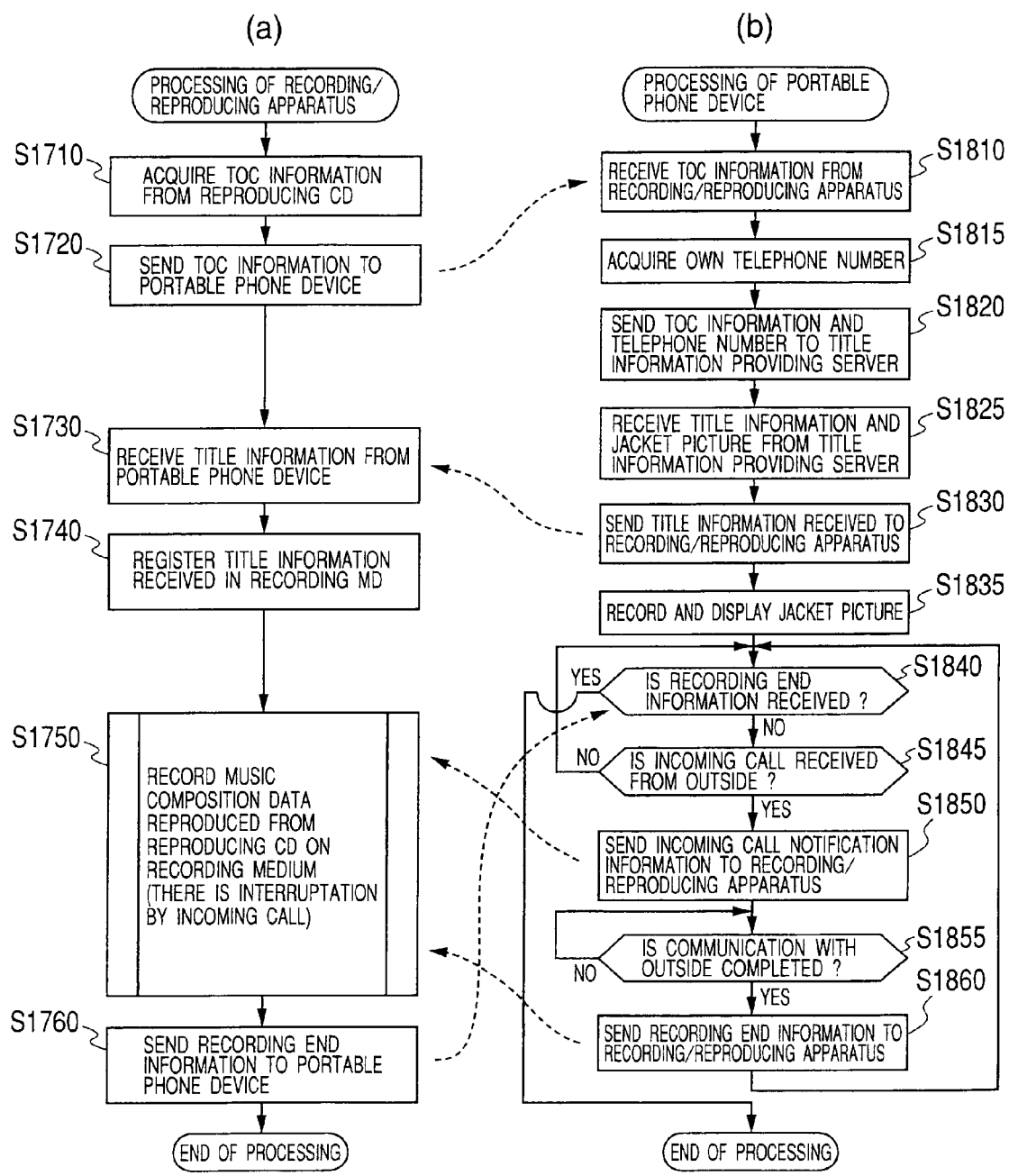
FIG. 11 is a flow chart to illustrate processing by a recording/reproducing apparatus and portable phone device according to a third embodiment of the present invention.

Thus, the operations of the recording/reproducing apparatus 100 and portable phone device 200 will be explained mainly using FIG. 11 and FIG. 12.

The recording/reproducing apparatus 100 accesses a reproducing CD loaded such as a CD and acquires TOC information from this reproducing CD (step S1710). Then, the recording/reproducing apparatus 100 sends the TOC information acquired to the portable phone device 200 (step S1720).

The portable phone device 200 receives the TOC information sent from the recording/reproducing apparatus 100 (step S1810). Furthermore, the portable phone device 200 acquires the own telephone number (step S1815). Then, the portable phone device 200 sends the TOC information and telephone number to the title information providing server 500 via a wireless public communication network WNET (step S1820).

After a while, the portable phone device 200 receives title information and a jacket picture from the title information providing server 500 (step S1825). Then, the portable phone device 200 sends the title information of the two to the recording/reproducing apparatus 100 (step S1830). On the other hand, the portable phone device 200 records and displays the jacket picture (step S1835).

The recording/reproducing apparatus 100 receives the title information sent from the portable phone device 200 (step S1730). Then, the recording/reproducing apparatus 100 records the received title information on a recording MD loaded (step S1740).

After the acquisition of the title information is completed through the processes so far, the recording/reproducing apparatus 100 executes a process of recording music composition data which may be interrupted by an incoming call to the portable phone device 200 (step S1750). On the contrary, the portable phone device 200 monitors incoming calls from the outside and executes a process of stopping the recording process by the recording/reproducing apparatus 100 (steps S1840 to S1860).

That is, a processing control section 240 of the portable phone device 200 continues a process of temporarily stopping the recording by the recording/reproducing apparatus 100 when there is an incoming call from the outside until recording end information is received from the recording/reproducing apparatus 100 via an interface 230 (step S1840). Then, when there is an incoming call from the outside (step S1845: Yes), the processing control section 240 sends incoming call notification information to the recording/reproducing apparatus 100 via the interface 230 (step S1850).

Figure 12:
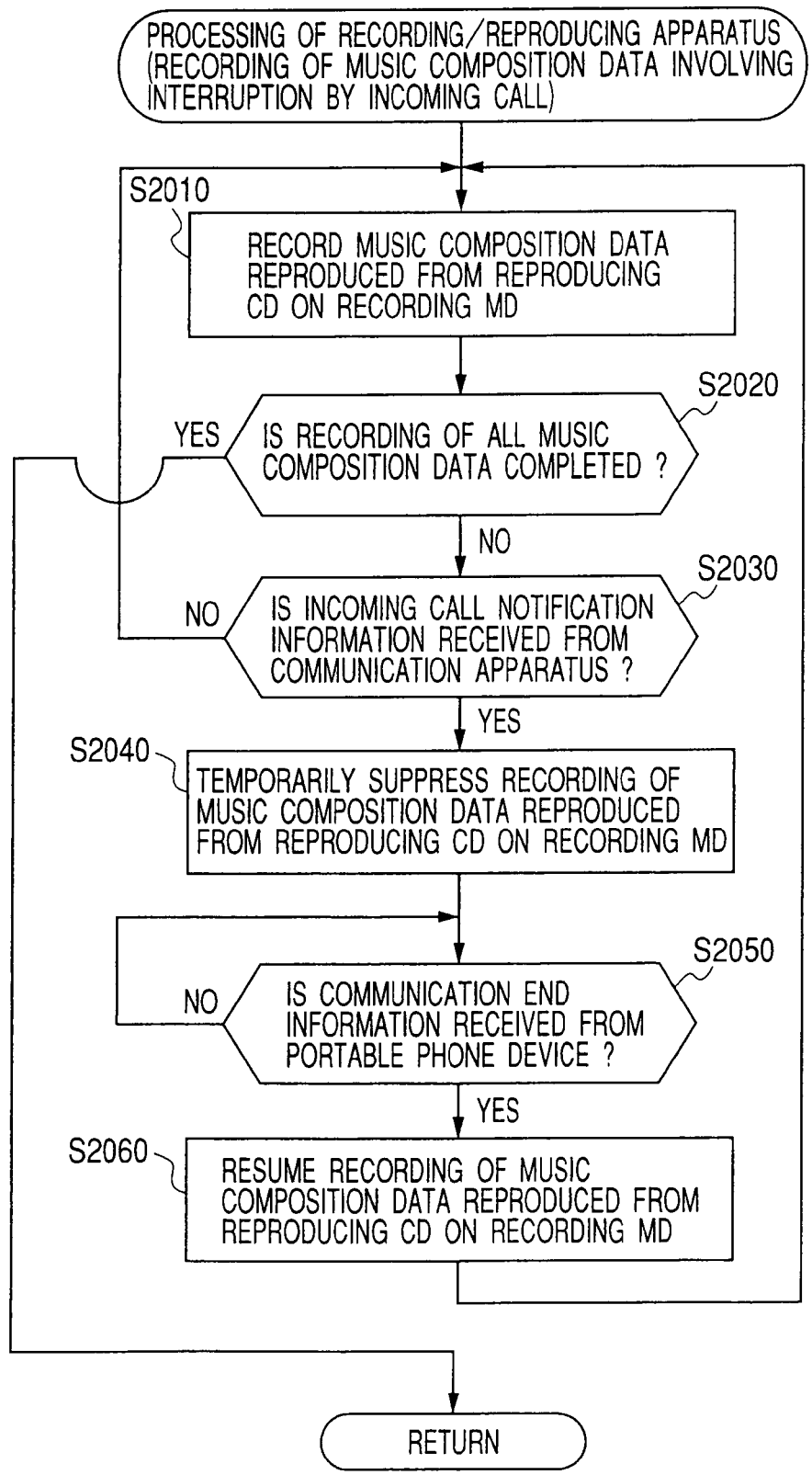
FIG. 12 is a flow chart to illustrate recording processing involving interruption by an incoming call in FIG. 11.

A processing control section 110 of the recording/reproducing apparatus 100 records music composition data reproduced from the reproducing CD loaded on a recording MD (step S2010), as shown in FIG. 12. Then, until the recording of all music composition data is completed (step S2020), the processing control section 110 continues to monitor the incoming call notification information or communication end information sent from the portable phone device 200 via an interface 130.

Upon reception of the incoming call notification information from the portable phone device 200 via the interface 130 (step S2030: Yes), the processing control section 110 temporarily suppresses the recording of the music composition data on the recording MD (step S2040). Then, the processing control section 110 continues to monitor the reception of the communication end information from the portable phone device 200 (step S2050).

The processing control section 240 of the portable phone device 200 continues to monitor whether the communication with the outside corresponding to the incoming call detected in step S1845 is completed or not (step S1855). Then, when the communication with the outside is completed, the processing control section 240 sends communication end information to the recording/reproducing apparatus 100 via the interface 230 (step S1860).

When the communication end information is received from the portable phone device 200 via the interface 130 (step S2050: Yes), the processing control section 110 of the recording/reproducing apparatus 100 resumes the recording of the music composition data on the recording MD (step S2060).

After the above-described processing is continued and the process of recording the music composition data in step S1750 is completed, the processing control section 110 of the recording/reproducing apparatus 100 sends the recording end information to the portable phone device 200 (step S1760). Upon reception of the recording end information from the recording/reproducing apparatus 100 (step S1840: Yes), the processing control section 240 of the portable phone device 200 ends the process of temporarily stopping the recording by the recording/reproducing apparatus 100 if there is any incoming call from the outside.

In addition to the effects of the aforementioned first and second embodiments, this embodiment with the above-described configuration and operation ensures that an incoming call from the outside is received.

Fourth Embodiment

All the above-described three types of system for transferring title information connect the portable phone device 200 to the recording/reproducing apparatus 100 via a signal cable CA and connect the recording/reproducing apparatus 100 and the communication exchange 400 via this portable phone device 200 and the wireless public communication network WNET. However, the connection mode for connecting the recording/reproducing apparatus 100 to the communication exchange 400 is not limited to this alone. Hereunder, a system for transferring title information with a different connection mode will be explained.

First, a system for transferring title information in which all components from the recording/reproducing apparatus 100 to the communication exchange 400 are connected via cables will be explained.

Figure 13:
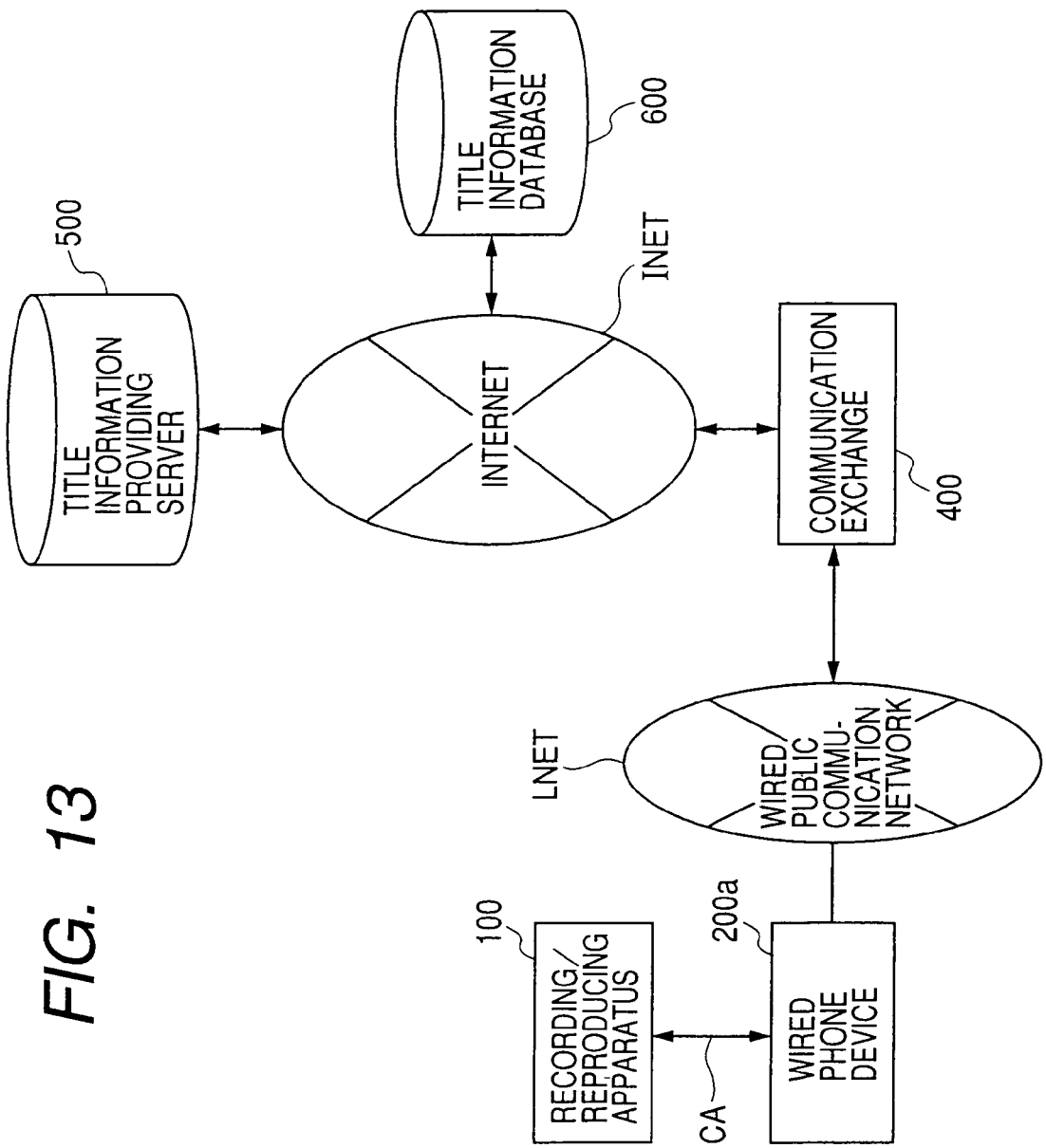
FIG. 13 is a block diagram showing a configuration example of a system for transferring title information according to a fourth embodiment of the present invention.

As shown in FIG. 13, the system for transferring title information according to this embodiment is provided with a recording/reproducing apparatus 100, a wired phone device 200a, a communication exchange 400, a title information providing server 500 and a title information DB 600. Then, the wired phone device 200a and the communication exchange 400 are connected via a wired public communication network LNET. Furthermore, the communication exchange 400, title information providing server 500 and title information DB 600 are connected via the Internet INET. Furthermore, the recording/reproducing apparatus 100 and wired phone device 200a are connected via a signal cable CA.

Figure 14:
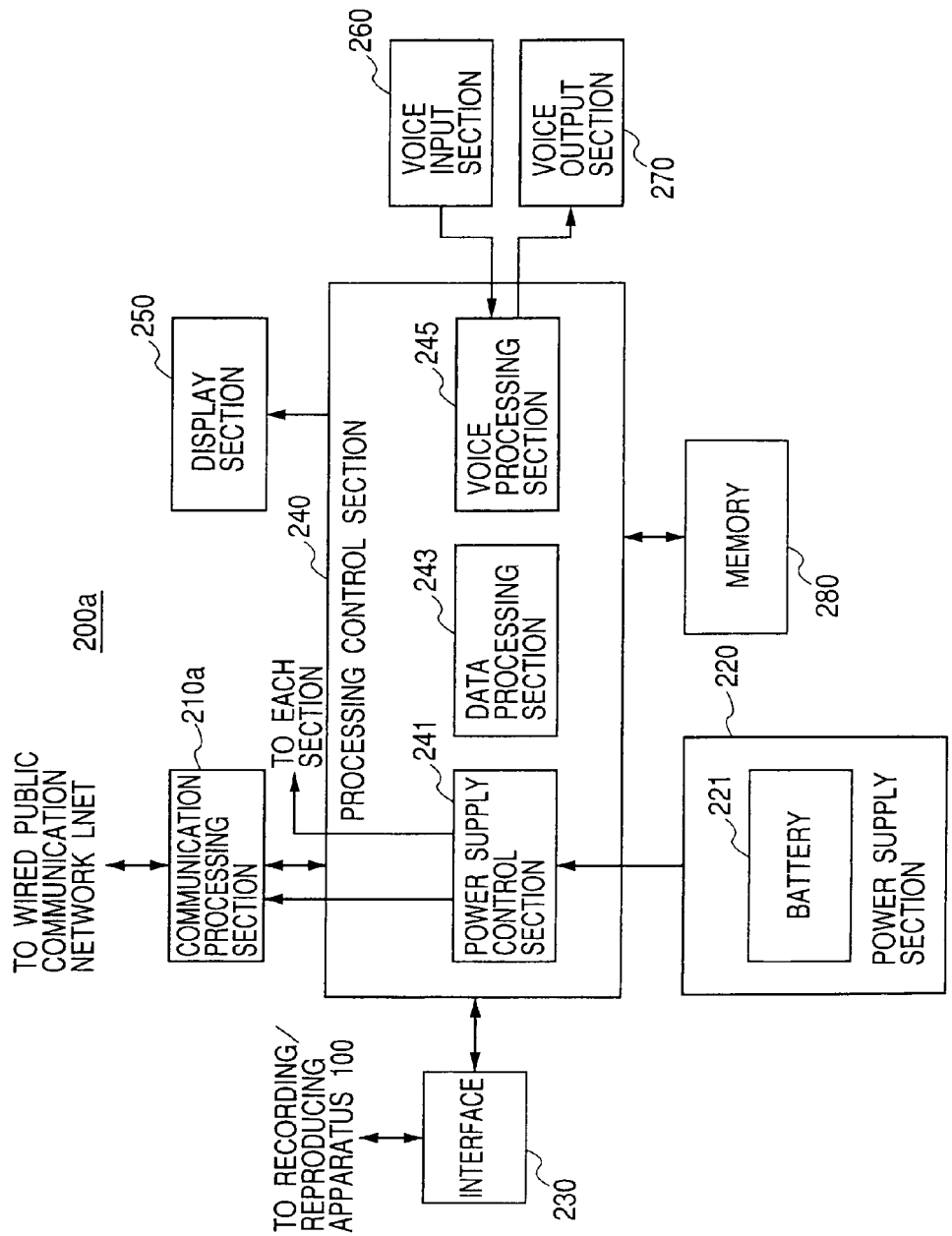
FIG. 14 is a block diagram showing a configuration example of a portable phone device in FIG. 1 and FIG. 3.

The wired phone device 200a is constructed of a widespread wired subscriber telephone, etc., and its internal configuration is the same as that of the above-described embodiment except that a communication processing section 210a corresponding to the wired public communication network LNET is provided instead of the communication processing section 210 corresponding to the wireless public communication network, as shown in FIG. 14.

Therefore, the operation of the system for transferring title information of this embodiment is the same as that of the above-described embodiment.

With the above-described configuration and operation, title information can be easily acquired from the title information DB 600 by combining the recording/reproducing apparatus 100 and wired phone device 200a without using a personal computer, etc. Further, the title information acquired can be automatically recorded together with music composition data on a recording MD loaded.

Furthermore, the existing wired phone device 200a can be used to acquire the title information. Moreover, even if the recording/reproducing apparatus 100 and title information DB 600 have different communication systems, communication systems are converted by the wired phone device 200a, communication exchange 400 and title information providing server 500, and therefore it is possible to acquire the title information from the title information DB 600.

It is further possible to acquire not only the title information but also a specific jacket picture corresponding to this title information and display this jacket picture on the display section 250 of the wired phone device 200a. Furthermore, it is possible to calculate and record the value corresponding to the supply of the title information according to the music composition data in the reproducing CD.

Fifth Embodiment

Next, a system for transferring title information which corresponds to the system for transferring title information of the above-described fourth embodiment with the mode of connection between the recording/reproducing apparatus 100 and wired phone device 200a changed to a wireless connection mode will be explained.

Figure 15:
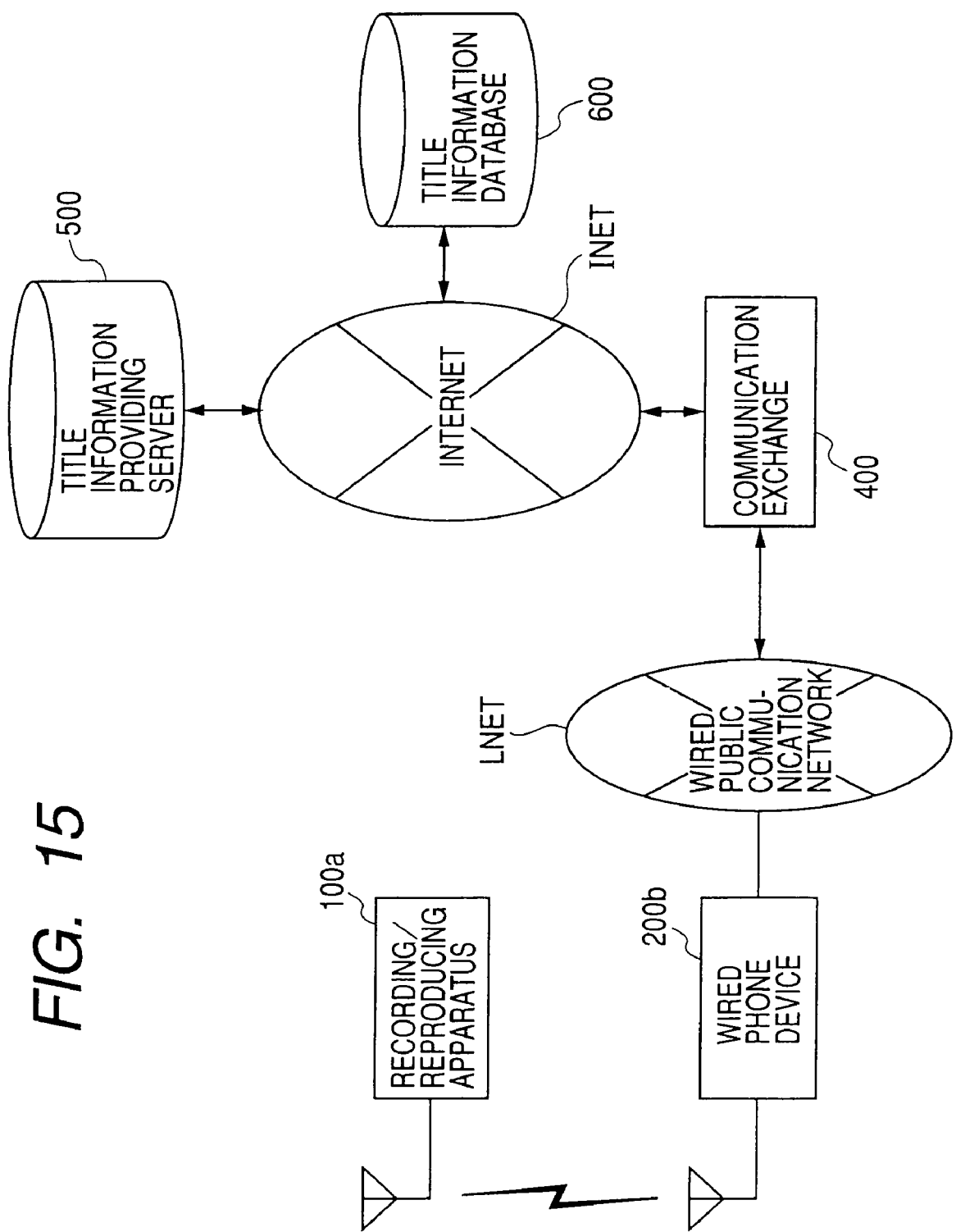
FIG. 15 is a block diagram showing a configuration example of a system for transferring title information according to a fifth embodiment of the present invention.

As shown in FIG. 15, the system for transferring title information according to this embodiment is provided with a recording/reproducing apparatus 100a, a wired phone device 200b, a communication exchange 400, a title information providing server 500 and a title information DB 600. Then, the wired phone device 200b and the communication exchange 400 are connected via a wired public communication network LNET. Furthermore, the communication exchange 400, title information providing server 500 and title information DB 600 are connected via the Internet INET. Furthermore, the recording/reproducing apparatus 100a and wired phone device 200b are connected via a wireless interface such as Bluetooth, IrDA (Infrared Data Association), IEEE 802.11 (Institute of Electronic and Electronics Engineers 802.11) and HomeRF (Home Radio Frequency).

Figure 16:
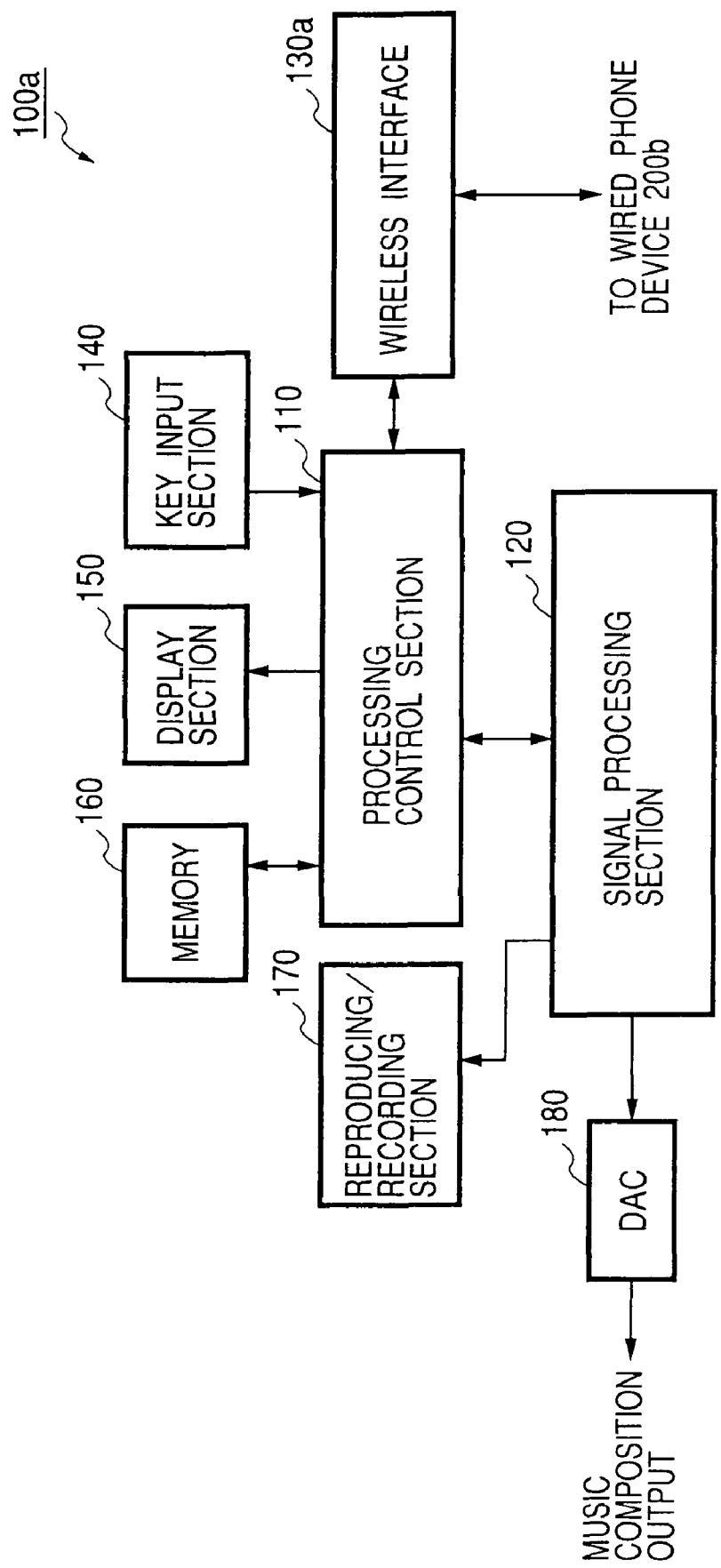
FIG. 16 is a block diagram showing a configuration example of a recording/reproducing apparatus in FIG. 15.

As shown in FIG. 16, the recording/reproducing apparatus 100a is the same as that of the above-described embodiments except that a wireless interface 130a is provided instead of the interface 130 applicable to a signal cable CA.

Figure 17:
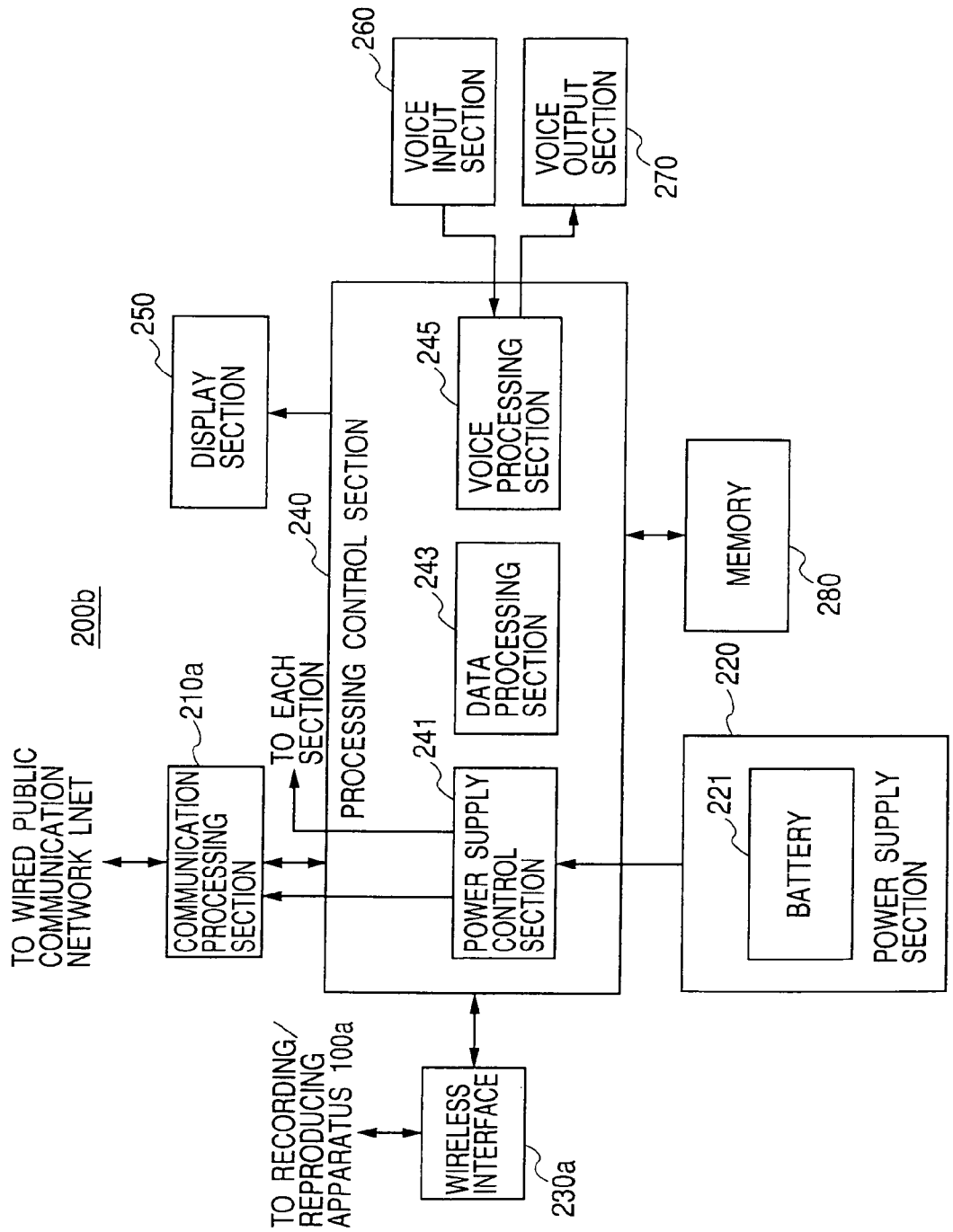
FIG. 17 is a block diagram showing a configuration example of a portable phone device in FIG. 15.

As shown in FIG. 17, the wired phone device 200b is the same as that of the above-described fourth embodiment except that a wireless interface 230a is provided instead of the interface 230 applicable to a signal cable CA.

Therefore, the operation of the system for transferring title information according to this embodiment is the same as that of the above-described embodiments.

With the above-described configuration and operation, title information can be easily acquired from the title information DB 600 by combining the recording/reproducing apparatus 100 and wired phone device 200b without using a personal computer, etc. On top of it, the title information acquired can be automatically recorded together with music composition data on a recording MD loaded.

Furthermore, the existing wired phone device 200b can be used to acquire title information. Furthermore, since the recording/reproducing apparatus 100a and wired phone device 200b are connected via a wireless interface, the degree of freedom with respect to the place where the recording/reproducing apparatus 100a is installed can be increased. Moreover, even if the recording/reproducing apparatus 100a and title information DB 600 have different communication systems, communication systems are converted by the wired phone device 200b, communication exchange 400 and title information providing server 500, and therefore it is possible to acquire the title information from the title information DB 600.

Furthermore, it is further possible to acquire not only the title information but also a specific jacket picture corresponding to this title information and display this jacket picture on the display section 250 of the wired phone device 200b. Furthermore, it is possible to calculate and record the value corresponding to the supply of the title information according to the music composition data in the reproducing CD.

Sixth Embodiment

All the above-described five types of system for transferring title information have adopted a configuration using an existing communication apparatus such as a portable phone device and wired phone device between a recording/reproducing apparatus and a public communication network. However, it is also possible to adopt a configuration directly connecting a recording/reproducing apparatus provided with functions of a communication apparatus to a public communication network without any existing communication apparatus. A system for transferring title information using a recording/reproducing apparatus provided with functions of a communication apparatus will be explained below.

Figure 18:
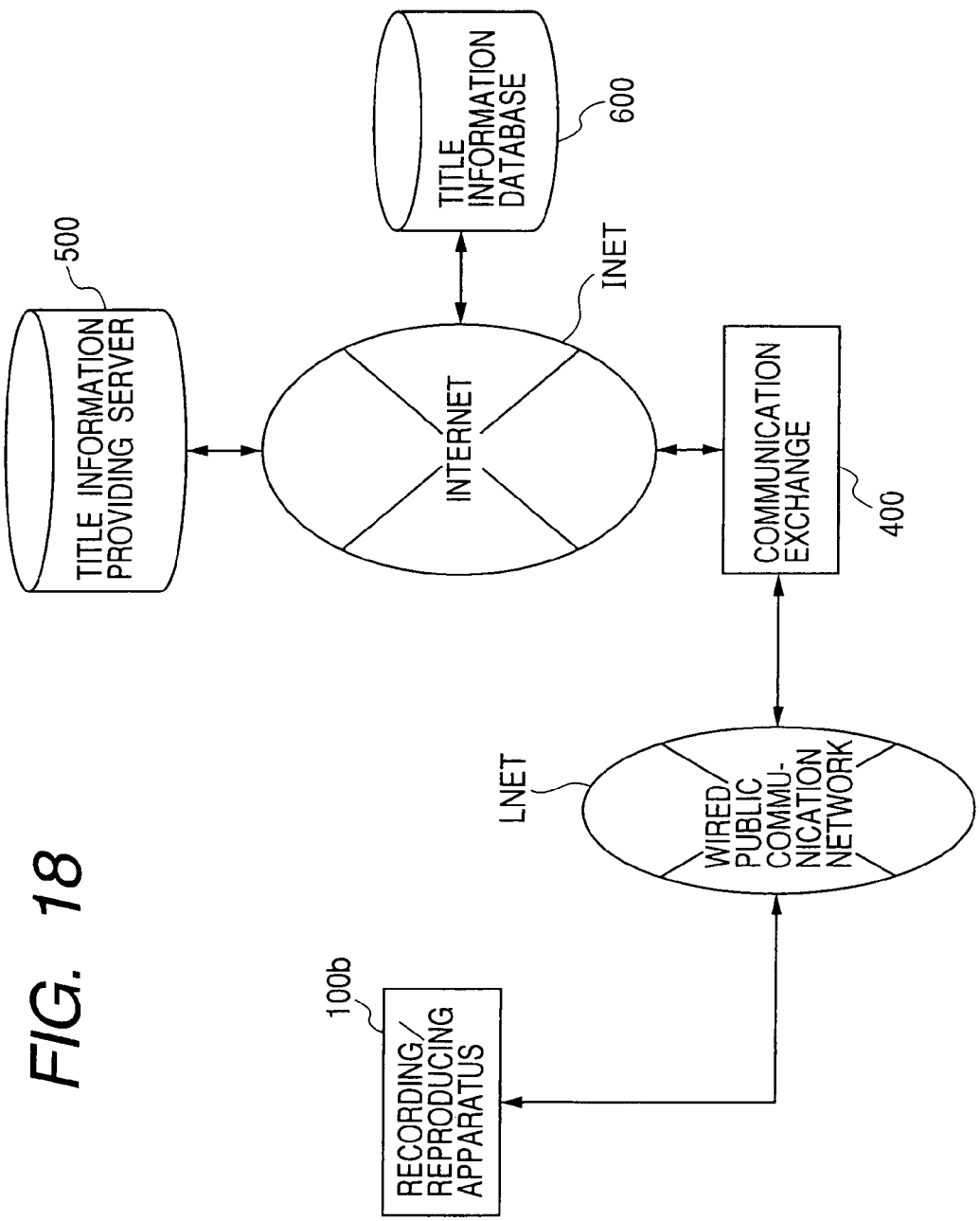
FIG. 18 is a block diagram showing a configuration example of a system for transferring title information according to a sixth embodiment of the present invention.

As shown in FIG. 18, the system for transferring title information according to this embodiment is provided with a recording/reproducing apparatus 100b provided with functions of a communication apparatus, a communication exchange 400, a title information providing server 500 and a title information DB 600. Then, the recording/reproducing apparatus 100b and the communication exchange 400 are connected via a wired public communication network LNET. Furthermore, the communication exchange 400, title information providing server 500 and title information DB 600 are connected via the Internet INET.

The operation of the system for transferring title information according to this embodiment is also the same as that of the above-described embodiment.

With the above-described configuration and operation, title information can be easily acquired from the title information DB 600 by the recording/reproducing apparatus 100b provided with functions of a communication apparatus without using a personal computer, etc. On top of it, the title information acquired can be automatically recorded together with music composition data on a recording MD loaded.

Moreover, even if the recording/reproducing apparatus 100b and title information DB 600 have different communication systems, communication systems can be converted by the communication exchange 400 and title information providing server 500, and therefore it is possible to acquire the title information from the title information DB 600.

Furthermore, it is possible to calculate and record the value corresponding to the supply of the title information according to the music composition data in the reproducing CD.

Seventh Embodiment

All the above-described six types of system for transferring title information have described the case where title information, etc., is acquired from the title information DB 600 when recording music composition data from a reproducing CD on a recording MD. However, it is possible to acquire title information, etc., during not only recording but also reproduction. Hereunder, a system for transferring title information that acquires title information, etc., during reproduction will be explained.

Figure 19:
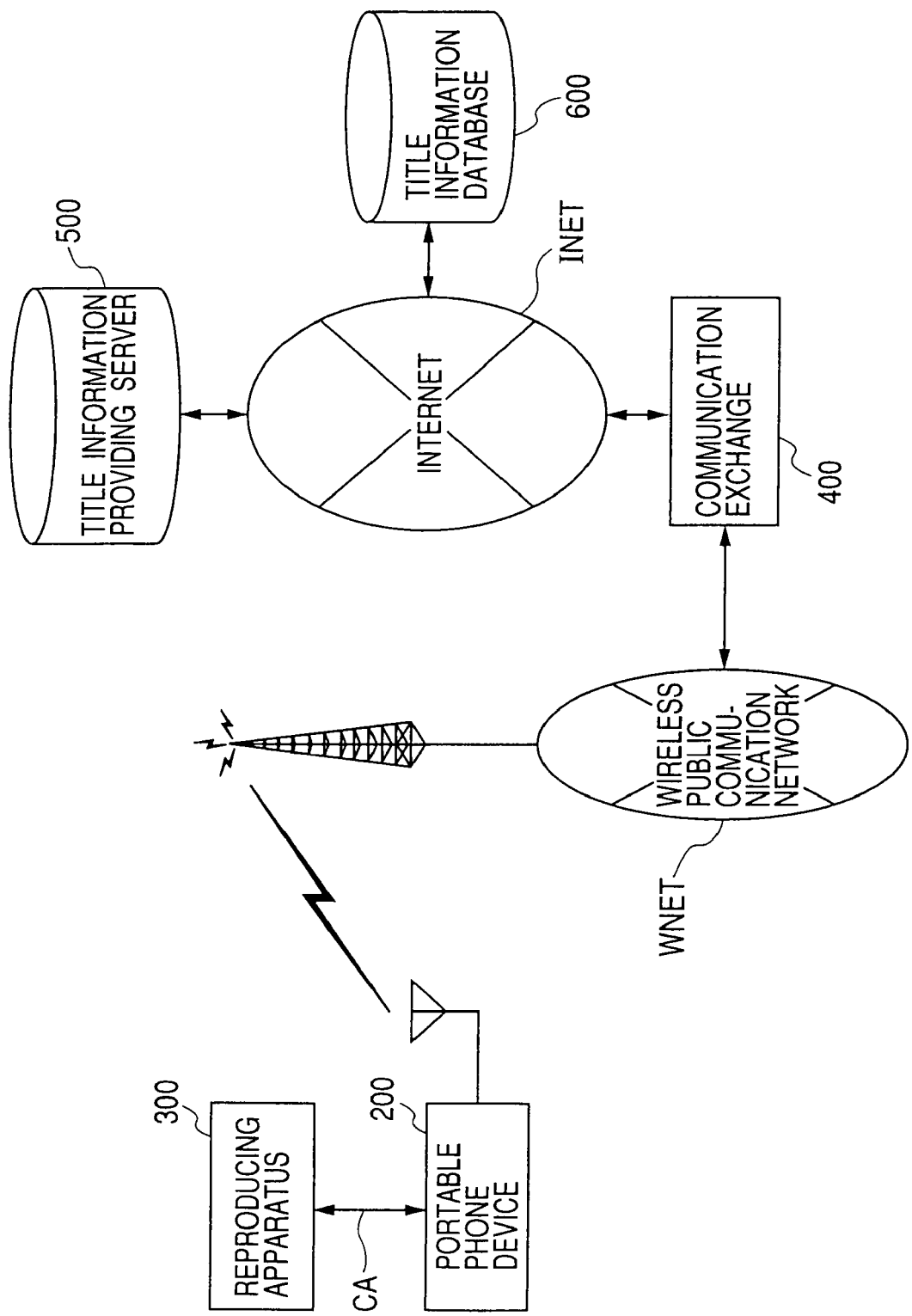
FIG. 19 is a block diagram showing a configuration example of a system for transferring title information according to a seventh embodiment of the present invention.

As shown in FIG. 19, the system for transferring title information according to this embodiment is provided with a reproducing apparatus 300, a portable phone device 200, a communication exchange 400, a title information providing server 500 and a title information DB 600.

The portable phone device 200, the communication exchange 400, the title information providing server 500 and the title information DB 600 have the same configuration as that of the first to third embodiments shown in FIG. 1.

Figure 20:
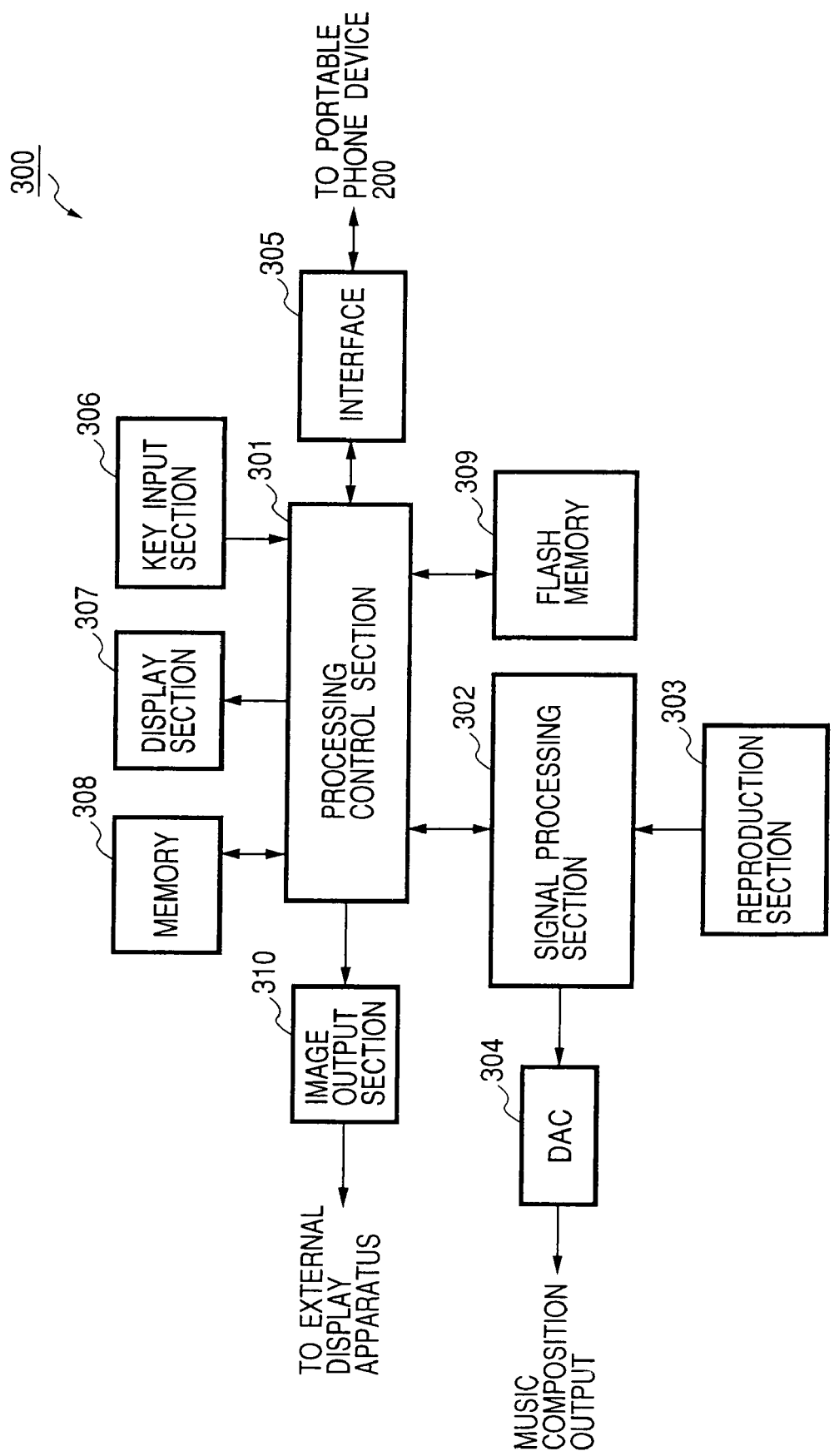
FIG. 20 is a block diagram showing a configuration example of a reproducing apparatus in FIG. 19.

The reproducing apparatus 300 is a device to reproduce music composition data from a reproducing CD (music CD, etc.) loaded and connected to a wireless phone device 200 through a signal cable CA. As shown in FIG. 20, this reproducing apparatus 300 is constructed of a processing control section 301, a signal processing section 302, a reproduction section 303, a DAC 304, an interface 305, a key input section 306, a display section 307, a memory 308, a flash memory 309 and an image output section 310.

The processing control section 301 is constructed of a one-chip microcomputer, etc., including a CPU and peripheral LSI and controls the entire reproducing apparatus 300.

More specifically, the processing control section 301 controls the signal processing section 302, etc., to reproduce a reproducing CD and outputs music composition data obtained to a speaker, etc., through the DAC 304. Furthermore, the processing control section 301 also controls the signal processing section 302, etc., to read TOC information from the reproducing CD and sends this TOC information to the portable phone device 200 through the interface 305, etc.

Furthermore, upon reception of title information and a jacket picture from the portable phone device 200, the processing control section 301 stores them in association with the TOC information in the flash memory 309. Then, when reproducing the reproducing CD, the processing control section 301 reads the corresponding title information and jacket picture from the flash memory 309 and displays them on the display section 307 in synchronization with the reproduction of the music composition data.

The signal processing section 302 consists of a DSP, etc., controls the reproducing section 303 to reproduce the reproducing CD. That is, the signal processing section 302 reads the music composition data from the reproducing CD through the reproduction section 303, applies decoding processing, etc., to this music composition data and then supplies the music composition data to the DAC 304. Furthermore, the signal processing section 302 reads the TOC information from the reproducing CD and supplies it to the processing control section 301.

The reproducing section 303 is provided with an optical head, etc., and reads the music composition data and TOC information, etc., from the reproducing CD loaded in this reproducing apparatus 100.

The DAC 304 converts digital music composition data supplied from the signal processing section 302 to an analog music composition signal and outputs the converted music composition signal to an amplifier and speaker, etc.

The interface 305 transmits/receives data to/from the portable phone device 200 through the communication cable CA.

The key input section 306 consists of button switches, etc., enters instruction information, etc., according to the operation by the user and supplies the information entered to the processing control section 301.

The display section 307 consists of an LCD panel, etc., is controlled by the processing control section 301 and displays characters and figures, etc. For example, the display section 307 displays a title (music name, etc.) of the music composition data being reproduced and at the same time displays a jacket picture, etc., of the reproducing CD.

The memory 308 consists of a RAM, etc., and is used as a work area, etc., for the processing control section 301. That is, the memory 308 stores various kinds of information required when the processing control section 301 executes various kinds of processing.

The flash memory 309 is a non-volatile memory having a predetermined capacity and stores title information and jacket picture, etc., sent from the portable phone device 200 in association with TOC information.

The image output section 310 creates an image signal (picture signal) that can be displayed on an external display device (e.g., television set). More specifically, the image output section 310 converts the jacket picture, etc., read from the flash memory 309 by the processing control section 301 to an image signal and outputs to the external display device.

Then, an operation of the system for transferring title information including the reproducing apparatus 300 in the above-described configuration will be explained. The operations of the communication exchange 400, title information providing server 500 and title information DB 600 out of the components of the system for transferring title information are the same as those of the above-described first to third embodiments.

Thus, the operations of the reproducing apparatus 300 and portable phone device 200 will be explained with reference to FIG. 21.

Suppose that when a jacket picture is acquired from the title information providing server 500, the memory 280 of the portable phone device 200 stores transfer presence/absence information for specifying whether this jacket picture should be transferred to the reproducing apparatus 300 or not. The content (whether a transfer is required or not) of this transfer presence/absence information can be arbitrarily set by the user.

First, when the reproducing CD is loaded, the reproducing apparatus 300 acquires TOC information from this reproducing CD (step S10). Then, the reproducing apparatus 300 sends the TOC information acquired to the portable phone device 200 (step S11).

Upon reception of the TOC information sent from the reproducing apparatus 300 (step S20), the portable phone device 200 acquires the own telephone number from the memory 280 (step S21). Then, the portable phone device 200 sends these TOC information and telephone number to the title information providing server 500 over the wireless public communication network WNET (step S22).

After a while, the portable phone device 200 receives title information and a jacket picture from the title information providing server 500 (step S23). Then, the portable phone device 200 sends the title information of the two to the reproducing apparatus 300 (step S24).

On the other hand, the reproducing apparatus 300 receives the title information sent from the portable phone device 200 and stores it in the flash memory 309. In this case, the reproducing apparatus 300 stores the title information in association with the TOC information.

The portable phone device 200 decides whether the jacket picture should be transferred to the reproducing apparatus 300 or not (step S25). That is, the portable phone device 200 decides whether the jacket picture should be transferred or not according to the transfer presence/absence information stored in the memory 280.

Even if the transfer presence/absence information indicates that no transfer is required, if the portable phone device 200 does not have remaining space enough to record the jacket picture, the portable phone device 200 decides that a transfer to the reproducing apparatus 300 is necessary. That is, in the case of a jacket picture having an amount of data exceeding the capacity (remaining capacity) of the memory 280 of the portable phone device 200, the portable phone device 200 decides that a transfer of the jacket picture is necessary so that the reproducing apparatus 300 stores the jacket picture.

When the portable phone device 200 decides that a transfer is necessary (step S25: Yes), the portable phone device 200 sends the received jacket picture to the reproducing apparatus 300 (step S26). Furthermore, when the portable phone device 200 decides that the jacket picture need not be transferred (step S25: No), the portable phone device 200 stores the received jacket picture in the memory 280 (step S27). In this case, the portable phone device 200 stores the jacket picture in association with the TOC information.

On the other hand, the reproducing apparatus 300 decides whether the jacket picture is sent from the portable phone device 200 or not (step S13). When the reproducing apparatus 300 decides that the jacket picture is sent from the portable phone device 200 (step S13: Yes), the reproducing apparatus 300 receives the jacket picture sent and stores it in the flash memory 309. In this case, the reproducing apparatus 300 stores the jacket picture in association with the TOC information.

The reproducing apparatus 300 waits for a reproduction instruction for a reproducing CD through the key input section 306 (step S15) and when the user instructs reproduction, the reproducing apparatus 300 decides whether the jacket picture has already been stored in the flash memory 309 or not (step S16).

When the reproducing apparatus 300 decides that the jacket picture has not been stored yet (step S16: No), the reproducing apparatus 300 sends reproduction start information indicating the start of reproduction to the portable phone device 200 (step S17). In this case, the reproducing apparatus 300 sends the TOC information together with the reproduction start information to the portable phone device 200.

On the other hand, the portable phone device 200 receives the reproduction start information together with the TOC information from the reproducing apparatus 300 (step S28), reads the jacket picture corresponding to this TOC information from the memory 280 and displays it on the own display section 250 (step S29).

When the reproducing apparatus 300 decides that the jacket picture has already been stored in the flash memory 309 (step S16: Yes), the reproducing apparatus 300 reads the jacket picture from the flash memory 309 and displays the jacket picture on the own display section 307 (step S18). In this case, the reproducing apparatus 300 can also display the jacket picture on an external display device through the image output section 310.

Then, the reproducing apparatus 300 reproduces music composition data from the reproducing CD (step S19). In this case, the reproducing apparatus 300 reads the title information from the flash memory 309 and displays the title, etc., of the music composition data being reproduced on the display section 307. When the jacket picture is displayed on the display section 307 in step S18, the reproducing apparatus 300 displays the title, etc., of the music composition data on the display section 307 in such a way that it does not overlap with the jacket picture.

With the above-described configuration and operation, it is also possible to acquire title information from the title information DB 600 during reproduction. Moreover, it is also possible to store the jacket picture acquired together with the title information in the reproducing apparatus 300, etc., and display them in synchronization with the reproduction.

Figure 21:
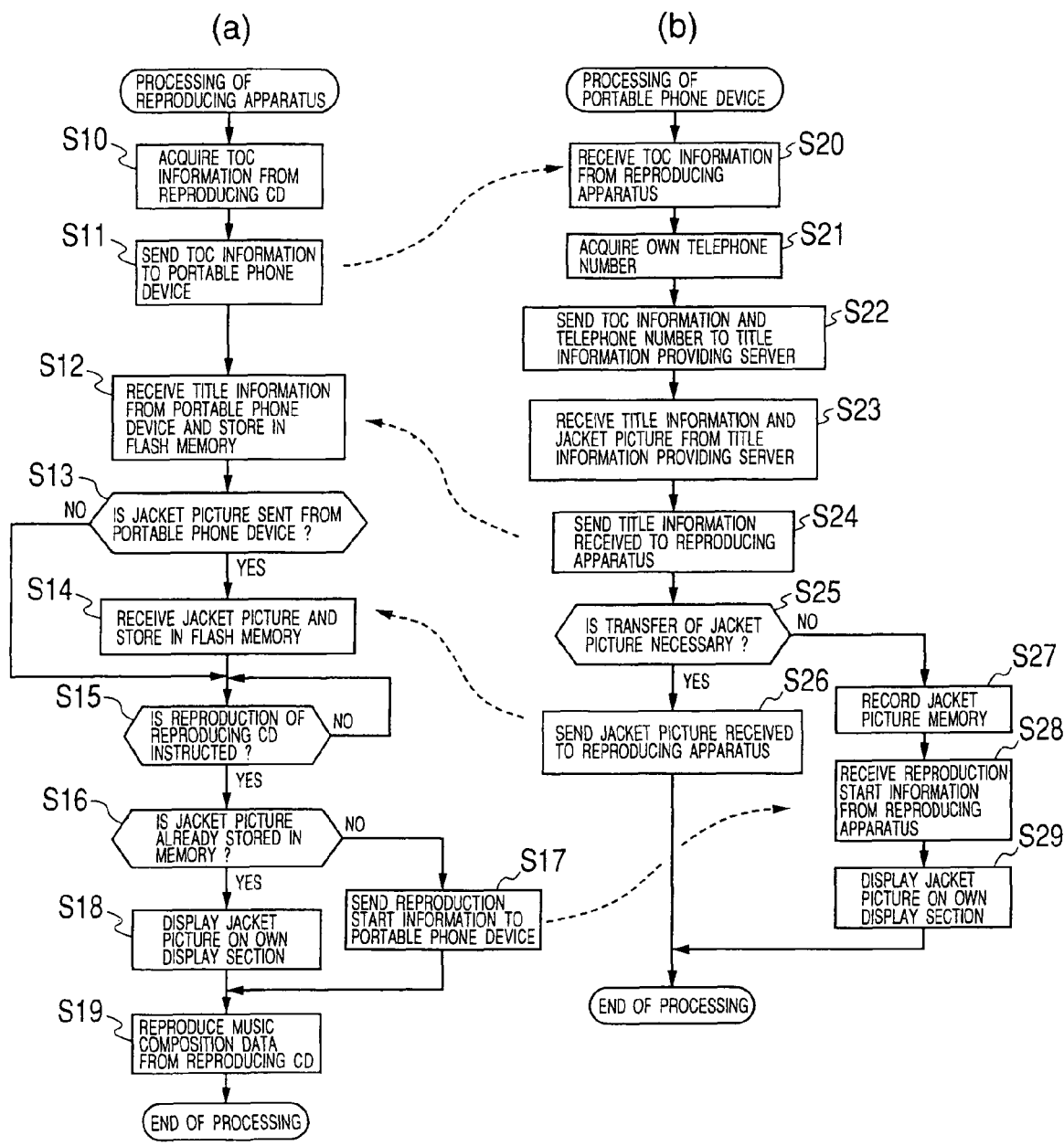
FIG. 21 is a flow chart to illustrate processing by the reproducing apparatus and portable phone device according to the seventh embodiment of the present invention.

In the above-described processing in FIG. 21, the jacket picture is sent from the portable phone device 200 to only the reproducing apparatus 300, but on the contrary, it is also possible to send the jacket picture from the reproducing apparatus 300 to the portable phone device 200.

For example, when the reproducing apparatus 300 decides in step S16 in FIG. 21 that the jacket picture is stored in the own flash memory 309, the reproducing apparatus 300 sends the jacket picture to the portable phone device 200 instead of displaying the jacket picture on the own display section 307. In this case, the reproducing apparatus 300 sends the TOC information together with the jacket picture to the portable phone device 200.

Then, the portable phone device 200 stores the received jacket picture in association with the TOC information in the memory 280.

Furthermore, the reproducing apparatus 300 sends reproduction start information to the portable phone device 200 and displays the jacket picture on the display section 250 of the portable phone device 200 in synchronization with the reproduction.

Eighth Embodiment

All the above-described seven types of system for transferring title information have described the case where title information, etc., is acquired from the title information DB 600 when recording music composition data from a reproducing CD on a recording MD. However, it is possible to acquire title information, etc., during not only recording but also reproduction. Hereunder, a system for transferring title information that acquires title information, etc., during reproduction will be explained.

The system for transferring title information according to this embodiment has the same configuration as the seventh embodiment shown in FIG. 19.

Then, suppose that when a jacket picture is acquired from a title information providing server 500, a memory 280 of a portable phone device 200 stores transfer presence/absence information for specifying whether this jacket picture should be transferred to a recording/reproducing apparatus 100c or not.

The operations of the recording/reproducing apparatus 100c and portable phone device 200 will be explained with reference to FIG. 22 below.

First, when a reproducing CD is loaded, the recording/reproducing apparatus 100c acquires TOC information from this reproducing CD (step S31).

The recording/reproducing apparatus 100c searches a flash memory 185 using the acquired TOC information as a key to decide whether the title information, etc., has already been stored in the flash memory 185 or not (step S32).

When the recording/reproducing apparatus 100c decides that the title information, etc., is already stored in the flash memory 185 (step S32: Yes), it moves the process to step S37 which will be described later. On the other hand, when the recording/reproducing apparatus 100c decides that the title information, etc., is not stored yet in the flash memory 185 (step S32: No), the recording/reproducing apparatus 100c sends the acquired TOC information to the portable phone device 200 (step S33).

Upon reception of the TOC information sent from the recording/reproducing apparatus 100c (step S51), the portable phone device 200 acquires the own telephone number from the memory 280 (step S52). Then, the portable phone device 200 sends these TOC information and telephone number to the title information providing server 500 over a wireless public communication network WNET (step S53).

After a while, the portable phone device 200 receives the title information and jacket picture from the title information providing server 500 (step S54). Then, the portable phone device 200 sends the title information among them to the recording/reproducing apparatus 100c (step S55).

On the other hand, the recording/reproducing apparatus 100c receives the title information sent from the portable phone device 200 and stores it in the flash memory 185 (step S34). In this case, the recording/reproducing apparatus 100c stores the title information in association with the TOC information.

The portable phone device 200 decides whether the jacket picture should be transferred to the recording/reproducing apparatus 100c or not (step S56). Even if the transfer presence/absence information indicates that no transfer is required, if the portable phone device 200 does not have remaining space enough to record the jacket picture, the portable phone device 200 decides that a transfer to the recording/reproducing apparatus 100c is required.

When the portable phone device 200 decides that a transfer is necessary (step S56: Yes), the portable phone device 200 sends the received jacket picture to the recording/reproducing apparatus 100c (step S57). On the other hand, when the portable phone device 200 decides that the jacket picture need not be transferred (step S56: No), the portable phone device 200 stores the received jacket picture in the memory 280 (step S58). In this case, the portable phone device 200 stores the jacket picture in association with the TOC information.

On the other hand, the recording/reproducing apparatus 100c decides whether the jacket picture been sent from the portable phone device 200 or not (step S35). When the recording/reproducing apparatus 100c decides that the jacket picture has been sent (step S35: Yes), the recording/reproducing apparatus 100c receives the jacket picture sent and stores it in the flash memory 185. In this case, the recording/reproducing apparatus 100c stores the jacket picture in association with the TOC information.

The recording/reproducing apparatus 100c waits for a reproduction instruction for a reproducing CD through the key input section 140 (step S37) and if the user instructs reproduction, the recording/reproducing apparatus 100c decides whether the jacket picture has already been stored in the flash memory 185 or not (step S38).

When the recording/reproducing apparatus 100c decides that the jacket picture has not been stored yet (step S38: No), the recording/reproducing apparatus 100c sends reproduction start information indicating the start of reproduction to the portable phone device 200 (step S39). In this case, the recording/reproducing apparatus 100c sends the TOC information together with the reproduction start information to the portable phone device 200.

On the other hand, the portable phone device 200 receives the reproduction start information together with the TOC information from the recording/reproducing apparatus 100c (step S59), reads the jacket picture corresponding to this TOC information from the memory 280 and displays it on the own display section 250 (step S60).

When the recording/reproducing apparatus 100c decides that the jacket picture has already been stored in the flash memory 185 (step S38: Yes), the recording/reproducing apparatus 100c reads the jacket picture from the flash memory 185 and displays the jacket picture on the own display section 150 (step S40). In this case, the recording/reproducing apparatus 100c can also display the jacket picture on an external display device through the image output section 195.

Then, the recording/reproducing apparatus 100c reproduces music composition data from the reproducing CD (step S41). In this case, the recording/reproducing apparatus 100c reads the title information from the flash memory 185 and displays the title, etc., of the music composition data being reproduced on the display section 150. When the jacket picture is displayed on the display section 150 in step S40, the recording/reproducing apparatus 100c displays the title, etc., of the music composition data on the display section 150 in such a way that it does not overlap with the jacket picture.

With the above-described configuration and operation, it is also possible to acquire title information from the title information DB 600 during reproduction. Moreover, it is also possible to store the jacket picture acquired together with the title information in the recording/reproducing apparatus 100c, etc., and display them in synchronization with the reproduction.

Figure 22:
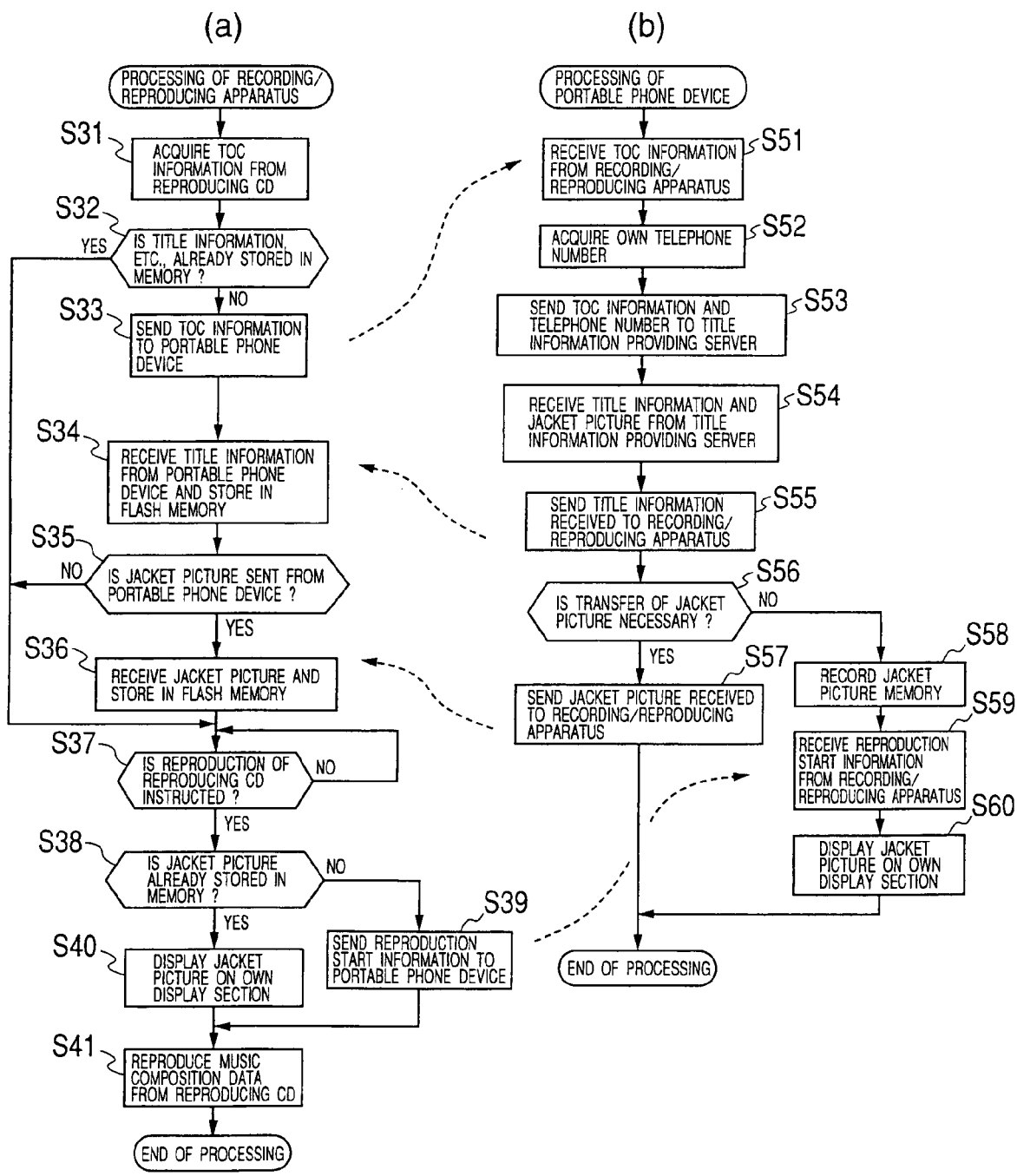
FIG. 22 is a flow chart to illustrate processing by the recording/reproducing apparatus and portable phone device according to the embodiment of the present invention.

In the above-described processing in FIG. 22, the jacket picture is sent from the portable phone device 200 to only the recording/reproducing apparatus 100c. On the contrary, it is also possible to send the jacket picture from the recording/reproducing apparatus 100c to the portable phone device 200.

For example, when the recording/reproducing apparatus 100c decides in step S38 in FIG. 22 that the jacket picture has been stored in the own flash memory 185, the recording/reproducing apparatus 100c sends the jacket picture to the portable phone device 200 instead of displaying the jacket picture on the own display section 150. In this case, the recording/reproducing apparatus 100c sends the TOC information together with the jacket picture to the portable phone device 200.

Then, the portable phone device 200 stores the received jacket picture in association with the TOC information in the memory 280.

Furthermore, the recording/reproducing apparatus 100c sends reproduction start information to the portable phone device 200 and displays the jacket picture on the display section 250 of the portable phone device 200 in synchronization with the reproduction.

The present invention is not limited to the above-described embodiment, but can be modified or applied in a variety of ways.

The above-described embodiment has described the case where no title information, etc., is recorded on the reproducing CD, but the present invention is also applicable to a case where a reproducing CD that prestores title information, etc., is reproduced and music composition data is recorded on a recording CD as appropriate.

For example, the recording/reproducing apparatus 100c decides whether the title information, etc., is recorded on the reproducing CD loaded or not. Then, when it is decided that the title information, etc., is recorded, the recording/reproducing apparatus 100c suppresses the transmission of the TOC information to the portable phone device 200, reads the title information, etc., from the reproducing CD and records it in the recording CD, etc.

If only the title information is recorded and no jacket picture is recorded on the reproducing CD, the recording/reproducing apparatus 100c can also be adapted so as to send the TOC information to the portable phone device 200 as in the case of the above-described embodiment and receive the jacket picture from the title information providing server 500.

Ninth Embodiment

In system for transferring title information according to the above-described embodiment, the title information providing server 500 sends TOC information to one title information DB 600 and requests a search for title information, but there may be a case where title information cannot be searched appropriately with one title information DB alone. For example, there may be a case where a plurality of title information pieces is searched or no title information piece is searched.

In this case, appropriate title information can be searched by requesting other title information DB to search for the title information. Hereunder, a system for transferring title information that can use a plurality of title information DBs will be explained.

Figure 23:
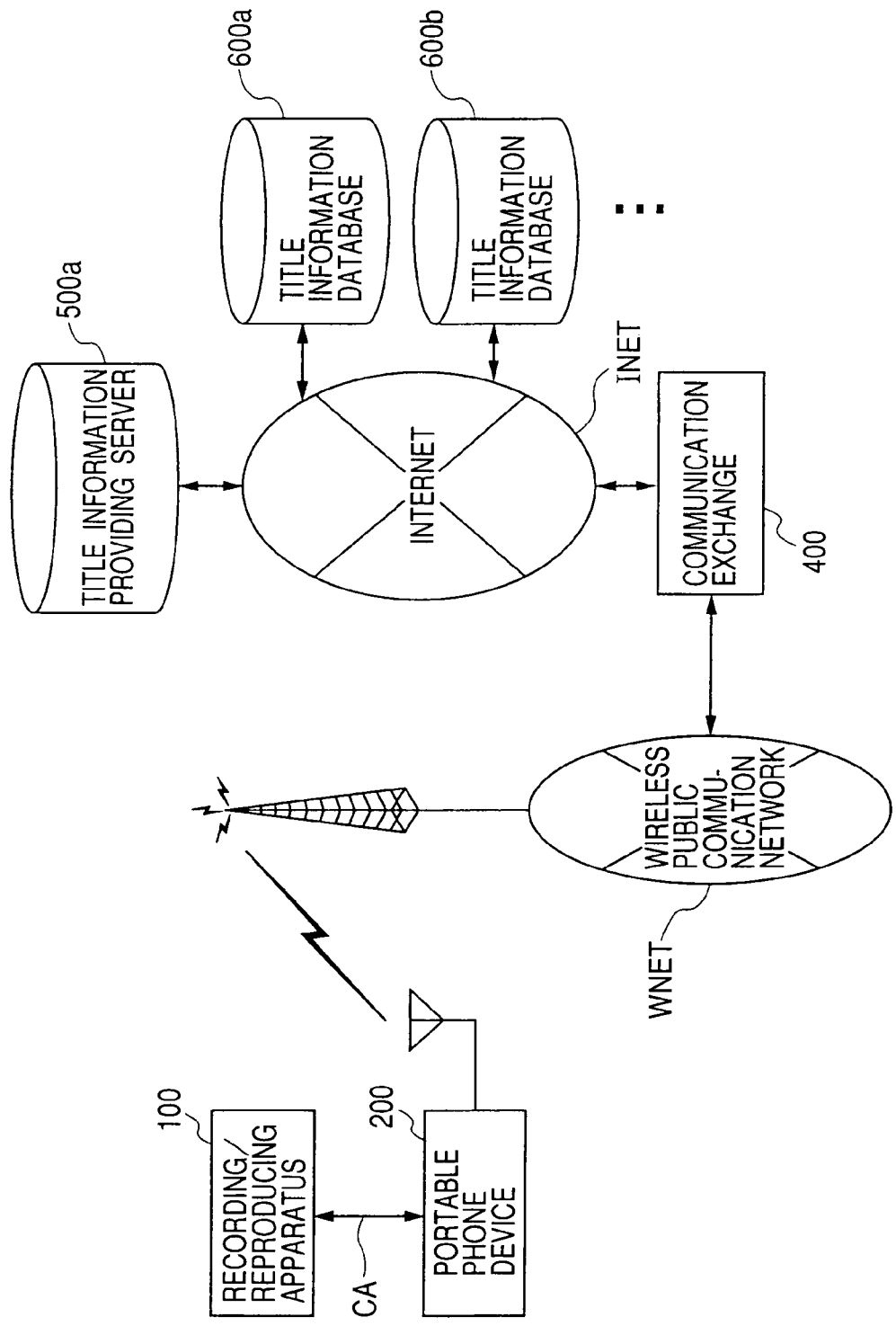
FIG. 23 is a block diagram showing a configuration example of a system for transferring title information according to a ninth embodiment of the present invention.

As shown in FIG. 23, the system for transferring title information according to this embodiment is provided with a recording/reproducing apparatus 100, a portable phone device 200, a communication exchange 400, a title information providing server 500a and a plurality of title information DBs 600 (title information DB 600a, title information DB 600b, . . . ).

By the way, the configuration of the recording/reproducing apparatus 100 to communication exchange 400 is the same as the configuration of the first to third embodiments shown in FIG. 1. Furthermore, each title information DB 600 (title information DB 600a, title information DB 600b, . . . ) is also a database in which title information is stored likewise.

Figure 24:
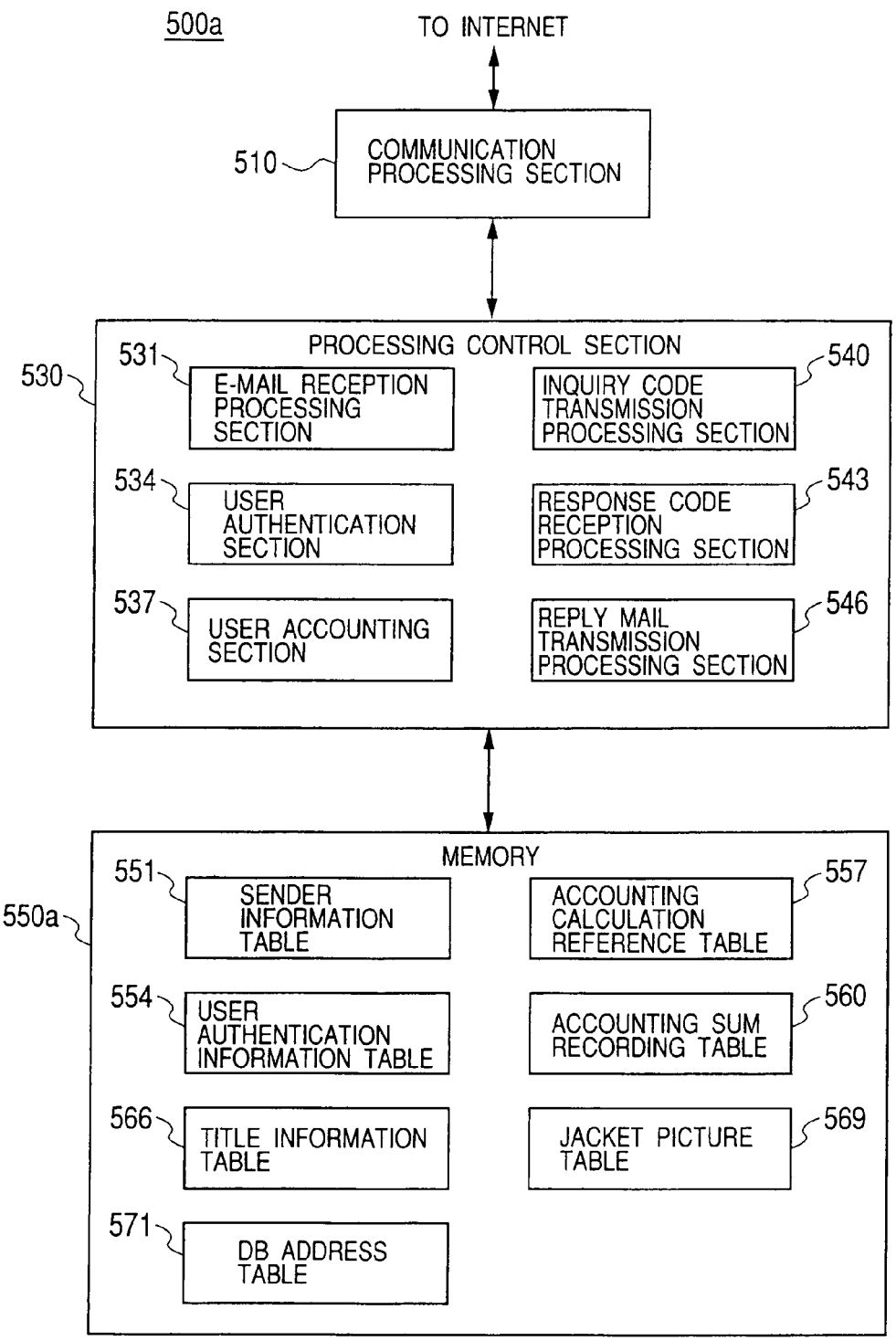
FIG. 24 is a block diagram showing a configuration example of the title information providing server in FIG. 23.

As shown in FIG. 24, the title information providing server 500a is provided with a communication processing section 510, a processing control section 530 and a memory 550a and sends the TOC information sent from the communication exchange 400 by e-mail to each title information DB 600 (title information DB 600a, title information DB 600b, . . . ) using HTTP.

The title information providing server 500 also sends title information which is sent back from any title information DB 600 using HTTP to the user who requests this title information by e-mail.

The communication processing section 510 and processing control section 530 have the same configurations as those of the title information providing server 500 shown in FIG. 4.

Furthermore, the memory 550a stores a sender information table 551, a user authentication information table 554, a title information table 566, an accounting calculation reference table 557, an accounting sum recording table 560 and a jacket picture table 569 and DB address table 571. The sender information table 551 to the jacket picture table 569 have the same configuration as that of the title information providing server 500 (memory 550) shown in FIG. 4.

The DB address table 571 is a table to store an address of each title information DB 600 (title information DB 600a, title information DB 600b, . . . ). This DB address table 571 is referenced by the inquiry code transmission procession section 540.

Hereunder, an operation of a system for transferring title information including the title information providing server 500a in such a configuration will be explained. Operations of the recording/reproducing apparatus 100, the portable phone device 200, the communication exchange 400 and the title information DB 600 out of the components of the system for transferring title information are the same as those of the above-described first to third embodiments.

Figure 25:
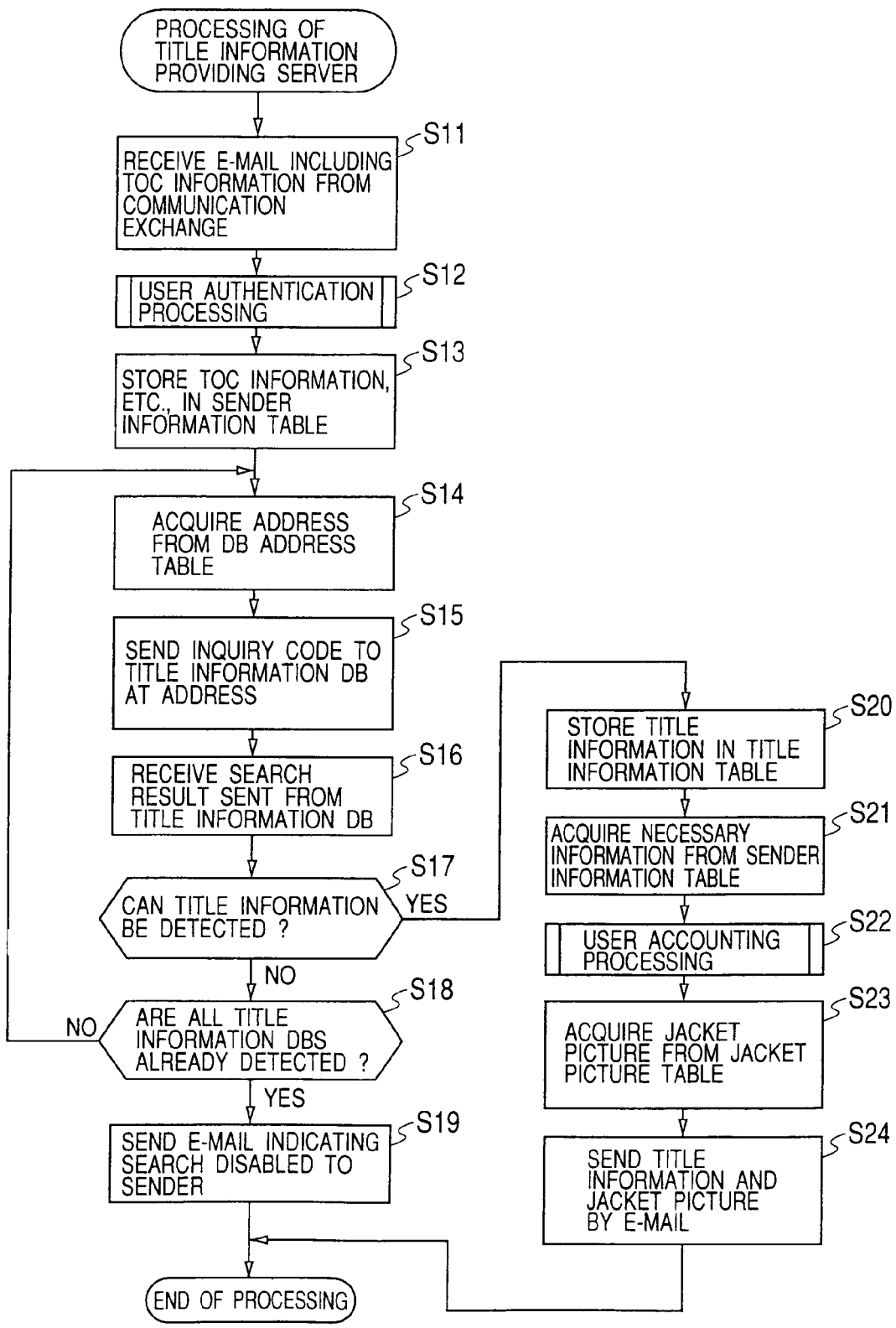
FIG. 25 is a flow chart to illustrate processing by the title information providing server according to the ninth embodiment of the present invention.

Thus, the operations of the title information providing server 500a will be explained mainly using FIG. 25.

Suppose that the DB address table 571 of the title information providing server 500a prestores an address of each title information DB 600 (title information DB 600a, title information DB 600b, . . . ). Then, the recording/reproducing apparatus 100 starts a recording operation, etc., the TOC information read from the reproducing CD is supplied to the communication exchange 400 as e-mail and then the processing in FIG. 25 is started.

First, the title information providing server 500a receives e-mail including TOC information from the communication exchange 400 (step S11). That is, the e-mail reception processing section 531 in the processing control section 530 receives e-mail sent from the communication exchange 400 over the Internet INET through the communication processing section 510.

Then, the e-mail reception processing section 531 analyzes the content of the e-mail received and if the e-mail received has the content requesting a supply of title information, the e-mail reception processing section 531 gives control to the user authentication section 534 to allow it to perform user authentication processing (step S12).

That is, the user authentication section 534 performs the processing shown in FIG. 8 above and decides whether the user registration corresponding to the sender telephone number has been made or not.

When the user is authenticated by the user authentication process, the e-mail reception processing section 531 selects one currently unused IP address from among the IP addresses owned by the title information providing server 500a and stores it together with the TOC information and the sender telephone number included in the received e-mail in the sender information table 551 (step S13).

The inquiry code transmission processing section 540 acquires the address corresponding to any one of the title information DBs 600 (title information DB 600a, etc.) from the DB address table 571 in predetermined order (step S14).

The inquiry code transmission processing section 540 sends an inquiry code to the title information DB 600 (title information DB 600a, etc.) at the acquired address (step S15). That is, the inquiry code transmission processing section 540 reads the TOC information stored in the sender information table 551 and generates an inquiry code corresponding to this TOC information and sends this inquiry code from the port to which the selected IP address is assigned to the title information DB 600 at the acquired address using HTTP over the Internet INET.

Then, the title information providing server 500*a* receives the search result sent from the title information DB 600 (step S16). That is, the response code reception processing section 543 receives the search result sent in a response code format from the title information DB 600 through the communication processing section 510.

The response code reception processing section 543 decides according to the search result whether the title information has been searched appropriately or not (step S17). When a plurality of title information pieces has been searched or no title information piece has been searched, the response code reception processing section 543 decides that the title information has not been searched appropriately.

When it is decided that the title information has not been searched appropriately, the title information providing server 500*a* decides whether all title information DBs 600 have already been searched or not (step S18). That is, the title information providing server 500*a* decides whether title information has not been searched appropriately even if it requests a search for the title information at addresses of all title information DBs 600 (title information DB 600*a*, title information DB 600*b*, . . . ) stored in the DB address table 571.

When the title information providing server 500*a* decides that all title information DBs 600 have not been searched, it moves the process back to step S14 and executes the above-described processing in steps S14 to S18 repeatedly.

On the other hand, when the title information providing server 500*a* decides that all title information DBs 600 have been searched, the title information providing server 500*a* sends the e-mail indicating "search disabled" to the sender (step S19). That is, the reply mail transmission section 546 searches for the sender information table 551, specifies the sender user, and creates e-mail with the content that the title information, etc., has not been searched appropriately and sends this e-mail to the specified user.

Furthermore, when it is decided in step S17 above that the title information has been searched correctly from the title information DB 600, the response code reception processing section 543 temporarily stores the title information added to the response code in the title information table 566 (step S20).

Then, the response code reception processing section 543 acquires necessary information from the sender information table 551 in the memory 550 (step S21). That is, the response code reception processing section 543 searches for the telephone number of the sender from the sender information table 551 using the IP address assigned to the port at which the title information has been received as a key.

The response code reception processing section 543 notifies the user accounting section 537 of the searched telephone number of the sender and allows the user accounting section 537 to perform user accounting (step S22).

That is, the user accounting section 537 performs the processing as shown in FIG. 9 as described above to calculate the accounting sum and updates the accounting sum (accumulated accounting sum, etc.) of the sender user in the accounting sum recording table 560.

The reply mail transmission processing section 546 reads the title information temporarily stored in the title information table 566 and at the same time references the jacket picture table 569 and acquires the jacket picture corresponding to the title information read (step S23). Then, the reply mail transmission processing section 546 creates e-mail with the content of the title information and jacket picture for the user specified by the search of the sender information table 551 and sends this e-mail thereto (step S24).

With the above-described configuration and operation, even if it is not possible to appropriately search the title information from one title information DB, it is possible to request a search for the title information from other title information DBs, thus making it possible to provide appropriate title information.

Tenth Embodiment

In the above-described system for transferring title information according to the ninth embodiment, when title information from a title information DB cannot be searched correctly, a search for the title information in other title information DBs is requested. That is, when title information is searched correctly, the title information is no longer searched in the remaining title information DBs.

However, a data format (e.g., kanji, hiragana, katakana, alphabetical characters) of title information controlled for each title information DB may vary. For this reason, even if title information can be searched and acquired in one title information DB, title information may also be stored in other title information DBs in a better data format.

That is, searching for title information from all title information DBs and selecting appropriate title information among them will provide the user (recording/reproducing apparatus 100, etc.) with more useful title information. A system for transferring title information capable of acquiring more useful title information from a plurality of title information DBs will be explained below.

The system for transferring title information according to this embodiment is provided with a recording/reproducing apparatus 100, a portable phone device 200, a communication exchange 400, a title information providing server 500*b* and a plurality of title information DBs 600 (title information DB 600*a*, title information DB 600*b*, . . . ). That is, it is different from the system for transferring title information according to the seventh embodiment shown in FIG. 19 only in the title information providing server 500*b*.

Figure 26:
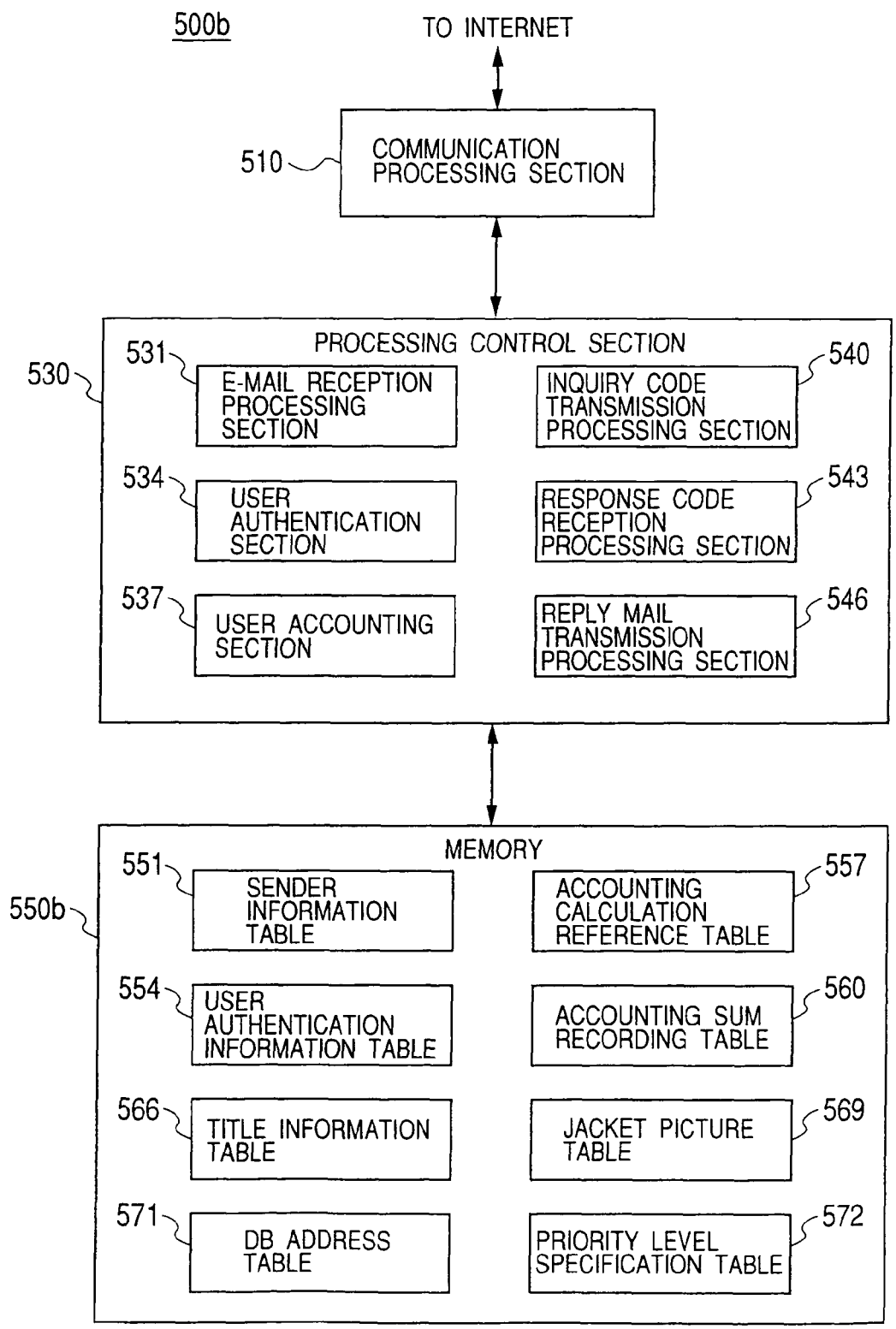
FIG. 26 is a block diagram showing a configuration example of a system for transferring title information according to a tenth embodiment of the present invention.

As shown in FIG. 26, the title information providing server 500*b* is provided with a communication processing section 510, a processing control section 530 and a memory 550*b*. The communication processing section 510 and processing control section 530 have the same configuration as that of the title information providing server 500 shown in FIG. 4.

Furthermore, the memory 550*b* stores a sender information table 551, a user authentication information table 554, a title information table 566, an accounting calculation reference table 557, an accounting sum recording table 560 and a jacket picture table 569, a DB address table 571 and a priority level specification table 572. The sender information table 551 to the jacket picture table 569 have the same configuration as that of the title information providing server 500 (memory 550) shown in FIG. 4. Furthermore, the DB address table 571 has the same configuration as that of the title information providing server 500*a* (memory 550*a*) shown in FIG. 20.

The priority level specification table 572 is a table to store information for specifying the priority level of a data format. This priority level of the data format is a priority level corresponding to a data format of title information that can be acquired from each title information DB 600 (title information DB 600*a*, title information DB 600*b*, . . . ). For example, the level of priority is specified in descending order for kanji, hiragana, katakana and alphabetical characters, in that order.

Hereunder, an operation of the system for transferring title information including the title information providing server 500*b* in such a configuration will be explained. Operations of the recording/reproducing apparatus 100, the portable phone device 200, the communication exchange 400 and the title information DB 600 out of the components of the system for transferring title information are the same as those of the first to third embodiments.

Figure 27:
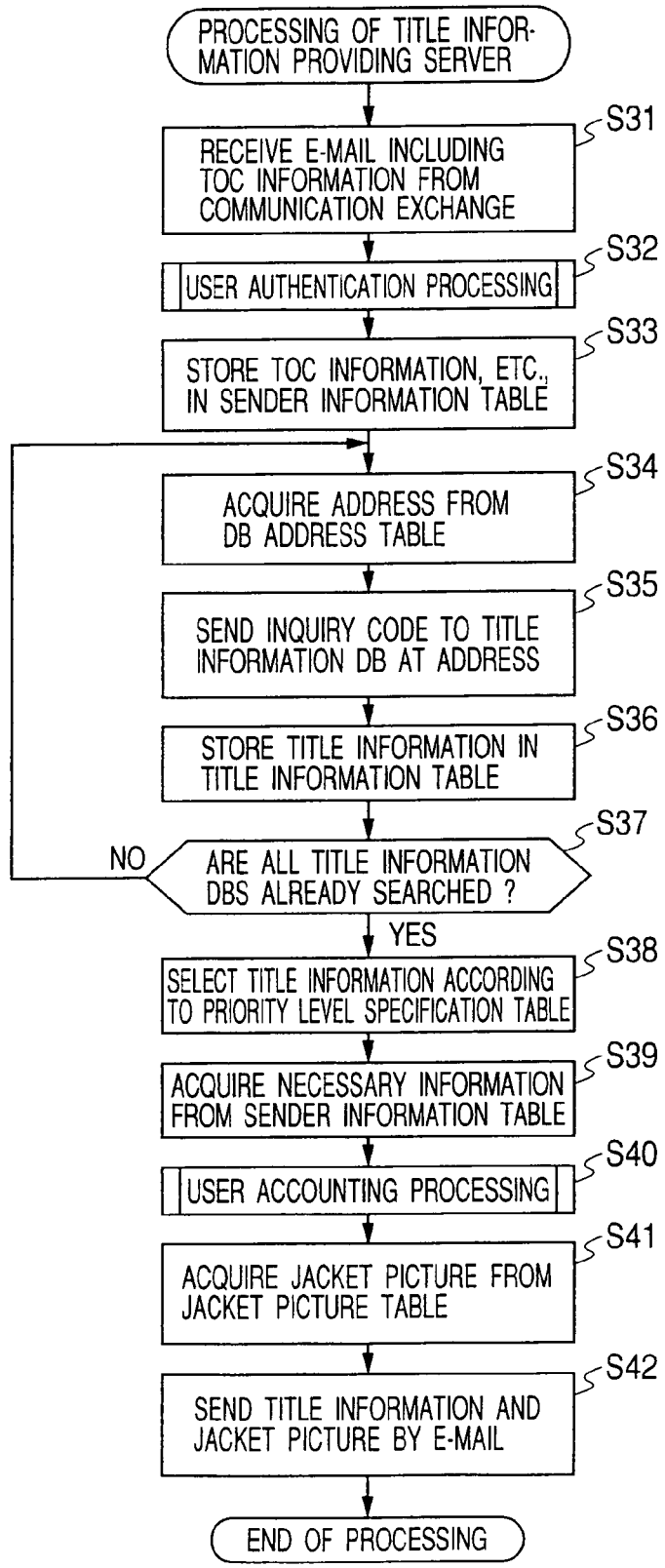
FIG. 27 is a flow chart to illustrate processing by the title information providing server according to the tenth embodiment of the present invention.

Thus, the operations of the title information providing server 500*b* will be explained mainly using FIG. 27.

Suppose that the DB address table 571 of the title information providing server 500*b* prestores an address of each title information DB 600 and the priority level specification table 572 prestores information for specifying the priority level for a data format of title information. Then, the recording/reproducing apparatus 100 starts a recording operation, etc., the TOC information read from the reproducing CD is supplied to the communication exchange 400 as e-mail and then the processing in FIG. 23 is started.

First, the title information providing server 500*b* receives e-mail including TOC information from the communication exchange 400 (step S31). Then, the e-mail reception processing section 531 analyzes the content of the received e-mail and if the received e-mail has the content requesting a supply of title information, the e-mail reception processing section 531 gives control to the user authentication section 534 to allow it to perform user authentication processing (step S32).

When the user is authenticated by the user authentication process, the e-mail reception processing section 531 selects one currently unused IP address from among the IP addresses owned by this title information providing server 500*b* and stores it together with the TOC information and the sender telephone number included in the received e-mail in the sender information table 551 (step S33).

The inquiry code transmission processing section 540 acquires the address corresponding to any one of the title information DBs 600 from the DB address table 571 in a predetermined order (step S34).

The inquiry code transmission processing section 540 sends an inquiry code to the title information DB 600 at the acquired address (step S35). Then, the response code reception processing section 543 receives the title information sent in a response code format from the title information DB 600 through the communication processing section 510 and temporarily stores it in the title information table 566 (step S36).

The title information providing server 500*b* decides whether all title information DBs 600 have already been searched or not (step S37). When the title information providing server 500*a* decides that all title information DBs 600 have not been searched, it moves the process back to step S34 and executes the above-described processing in steps S34 to S37 repeatedly.

On the other hand, when the title information providing server 500*b* decides that all title information DBs 600 have been searched, the title information providing server 500*b* selects title information according to the priority level specification table 572 (step S38). That is, the response code reception processing section 543 analyzes the data format of each title information piece stored in the title information table 566. Then, the response code reception processing section 543 selects the title information that matches the data format with the highest priority stored in the priority level specification table 572 out of data formats of all title information pieces.

Then, the response code reception processing section 543 acquires necessary information from the sender information table 551 in the memory 550 (step S39).

The response code reception processing section 543 notifies the user accounting section 537 of the searched telephone number of the sender and allows the user accounting section 537 to perform user accounting (step S40).

The reply mail transmission processing section 546 references the jacket picture table 569 and acquires the jacket picture corresponding to the title information selected in step S38 (step S41). Then, the reply mail transmission processing section 546 creates e-mail with the content of the title information and jacket picture for the user specified by the search of the sender information table 551 and sends this e-mail thereto (step S42).

The above-described configuration and operation makes it possible to provide the user (recording/reproducing apparatus 100, etc.) with useful title information according to the priority level of the data format.

Furthermore, in the above-described eighth embodiment, the title information providing server 500*b* stores the priority level specification table 572 and selects useful title information according to this priority level specification table 572, but this embodiment can also be adapted so as to make it possible to select title information without depending on the priority level specification table 572.

For example, when the e-mail received from the communication exchange 400 contains information indicating data formats that can be recorded or displayed by the recording/reproducing apparatus 100 or portable phone device 200, the title information providing server 500*b* selects title information giving the highest priority to the data format. In this case, it is also possible to provide the user (recording/reproducing apparatus 100, etc.) with useful title information.

The present invention is not limited to the above-described embodiment, but can also be modified or applied in a variety of ways.

In the above-described embodiment, the title information providing server 500 (title information providing servers 500*a*, 500*b*) authenticates the user using the telephone number of the portable phone device 200, but any technique can be used for user authentication.

For example, it is possible to allow the recording/reproducing apparatus 100 and portable phone device 200, etc., to store the user's personal information (address, telephone number, date of birth, etc.), allow the portable phone device 200, etc., to send the user's personal information when accessing the title information providing server 500 and thereby automatically carry out user authentication. Furthermore, it is also possible to allow the title information providing server 500 to store user's personal information (address, telephone number, date of birth, etc.).

Furthermore, with the widespread use of IPv6, etc., when an IP address is numbered for each device, it is possible to store the IP address in the recording/reproducing apparatus 100 or portable phone device 200, etc., as the personal information.

Eleventh Embodiment

In the case of the system for transferring title information of the above-described embodiment, the case where the memory 280 of the portable phone device 200 or wired phone devices 200*a* and 200*b* stores a jacket picture acquired from the title information providing server 500, etc., has been described. However, the jacket picture can be stored not only on the communication apparatus side (portable phone device 200, etc.) but also on the recording/reproducing apparatus side.

Furthermore, in that case, it is also possible to record music composition data considering a strong electric field of the portable phone device, etc. A system for transferring title information in which a jacket picture can also be stored on the recording/reproducing apparatus side will be explained below.

As shown in FIG. 19, the system for transferring title information according to this embodiment is provided with a recording/reproducing apparatus 100c, a portable phone device 200, a communication exchange 400, a title information providing server 500 and a title information DB 600.

The portable phone device 200 to the title information DB 600 have the same configuration as those of the first to third embodiment shown in FIG. 1.

Figure 28:
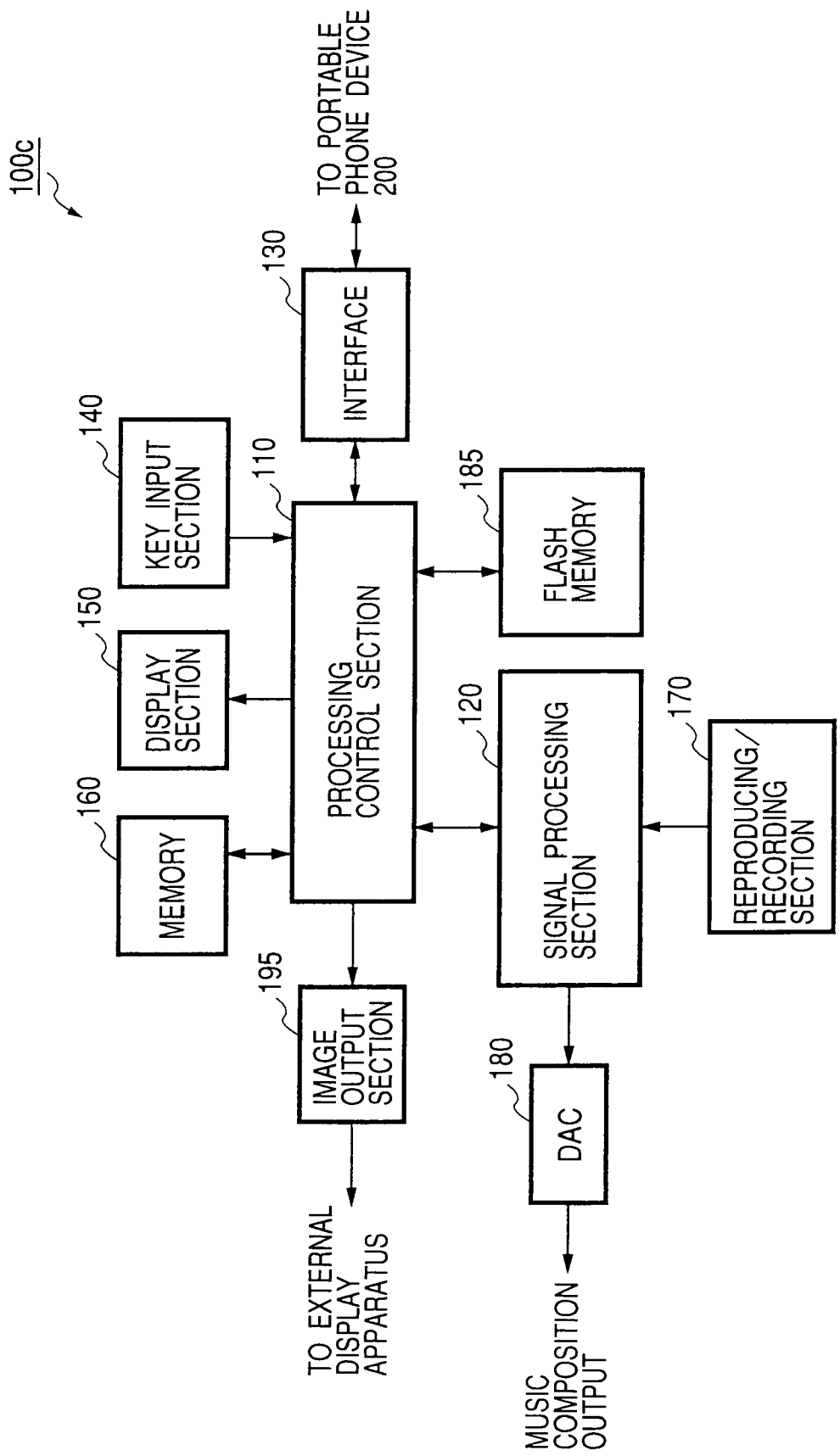
FIG. 28 is a block diagram showing a configuration example of a recording/reproducing apparatus according to an eleventh embodiment of the present invention.

As shown in FIG. 28, the recording/reproducing apparatus 100c is constructed of a processing control section 110, a signal processing section 120, an interface 130, a key input section 140, a display section 150, a memory 160, a recording/reproducing section 170, a DAC 180, a flash memory 185 and an image output section 195.

Here, the processing control section 110 to the DAC 180 have the same configuration as that of the first to fourth embodiment shown in FIG. 2.

Upon reception of title information and a jacket picture sent from the portable phone device 200, the processing control section 110 stores them in association with the TOC information in the flash memory 185. Then, when reproducing a reproducing CD, the processing control section 110 reads the corresponding title information and jacket picture from the flash memory 185 and displays them on the display section 150 in synchronization with reproduction of the music composition data.

The flash memory 185 is a non-volatile memory having a predetermined capacity and stores title information and jacket picture, etc., sent from the portable phone device 200 in association with TOC information.

The image output section 195 creates an image signal (picture signal) that can be displayed on an external display device (e.g., television set). More specifically, the image output section 195 converts the jacket picture, etc., read from the flash memory 185 by the processing control section 110 to an image signal and outputs to the external display device.

Then, an operation of the system for transferring title information including the recording/reproducing apparatus 100c in the above-described configuration will be explained. The operations of the communication exchange 400, title information providing server 500 and title information DB 600 out of the components of the system for transferring title information are the same as those of the above-described first to third embodiments.

Figure 29:
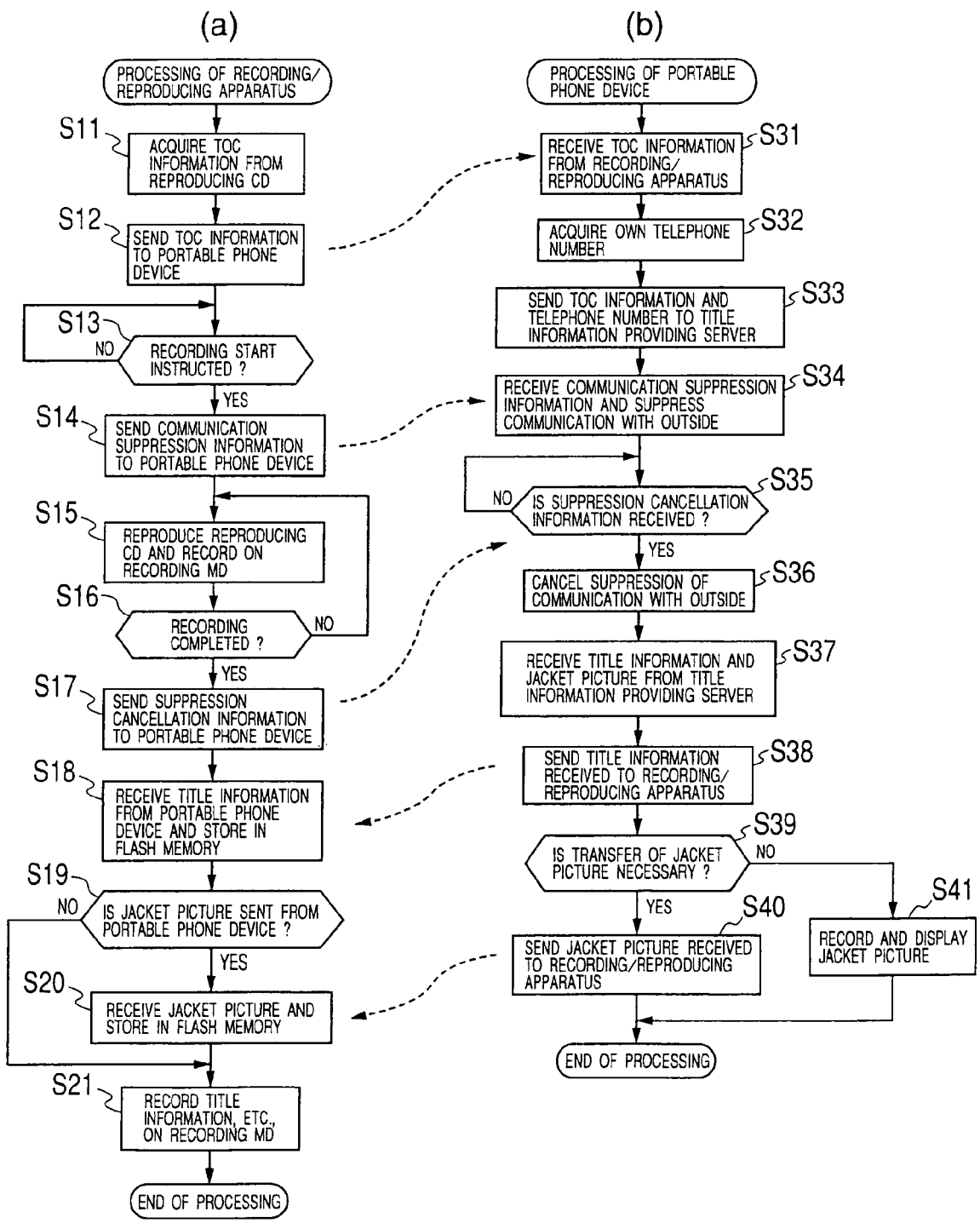
FIG. 29 is a flow chart to illustrate processing by the recording/reproducing apparatus and portable phone device according to the eleventh embodiment of the present invention.

Then, the operations of the recording/reproducing apparatus 100c and portable phone device 200 will be explained with reference to FIG. 29.

Suppose that when a jacket picture is acquired from the title information providing server 500, the memory 280 of the portable phone device 200 stores transfer presence/absence information for specifying whether this jacket picture should be transferred to the recording/reproducing apparatus 100c or not. The content (whether a transfer is required or not, etc.) of this transfer presence/absence information can be arbitrarily set by the user.

First, when a reproducing CD is loaded, the recording/reproducing apparatus 100c acquires the TOC information from this reproducing CD (step S11). Then, the recording/reproducing apparatus 100c sends the TOC information acquired to the portable phone device 200 (step S12).

The recording/reproducing apparatus 100c does not execute subsequent processes until the start of recording is instructed (step S13). For example, the recording/reproducing apparatus 100c waits until the user inputs information instructing the start of a recording operation through the key input section 140.

Upon reception of the TOC information sent from the recording/reproducing apparatus 100c (step S31), the portable phone device 200 acquires the own telephone number from the memory 280 (step S32). Then, the portable phone device 200 sends these TOC information and telephone number to the title information providing server 500 over the wireless public communication network WNET (step S33).

When the recording/reproducing apparatus 100c decides that the recording start has been instructed, it sends communication suppression information to instruct the suppression of a communication to the portable phone device 200 (step S14).

Then, the portable phone device 200 receives this communication suppression information sent from the recording/reproducing apparatus 100c and suppresses a communication with the outside (step S34). For example, the communication function is totally stopped when the power supply control section 241 shuts off a power supply from the power supply section 220 or the power supply control section 241 shuts off a power supply to the communication processing section 210, etc.

The portable phone device 200 does not execute the subsequent processes until it receives suppression cancellation information to instruct the cancellation of communication suppression from the recording/reproducing apparatus 100c (step S35).

On the other hand, the recording/reproducing apparatus 100c controls the recording/reproducing section 170 to reproduce a reproducing CD and records the music composition data on a recording MD (step S15). Since the portable phone device 200 suppresses a communication with the outside during this recording, there is no possibility that noise from high frequency radio signals of the portable phone device 200 will mix into the music composition data recorded on the recording MD.

The recording/reproducing apparatus 100c continues the recording operation until the recording is completed (step S16).

Then, when the recording/reproducing apparatus 100c decides that the recording is completed, it sends suppression cancellation information to the portable phone device 200 (step S17).

Upon reception of the suppression cancellation information from the recording/reproducing apparatus 100c, the portable phone device 200 cancels the suppression of a communication with the outside (step S36). For example, the communication function is totally recovered when the power supply control section 241 resumes a power supply from the power supply section 220 or the power supply control section 241 resumes a power supply to the communication processing section 210, etc.

Then, the portable phone device 200 receives title information and a jacket picture from the title information providing server 500 (step S37). Then, the portable phone device 200 sends the title information among them to the recording/reproducing apparatus 100c (step S38).

On the other hand, the recording/reproducing apparatus 100c receives the title information sent from the portable phone device 200 and stores it in the flash memory 185 (step S18). In this case, the recording/reproducing apparatus 100c stores the title information in association with the TOC information.

The portable phone device 200 decides whether the jacket picture should be transferred to the recording/reproducing apparatus 100c or not (step S39). That is, the portable phone device 200 decides whether the jacket picture needs to be transferred or not according to the transfer presence/absence information stored in the memory 280.

Even if it is decided that the transfer presence/absence information need not be transferred, if there is not space enough to record the jacket picture in the portable phone device 200, the portable phone device 200 decides that the transfer to the recording/reproducing apparatus 100c is necessary.

When the portable phone device 200 decides that the transfer is necessary (step S39: Yes), it sends the received jacket picture to the recording/reproducing apparatus 100c (step S40). Furthermore, if it decides that the jacket picture need not be transferred (step S39: No), the portable phone device 200 records the received jacket picture in the memory 280 and displays the jacket picture on the own display section 250 (step S41). In this case, the portable phone device 200 stores the jacket picture in association with the TOC information.

On the other hand, the recording/reproducing apparatus 100c decides whether the jacket picture is sent or not from the portable phone device 200 (step S19). When it is decided that the jacket picture is sent (step S19: Yes), the recording/reproducing apparatus 100c receives the jacket picture sent and stores it in the flash memory 185 (step S20). In this case, the recording/reproducing apparatus 100c stores the jacket picture in association with the TOC information.

The recording/reproducing apparatus 100c records the title information, etc., on a recording MD (step S21). The recording/reproducing apparatus 100c can record not only the title information but also the jacket picture on the recording MD if the jacket picture can be recorded on the recording MD.

The above-described configuration and operation allows the jacket picture to be recorded on the recording/reproducing apparatus 100c side, too. Furthermore, since the communication function of the portable phone device 200 is stopped during recording of the music composition data, it is possible to prevent noise, etc. due to influences of a strong electric field from mixing into the music composition data recorded on the recording MD.

The present invention is not limited to the above-described embodiment, but can be modified or applied in a variety of ways.

The above-described embodiment has described the case where communications between the communication apparatus on the recording apparatus side and the communication exchange on the information providing side are executed via a wireless or wired public communication network. However, communications between the communication apparatus and communication exchange can also be executed via a private communication network or directly connected cable, etc.

Furthermore, the above-described embodiment has described the case where the communication exchange, title information providing server and title information database communicate with one another over the Internet. However, communications among these elements can also be executed via a private communication network or directly connected cable, etc.

In the above-described second embodiment, a wireless communication with the outside is suppressed first, recording of the music composition data on a recording MD is started, recording of all music composition data is completed, and then the suppression of the wireless communication is canceled and a wireless communication is executed to acquire title information and a jacket picture. However, it is also possible to execute suppression or cancellation of the suppression of a wireless communication at timings different from the above-described timings.

For example, it is possible to execute suppression or cancellation of the suppression of a wireless communication at the following timings. First, TOC information is sent from the recording/reproducing apparatus to the title information providing server through a wireless communication and the title information sent back from the title information providing server is received by the recording/reproducing apparatus in response to this transmission. Then, after the reception of the title information is completed, completion information indicating the completion of the reception is sent from the recording/reproducing apparatus to the communication apparatus. The communication apparatus that has received this completion information suppresses the wireless communication. Then, the recording/reproducing apparatus starts the recording of music composition data on a recording MD. When the recording of all music composition data is completed, the recording/reproducing apparatus sends recording end information indicating the end of recording to the communication apparatus. The communication apparatus that has received this recording end information cancels the suppression of the wireless communication.

Or, for example, it is also possible to execute suppression or cancellation of the suppression of a wireless communication at the following timings. First, TOC information is sent from the recording/reproducing apparatus to the title information providing server through a wireless communication. Then, before a reply from the title information providing server, recording start information indicating the start of recording is sent from the recording/reproducing apparatus to the communication apparatus. The communication apparatus that has received this recording start information suppresses the wireless communication. Then, the recording/reproducing apparatus starts recording of music composition data on a recording MD. After the recording of all music composition data is completed, the recording/reproducing apparatus sends recording end information indicating the end of recording to the communication apparatus. The communication apparatus that has received this recording end information cancels the suppression of the wireless communication. Then, the communication apparatus receives the title information and jacket picture sent back from the information providing server according to the TOC information sent before the radio communication is suppressed. Then, the communication apparatus sends the received title information to the recording/reproducing apparatus.

The above-described embodiment has described the case where a jacket picture which is an image indicating the appearance of a reproducing CD on sale at a store is prestored in a jacket picture table in the title information providing server. However, the place where jacket pictures are stored is not limited to the title information providing server. For example, it is possible to store the jacket picture in advance in the title information database, etc., and supply the jacket picture corresponding to the TOC information together with the title information from the title information database, etc. Furthermore, an image to be supplied is not limited to a jacket picture indicating the appearance of a reproducing CD, but it is possible to supply, for example, an arbitrary photo of an artist related to the reproducing CD.

The above-described embodiment has described the case where a recording MD is used as a recoding medium to be used for recording and recording title information. However, the recoding medium is not limited to a recording MD, and it is also possible to use a CD-R, CD-RW, DVD-R or DVD-RW, etc., as the recording medium.

The title information providing server in the above-described embodiment authenticates the user and executes accounting processing using a received telephone number as a key. However, it is also possible to send an e-mail address of the user instead of the telephone number from the recording/reproducing apparatus to the title information providing server and execute user authentication or accounting processing using the e-mail address as a key.

The title information providing server in the above-described embodiment sends back the jacket picture corresponding to the TOC information sent from the recording/reproducing apparatus included in the text of the e-mail. However, jacket pictures can be provided in any mode and not limited to transmission of jacket pictures included in the text of e-mail alone. For example, it is also possible to attach image data of a jacket picture to e-mail and send it or send HTML-format documents, etc., according to a communication protocol such as HTTP.

The above-described third embodiment has described the case where recording is temporarily stopped when there is an incoming call from the outside during recording of music composition data. The reason that recording is temporarily stopped during recording is to prevent noise/a noise signal from mixing into magnetic recording due to high frequency radio waves.

In this case, it is preferable to automatically and appropriately resume recording of the music composition data whose recording is stopped. To automatically resume the recording of the interrupted music composition data, for example, the following technique can be used.

First, the moment an incoming call arrives at the portable phone device from outside, the recording/reproducing apparatus detects the track in the reproducing CD including the music composition data being recorded on the recording MD and the recording position of the recording MD, and stores the track number and recording position. Then, after the communication of the portable phone device with the outside is completed, the recording information recorded at the recording position corresponding to the track number stored in the recording MD is erased. Then, the reproducing CD is reproduced from the start of the track corresponding to the track number stored and the music composition data reproduced is recorded on the recording MD.

This makes it possible to record music composition data of high quality free of noise due to incoming calls during recording.

Furthermore, the following technique is also available for this processing.

First, when the recording/reproducing apparatus receives incoming call notification information from the portable phone device during recording of music composition data on the recording MD, the recording/reproducing apparatus stops the recording of the music composition data and erases the portion (and the portion immediately preceding (0.5 to 2 sec) thereto) being recorded at the moment of the arrival of the incoming call from the recording MD. Then, after receiving a notice that the communication has completed from the portable phone device, the recording/reproducing apparatus reproduces the reproducing CD from the start position of the portion of the erased music composition data and resumes the recording on the recording MD. This also makes it possible to record music composition data of high quality free of noise due to incoming calls during recording. Furthermore, reproducing the reproducing CD from the start of a track makes it possible to shorten the recording time and is effective in recording music composition data of a long playing time.

Furthermore, after temporarily storing the music composition data reproduced from the reproducing CD in memory, if the music composition data stored in this memory is read and recorded on the recording MD, the following processing is also possible.

First, upon reception of incoming call notification information from the portable phone device, the recording/reproducing apparatus erases the music composition data stored in the memory from the memory without recording it on the recording MD and at the same time stops the recording of the music composition data on the recording MD. Then, after the communication of the portable phone device with the outside is completed, the recording/reproducing apparatus reproduces the portion (and the portion immediately preceding (0.5 to 2 sec) thereto) of the music composition data erased from the memory at the time of the arrival of the incoming call from the reproducing CD and stores it in the memory. Then, the music composition data stored in the memory is recorded on the recording MD from the position (and the portion immediately preceding (0.5 to 2 sec) thereto) at which the recording is stopped. Doing so also makes it possible to record music composition data of high quality free of noise due to incoming calls during recording. Furthermore, it is possible to shorten the recording time in comparison with the case of reproducing the reproducing CD from the start of a track.

By stopping or resuming the recording on the recording MD as described above, the portion of the music composition data being recorded at the time of the arrival of a wireless communication or suppression of recording is erased and recording on the recording MD is resumed from the erased portion of the music composition data, and therefore it is possible to prevent noise or a noise signal from mixing into the recorded data on the recording MD.

The above-described fifth embodiment has described the case where the recording/reproducing apparatus and wired phone device are connected via a wireless interface and the wired phone device and communication exchange are connected via a wired public communication network. It is also possible to adopt a configuration with the wired phone device replaced by a portable phone device and with the wired public communication network replaced by a wireless public communication network.

Furthermore, the above-described sixth embodiment has described the configuration including a recording/reproducing apparatus provided with functions of a communication apparatus as a wired phone device, but it is also possible to adopt a configuration including a recording/reproducing apparatus provided with functions of a communication apparatus as a portable phone device capable of wireless communications.

Furthermore, the above-described embodiment has described the case where an accounting sum is calculated and recorded for each user specified by the telephone number of the sender, that is, the portable phone device 200. However, it is possible to send an apparatus number, etc., specific to a recording/reproducing apparatus instead of a portable phone device to a title information providing server and calculate or record the accounting sum for each apparatus number.

The above-described embodiment has described the programs for processing the operation of the system for transferring title information as having been prestored in memory. However, these programs can also be stored in a computer-readable recording medium such as an FD, CD-ROM and DVD and distributed. Or it is also possible to store those programs in a disc apparatus owned by a server apparatus on the Internet and download them superimposed on a carrier to a computer.

EFFECTS OF THE INVENTION

As explained above, the present invention can acquire attribute information of music composition data recorded on a reproducing medium from an attribute information providing server and easily record it together with the music composition data on a recording medium, etc. Furthermore, the present invention can easily acquire and use attribute information of music composition data.

Furthermore, the present invention can appropriately provide attribute information recorded on a reproducing medium.

Furthermore, the present invention can appropriately record music composition data, etc., considering influences of communication apparatuses on communications.

What is claimed is:

1. A system for transferring information on attribute comprising a recording/reproducing apparatus that reproduces music composition data from a reproducing medium and records the music composition data on a recording medium and an attribute information providing server which is connected to said recording/reproducing apparatus through a communication and provides attribute information indicating an attribute of the music composition data recorded on the reproducing medium,
    characterized in that said recording/reproducing apparatus comprising:
    identification information acquiring means for acquiring identification information on the reproducing medium from the reproducing medium;
    identification information transmitting means for transmitting the identification information acquired from said identification information acquiring means to said attribute information providing server;
    attribute information receiving means for receiving the attribute information sent from said attribute information providing server;
    recording means for recording the attribute information received by said attribute information receiving means on a recording medium, and
    control instructing means for sending communication suppression information for instructing the suppression of a communication to said server in synchronization with the start of a reproducing/recording operation in said recording/reproducing apparatus and sending suppression cancellation information for instructing the cancellation of the suppressed communication to said server in synchronization with the end of the reproducing/recording operation in said recording/reproducing apparatus, and
    said attribute information providing server comprising:
    identification information receiving means for receiving the identification information sent from said identification information transmitting means;
    attribute information acquiring means for acquiring attribute information corresponding to the identification information received from said identification information receiving means by accessing an attribute information database in which attribute information is prestored; and
    attribute information transmitting means for transmitting the attribute information acquired from said attribute information acquiring means to said recording/reproducing apparatus through a communication.

2. The system for transferring information on attribute according to claim 1, further comprising a communication apparatus which is connected to said identification information transmitting means and said attribute information receiving means of said recording/reproducing apparatus, transmits the identification information transmitted from said identification information transmitting means to said attribute information providing server according to a predetermined communication system, receives the attribute information sent back from said attribute information providing server according to said predetermined communication system in response to the transmission of said identification information and provides the received attribute information to said attribute information receiving means.

3. The system for transferring information on attribute according to claim 2, further comprising a communication exchange apparatus which is connected to said communication apparatus via a public communication network, connected to said attribute information providing server via a network, receives the identification information from said recording/reproducing apparatus via said public communication network, converts a protocol and then sends said identification information to said attribute information providing server through said network, receives the attribute information sent back from said attribute information providing server in response to the transmission of said identification information through a network, converts the protocol and then sends said attribute information to said recording/reproducing apparatus via said public communication network.

4. The system for transferring information on attribute according to claim 2,
    characterized in that said recording/reproducing apparatus further comprises signal transmitting means for transmitting a first signal corresponding to the start of recording of the music composition data for said recording medium and a second signal corresponding to the end of recording of the music composition data for said recording medium to said communication apparatus, and
    said communication apparatus further comprising:
    signal receiving means for receiving said first and second signals from said recording/reproducing apparatus; and
    communication suppressing means for suppressing a wireless communication in response to the reception of the first signal by said signal receiving means and canceling the suppression of the wireless communication in response to the reception of said second signal by said signal receiving means.

5. The system for transferring information on attribute according to claim 2,
    characterized in that said recording/reproducing apparatus further comprising:
    first signal transmitting means for transmitting a first signal corresponding to the completion of the reception of the attribute information by said attribute information receiving means to said communication apparatus;
    recording starting means for starting the recording of the music composition data on said recording medium after transmitting said first signal; and
    second signal transmitting means for transmitting a second signal corresponding to the completion of the recording of the music composition data on said recording medium to said communication apparatus, and
    said communication apparatus further comprising:
    signal receiving means for receiving said first and second signals from said recording/reproducing apparatus; and
    communication suppressing means for suppressing a wireless communication in response to the reception of said first signal by said signal receiving means and canceling the suppression of the wireless communication in response to the reception of said second signal.

6. The system for transferring information on attribute according to claim 2,
 characterized in that said recording/reproducing apparatus further comprises signal transmitting means for transmitting a first signal to said communication apparatus in response to the transmission of the identification information from said identification information transmitting means to said attribute information providing server through said communication apparatus and transmitting a second signal to said communication apparatus in response to the end of the recording of the music composition data on said recording medium, and
 said communication apparatus further comprising:
 signal receiving means for receiving said first and second signals sent from said signal transmitting means;
 communication suppressing means for suppressing a wireless communication in response to the reception of said first signal by said signal receiving means, canceling the suppression of the wireless communication in response to the reception of said second signal and enabling the reception of the attribute information provided from said attribute information providing server; and
 means for supplying the attribute information received through a wireless communication to said attribute information receiving means of said recording/reproducing apparatus.

7. The system for transferring information on attribute according to claim 4, characterized in that said communication suppressing means suppresses a wireless communication while enabling execution of processing involving no wireless communication.

8. The system for transferring information on attribute according to claim 2,
 characterized in that said communication apparatus further comprising:
 incoming call notification information transmitting means for transmitting incoming call notification information for notifying the arrival of a wireless communication to said recording/reproducing apparatus; and
 communication end information transmitting means for transmitting communication end information for notifying the end of the wireless communication to said recording/reproducing apparatus, and
 said recording/reproducing apparatus further comprising:
 incoming call notification information receiving means for receiving incoming call notification information sent from said incoming call notification information transmitting means;
 recording suppressing means for temporarily suppressing the recording of the music composition data on said recording medium in response to the reception of the incoming call notification information by said incoming call notification information receiving means;
 communication end information receiving means for receiving the communication end information sent by said communication end information transmitting means; and
 recording resuming means for resuming the recording of the music composition data temporarily suppressed by said recording suppressing means on said recording medium in response to the reception of the communication end information by said communication end receiving means.

9. The system for transferring information on attribute according to claim 2,
 characterized in that said attribute information providing server comprising:
 image information table that prestores image information corresponding to the identification information from said recording/reproducing apparatus by said identification information transmitting means;
 image information acquiring means for acquiring the image information stored in association with the identification information received by said identification information receiving means from said image information table; and
 image information transmitting means for transmitting said image information acquired from said image information acquiring means to said communication apparatus, and
 said communication apparatus comprising:
 image information receiving/storing means for receiving and storing the image information sent from said attribute information providing server by said image information transmitting means; and
 displaying means for displaying an image according to the image information stored in said image information receiving/storing means.

10. The system for transferring information on attribute according to claim 2,
 characterized in that said attribute information providing server comprising:
 an image information table that prestores image information corresponding to the identification information from said recording/reproducing apparatus by said identification information transmitting means;
 image information acquiring means for acquiring the image information stored in association with the identification information received by said identification information receiving means from said image information table; and
 image information transmitting means for transmitting said image information acquired by said image information acquiring means to said communication apparatus,
 said communication apparatus comprising:
 image information transferring means for transferring the image information sent from said attribute information providing server by said image information transmitting means to said recording/reproducing apparatus; and
 displaying means for displaying an image according to the image information forwarded from said recording/reproducing apparatus, and
 said recording/reproducing apparatus comprising:
 image information storing means for storing the image information transferred by said image information transferring means; and
 image information forwarding means for forwarding the image information stored in said image information storing means to said communication apparatus.

11. The system for transferring information on attribute according to claim 1, further comprising a communication exchange apparatus which is connected to said recording/reproducing apparatus via a public communication network, connected to said attribute information providing server via a network, receives the identification information from said recording/reproducing apparatus via said public communication network, converts a protocol and then sends said identification information to said attribute information providing server via said network, receives the attribute information sent back from said attribute information providing server in response to the transmission of said identification information via a network, converts the protocol and then sends said attribute information to said recording/reproducing apparatus via said public communication network.

12. The system for transferring information on attribute according to claim 1, characterized in that said recording/reproducing apparatus further comprises communication suppressing means for suppressing a wireless communication in response to the start of recording of the music composition data on said recording medium and canceling the suppression of the wireless communication in response to the end of recording of the music composition data on said recording medium.

13. The system for transferring information on attribute according to claim 1,
characterized in that said recording/reproducing apparatus further comprising:
recording suppressing means for temporarily suppressing the recording of the music composition data on said recording medium in response to the arrival of a wireless communication; and
recording resuming means for resuming the recording of the music composition data on said recording medium in response to the end of said wireless communication.

14. The system for transferring information on attribute according to claim 8,
characterized in that said recording resuming means resumes the recording on said recording medium from the start of the music composition data whose recording is suppressed by said recording suppressing means.

15. The system for transferring information on attribute according to claim 8,
characterized in that said recording resuming means substantially erases a portion of the music composition data already recorded at the time at which the wireless communication arrives or at the time at which the recording is suppressed by said recording suppressing means and resumes the recording on said recording medium from the portion whose said music composition data has been erased.

16. The system for transferring information on attribute according to claim 1,
characterized in that said identification information transmitting means transmits the identification information including sender information for identifying said recording/reproducing apparatus to said attribute information providing server, and
said attribute information providing server sends the attribute information acquired by accessing said attribute information database to the recording/reproducing apparatus corresponding to said sender information sent by said identification information transmitting means.

17. The system for transferring information on attribute according to claim 1,
characterized in that said identification information includes TOC information on the number of music pieces recorded and recording time of the music composition data recorded on said reproducing medium, and
said attribute information includes at least one of information pieces of a disc title, music title, composer, music score, and lyrics.

18. A method for transferring information on attribute comprising a recording/reproducing apparatus that reproduces music composition data from a reproducing medium and records the music composition data on a recording medium and an attribute information providing server that is connected to said recording/reproducing apparatus through a communication and provides attribute information indicating an attribute of the music composition data recorded on the reproducing medium, characterized by comprising:
an identification information acquiring step of acquiring identification information on the reproducing medium;
an identification information transmitting step of transmitting the identification information acquired in said identification information acquiring step to said attribute information providing server through said communication;
an identification information receiving step of receiving the identification information sent in said identification information transmitting step by said attribute information providing server;
an attribute information acquiring step of acquiring attribute information corresponding to the identification information received in said identification information receiving step by accessing an attribute information database that prestores attribute information;
attribute information transmitting step of transmitting the attribute information acquired in said attribute information acquiring step to said recording/reproducing apparatus through said communication;
an attribute information receiving step of receiving the attribute information sent from said attribute information providing server by said recording/reproducing apparatus;
a recording step of recording the attribute information received in said attribute information receiving step on a recording medium; and
a control instructing step of sending communication suppression information for instructing the suppression of a communication to said server in synchronization with the start of a reproducing/recording operation in said recording/reproducing apparatus and sending suppression cancellation information for instructing the cancellation of the suppressed communication to said server in synchronization with the end of the reproducing/recording operation in said recording/reproducing apparatus.

* * * * *